United States Patent
Imai

(10) Patent No.: US 9,330,298 B2
(45) Date of Patent: May 3, 2016

(54) FACE IMPRESSION ANALYZING METHOD, AESTHETIC COUNSELING METHOD, AND FACE IMAGE GENERATING METHOD

(75) Inventor: Takeo Imai, Kawaguchi (JP)

(73) Assignee: KAO CORPORATION, Tokyo (JP)

( * ) Notice: Subject to any disclaimer, the term of this patent is extended or adjusted under 35 U.S.C. 154(b) by 45 days.

(21) Appl. No.: 14/131,374

(22) PCT Filed: Jul. 6, 2012

(86) PCT No.: PCT/JP2012/004404
§ 371 (c)(1),
(2), (4) Date: Feb. 20, 2014

(87) PCT Pub. No.: WO2013/005447
PCT Pub. Date: Jan. 10, 2013

(65) Prior Publication Data
US 2014/0226896 A1 Aug. 14, 2014

(30) Foreign Application Priority Data

Jul. 7, 2011 (JP) .................................. 2011-151289
Feb. 1, 2012 (JP) .................................. 2012-019529

(51) Int. Cl.
*G06K 9/00* (2006.01)
*G06Q 50/10* (2012.01)
(Continued)

(52) U.S. Cl.
CPC ........ *G06K 9/00268* (2013.01); *G06K 9/00201* (2013.01); *G06K 9/6247* (2013.01);
(Continued)

(58) Field of Classification Search
None
See application file for complete search history.

(56) References Cited

U.S. PATENT DOCUMENTS 5,748,865 A  5/1998  Yamamoto et al.
5,862,252 A  1/1999  Yamamoto et al.
(Continued)

FOREIGN PATENT DOCUMENTS

CN   101751551(a)   6/2010
JP      7 152928     6/1995
(Continued)

OTHER PUBLICATIONS

Nagata (Analysis of Facial Impressions Using Average Faces), pp. 29-35, 1998.*
(Continued)

*Primary Examiner* — Daniel Mariam
(74) *Attorney, Agent, or Firm* — Oblon, McClelland, Maier & Neustadt, L.L.P.

(57) ABSTRACT

The face impression analyzing device (100) includes a facial form acquiring unit (10), a face component analyzing unit (50), a face impression determining unit (60), and a storage unit (70). The facial form acquiring unit (10) acquires facial form information representing a form of a face surface of a subject. The storage unit (70) stores one or more feature values obtained by applying multivariate analysis to target population face information representing three-dimensional forms of facial surfaces of a target population formed by a plurality of persons, and tendency information indicating an impression tendency of a facial shape associated with each of the one or more feature values. The face component analyzing unit (50) calculates an amount of revelation of each of the one or more feature values of the face of the subject on the basis of the facial form information of the subject, and the feature value extracted from the target population face information. The face impression determining unit (60) refers to the storage unit (70), and acquires the impression tendency of the face of the subject or the degree of the impression tendency on the basis of the feature value of the face of the subject and the amount of revelation of the feature value.

37 Claims, 58 Drawing Sheets

(51) Int. Cl.
G06T 7/00 (2006.01)
G06K 9/62 (2006.01)

(52) U.S. Cl.
CPC ............ G06Q 50/10 (2013.01); G06T 7/0075 (2013.01); *G06K 2009/00322* (2013.01); *G06T 2207/10012* (2013.01); *G06T 2207/30201* (2013.01)

(56) References Cited

U.S. PATENT DOCUMENTS

2006/0020630 A1* 1/2006 Stager et al. ............... 707/104.1
2006/0257041 A1   11/2006 Kameyama et al.

FOREIGN PATENT DOCUMENTS

| JP | 2001 331791 | 11/2001 |
|---|---|---|
| JP | 2004 102359 | 4/2004 |
| JP | 2006 119040 | 5/2006 |
| JP | 2007 128171 | 5/2007 |
| JP | 2008 171074 | 7/2008 |
| JP | 2009 54060 | 3/2009 |
| JP | 2013-89032 A | 5/2013 |
| WO | WO 2011/017653 A1 | 2/2011 |

OTHER PUBLICATIONS

Nishino, F. et al., "Quantitative Analysis for Impression Expression of Facial Features and Its Application to Discrimination of Facial Attributes", IEICE Technical Report, vol. 104, No. 744, Total 8 Pages, (Mar. 17, 2005) (with English abstract).

International Search Report Issued Aug. 28, 2012 in PCT/JP12/004404 Filed Jul. 6, 2012.

Office Action in corresponding Chinese Patent Application No. 201280033752.7 dated Feb. 26, 2016.

* cited by examiner

FIG. 3

| PRINCIPAL COMPONENT | PERCENTAGE OF CONTRIBUTION % | ACCUMULATED PERCENTAGE OF CONTRIBUTION % |
|---|---|---|
| pca01 | 22.2 | 22.2 |
| pca02 | 16.1 | 38.3 |
| pca03 | 9.5 | 47.9 |
| pca04 | 8.9 | 56.8 |
| pca05 | 5.8 | 62.6 |
| pca06 | 5.2 | 67.8 |
| pca07 | 4.3 | 72.1 |
| pca08 | 3.6 | 75.7 |
| pca09 | 3.1 | 78.9 |
| pca10 | 2.5 | 81.4 |
| pca11 | 2.1 | 83.5 |
| pca12 | 2.0 | 85.5 |
| pca13 | 1.9 | 87.4 |
| pca14 | 1.4 | 88.8 |
| pca15 | 1.1 | 89.9 |

FIG. 4

| PRINCIPAL COMPONENT | ATTRIBUTE |
|---|---|
| pca01 | SIZE OF FACE |
| pca02 | DEGREE OF SWELLING OF LOWER FACE, BULGES OF BOTH SIDES OF NOSE + SAGGING OF PORTION BELOW NOSE |
| pca03 | HEIGHT OF GNATHION |
| pca04 | EXTENSION OF OCCIPUT, ORBIT WIDTH 1 |
| pca05 | FORWARD PROTRUSION OF FRONTAL REGION OF HEAD (FORWARD PROTRUSION OF MOUTH) |
| pca06 | HEIGHT OF TOTAL HEAD |
| pca07 | FRONT-REAR POSITION OF THE OUTSIDE OF THE ORBIT, AND EXTENSION OF PORTION UNDER NOSE |
| pca08 | ORBIT WIDTH 2 |
| pca09 | INWARD SAGGING OF PORTION ABOVE OUTER CANTHUS, AND DEGREE OF DEEPENING OF ANGULUS ORIS |
| pca10 | DISTORTION |
| pca11 | FORWARD PROTRUSION OF CENTRAL PORTION OF MOUTH, FLATNESS OF LOWER PORTION OF CHEEK BONES |
| pca12 | SWELLING OF LOWER JAW |
| pca13 | FAT BELOW EARS AND BELOW JAW |
| pca14 | DISTORTION OF HEAD |
| pca15 | DISTORTION OF FACE (TWIST) |

FIG. 8

| DIMENSION OF BASE | AESTHETIC TREATMENT METHODS |
|---|---|
| 2 | (i) HIGHLIGHTING UPPER PORTION OF CHEEKS<br>(ii) APPLYING BLUSH ON CHEEKS<br>(iii) HIDING NASOLABIAL SULCUS<br>(iv) INCREASING VOLUME OF TOP OF HAIR<br>(v) LIFTING CHEEKS THROUGH FACIAL EXERCISES |
| 3 | ... |
| 4 | ... |
| 5 | ... |
| 6 | ... |
| 7 | (i) APPLYING MAKEUP THAT MAKES ENTIRE FACE LOOK BRIGHT<br>(ii) APPLYING LIPSTICK TO UPPER LIP TO INCREASE IN THICKNESS |
| 8 | ... |
| 9 | (i) APPLYING MAKEUP THAT MAKES OUTER CANTHUS LIFT<br>(ii) HIDING NASOLABIAL SULCUS |
| 10 | ... |
| 11 | (i) HIDING DEPRESSION AT ANGULUS ORIS<br>(ii) CLEARLY DRAWING OUTLINE OF LIP<br>(iii) TIGHTENING FACIAL MUSCLE THROUGH FACIAL EXERCISES |
| 12 | ... |
| ... | ... |
| ... | ... |

FIG. 9
(a) 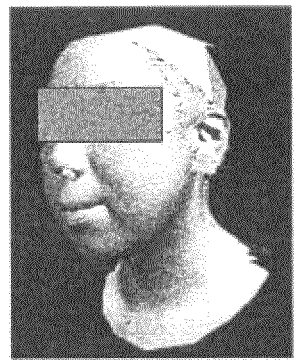
(b) 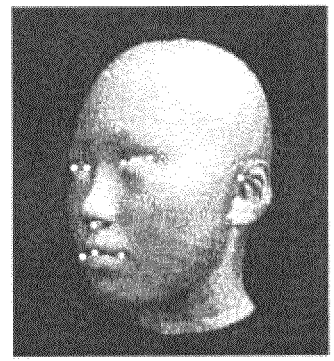
(c) 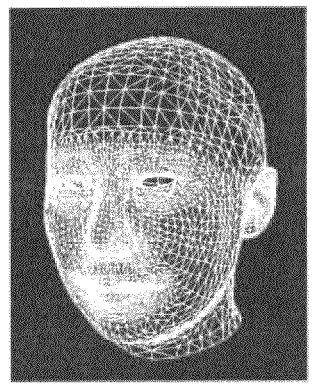

FIG. 11
(a) (b)
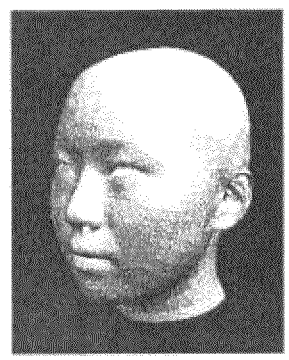
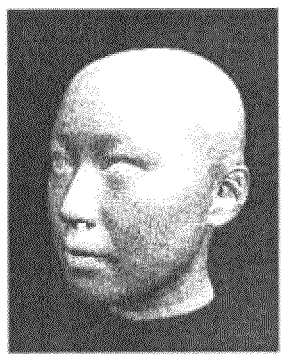
(c) (d) (e)
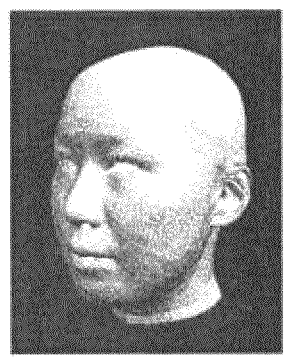
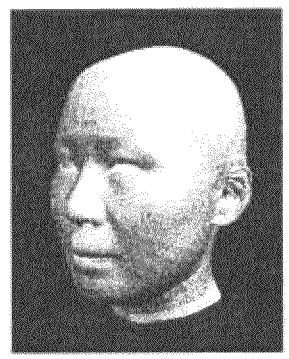
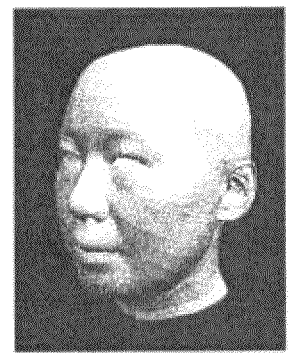

FIG. 12
(a) 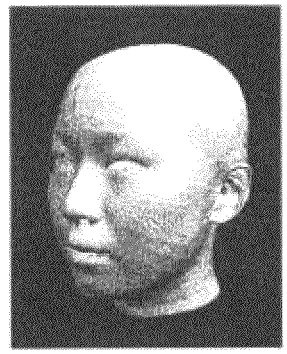
(b) 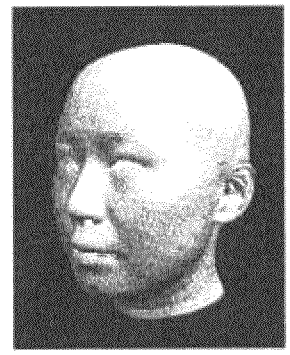
(c) 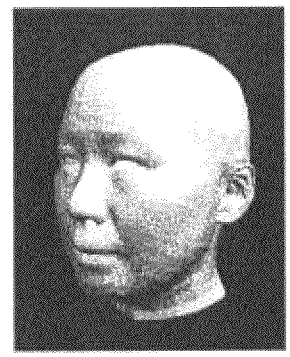

FIG. 13
(a) 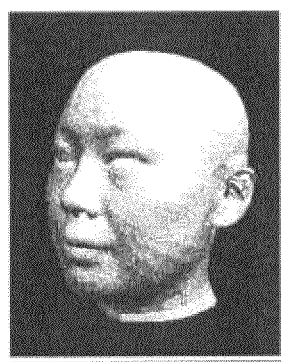
(b) 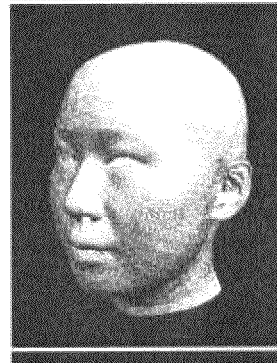
(c) 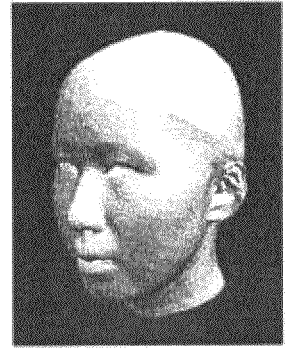

FIG. 14
(a) 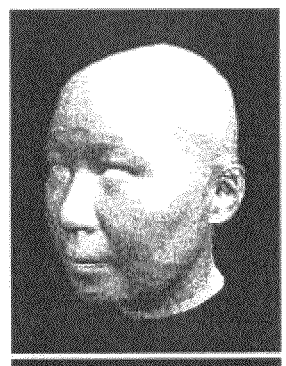
(b) 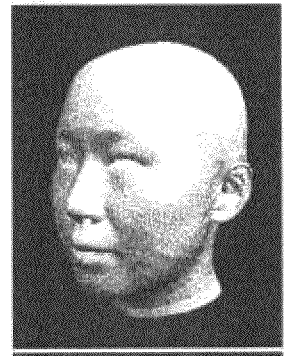
(c) 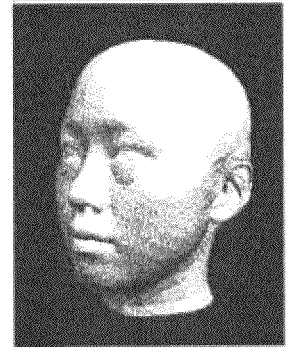

FIG. 15
(a) 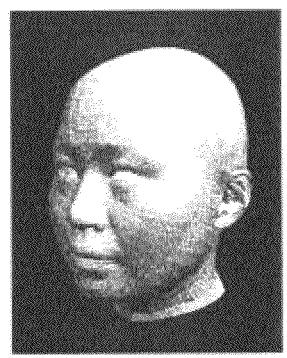
(b) 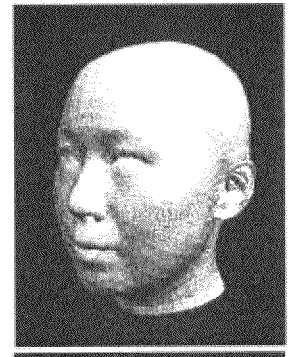
(c) 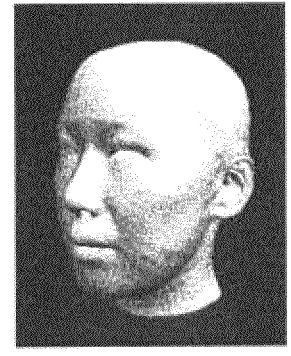

FIG. 16
(a) 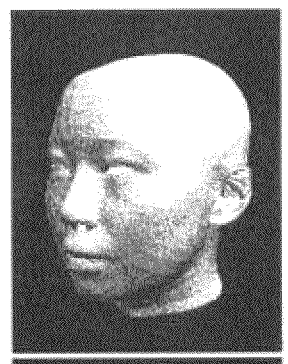
(b) 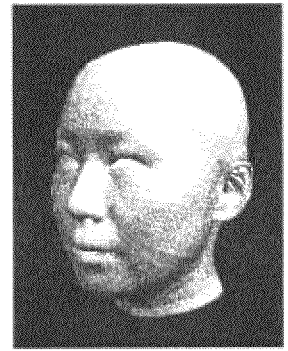
(c) 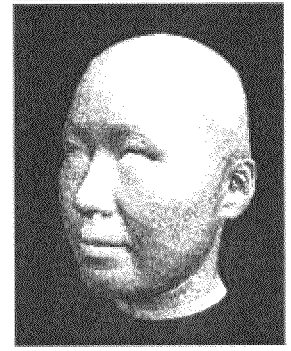

FIG. 17
(a) 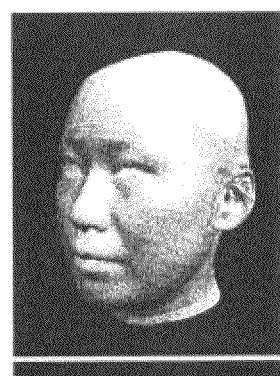
(b) 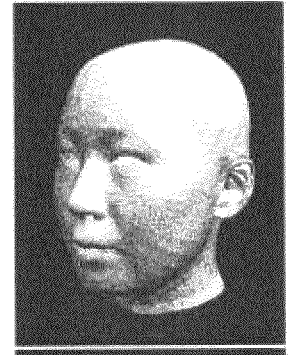
(c) 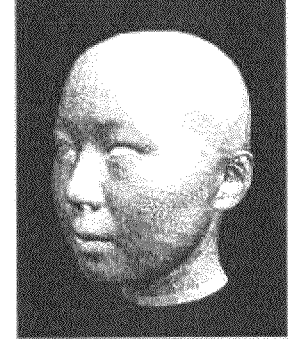

FIG. 18
(a) 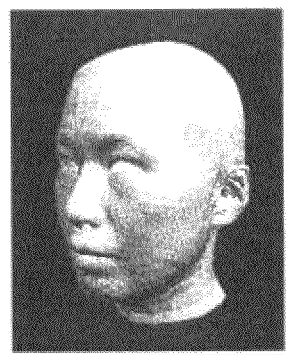
(b) 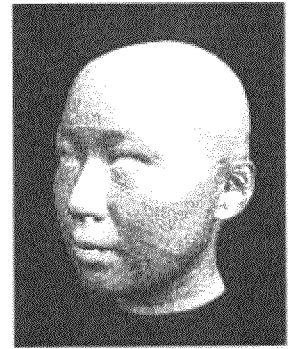
(c) 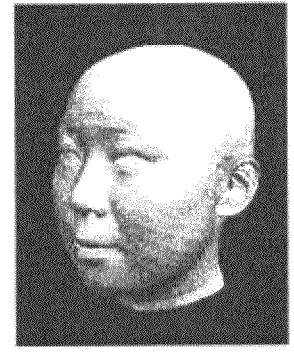

FIG. 19
(a) 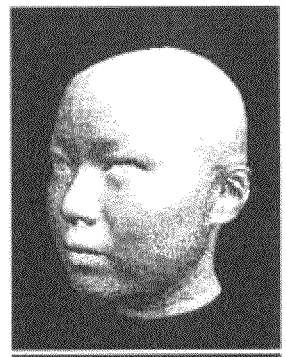
(b) 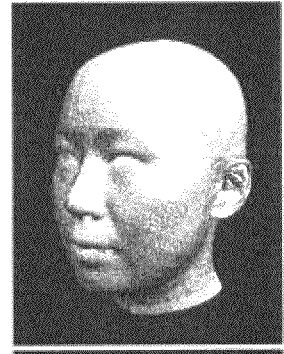
(c) 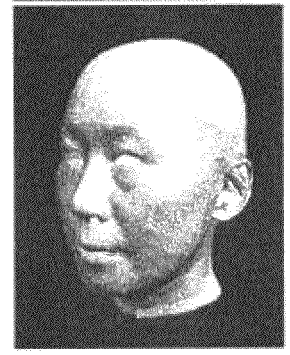

FIG. 20
(a) 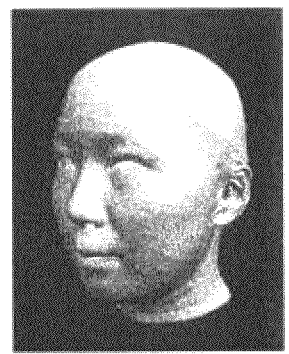
(b) 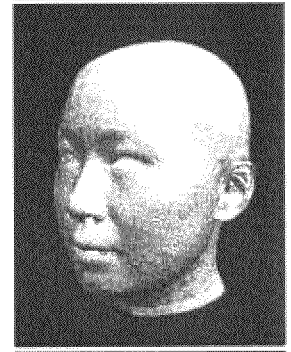
(c) 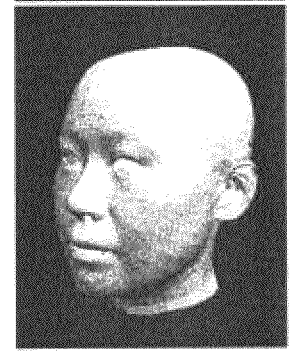

FIG. 21
(a) 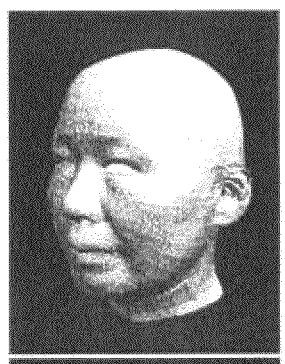
(b) 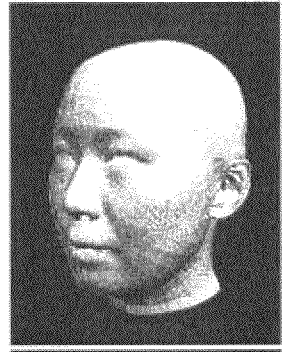
(c) 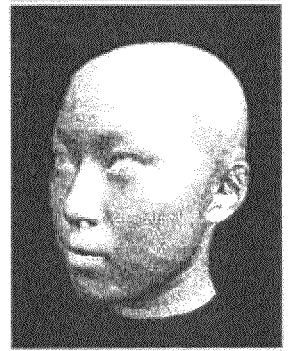

FIG. 22
(a) 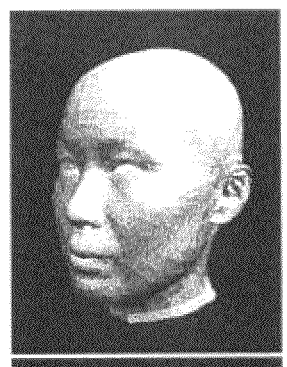
(b) 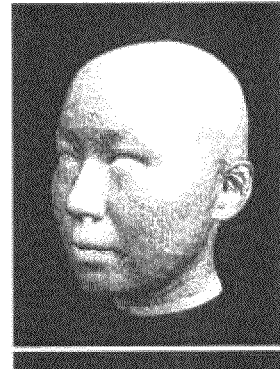
(c) 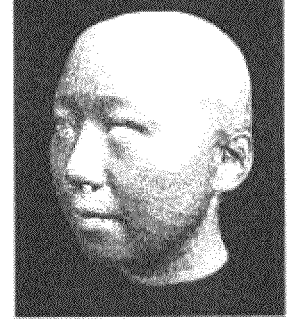

FIG. 23
(a) 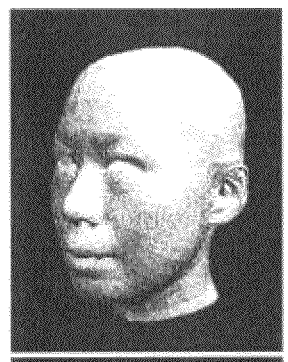
(b) 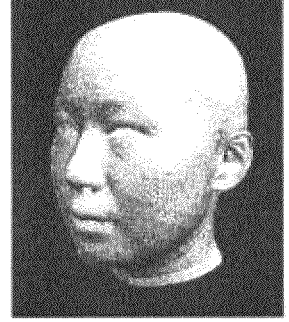
(c) 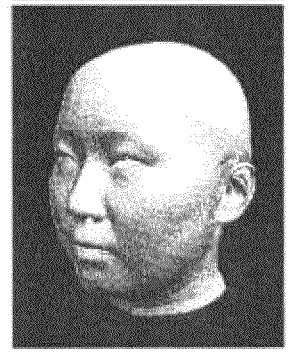

FIG. 24
(a) 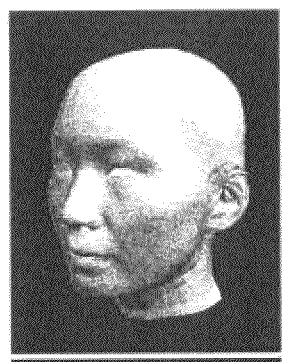
(b) 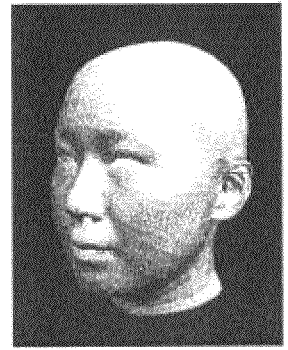
(c) 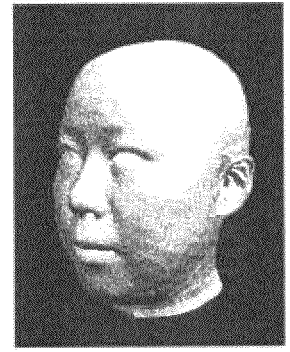

FIG. 25
(a) 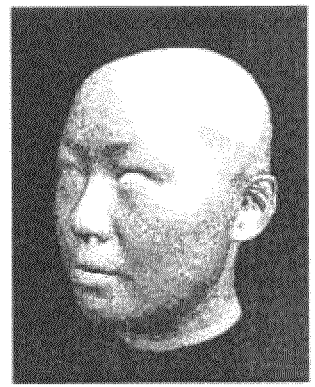
(b) 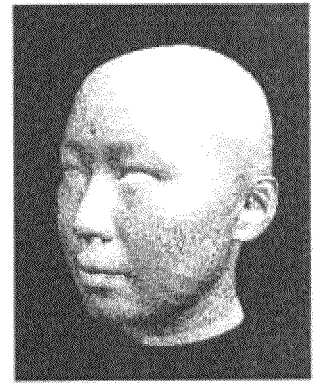
(c) 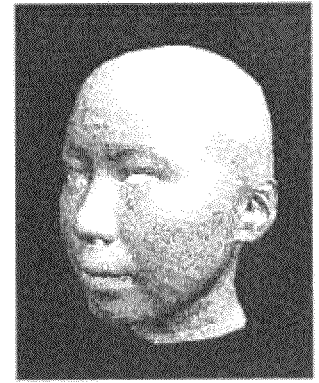

FIG. 26
(a) 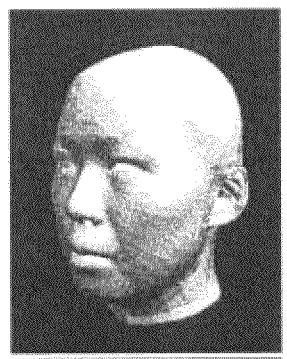
(b) 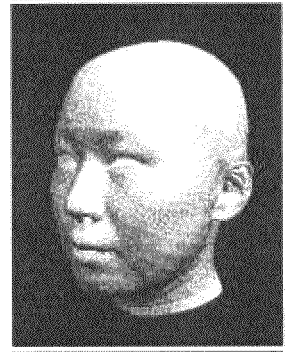
(c) 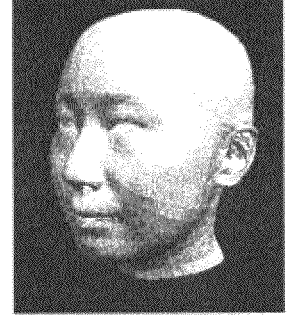

FIG. 27
(a) 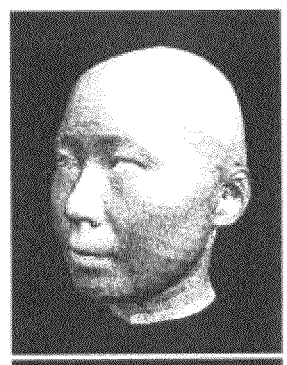
(b) 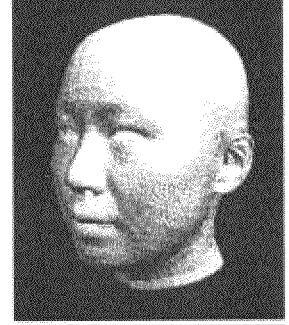
(c) 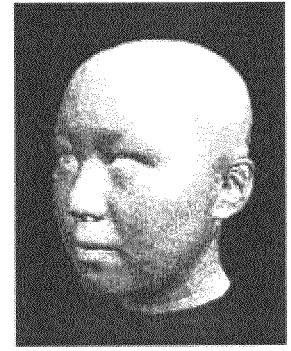

FIG. 28

| DIMENSION OF BASE | CORRELATION COEFFICIENT |
|---|---|
| 1 | −0.141 |
| 2 | −0.252 |
| 3 | 0.061 |
| 4 | 0.120 |
| 5 | −0.049 |
| 6 | −0.162 |
| 7 | 0.360 |
| 8 | 0.107 |
| 9 | −0.609 |
| 10 | −0.042 |
| 11 | −0.272 |
| 12 | 0.062 |
| 13 | −0.018 |
| 14 | −0.087 |
| 15 | −0.124 |

FIG. 29

| AGE | NUMBER OF PERSONS | AVERAGE AGE | pca01 | pca02 | pca03 | pca04 | pca05 |
|---|---|---|---|---|---|---|---|
| 20~40 | 20 | 31.7 | 2.14 | 11.62 | -3.06 | -5.17 | 4.46 |
| 41~69 | 30 | 54.2 | -1.43 | -7.75 | 2.04 | 3.45 | -2.97 |
| T-TEST | | | 0.83 | 0.16 | 0.64 | 0.41 | 0.37 |

| pca06 | pca07 | pca08 | pca09 | pca10 | pca11 | pca12 | pca13 |
|---|---|---|---|---|---|---|---|
| 4.60 | -8.70 | 1.98 | 14.51 | 0.70 | 3.95 | -2.14 | 0.73 |
| -3.07 | 5.80 | -1.32 | -9.67 | -0.46 | -2.63 | 1.43 | -0.49 |
| 0.33 | 0.04 | 0.62 | 0.00 | 0.83 | 0.19 | 0.47 | 0.80 |

FIG. 30

| DIMENSION OF BASE | CORRELATION COEFFICIENT |
|---|---|
| 1 | −0.142 |
| 2 | −0.272 |
| 3 | 0.030 |
| 4 | 0.112 |
| 5 | −0.078 |
| 6 | −0.142 |
| 7 | 0.366 |
| 8 | 0.030 |
| 9 | −0.585 |
| 10 | −0.086 |
| 11 | −0.260 |
| 12 | 0.043 |
| 13 | −0.005 |
| 14 | −0.081 |
| 15 | −0.164 |

FIG. 31
(a)      (b)      (c)
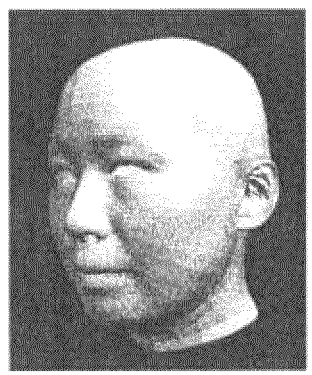 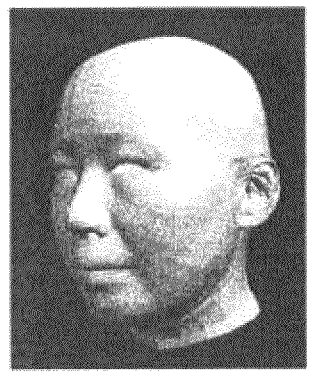 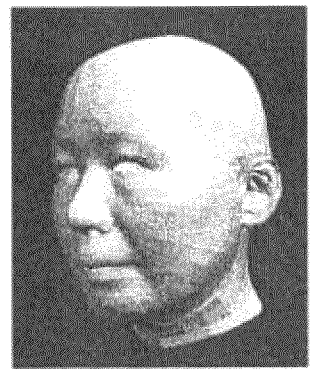
(d)      (e)      (f)
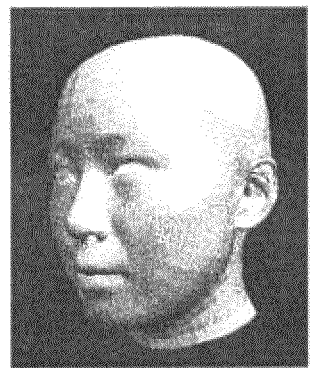 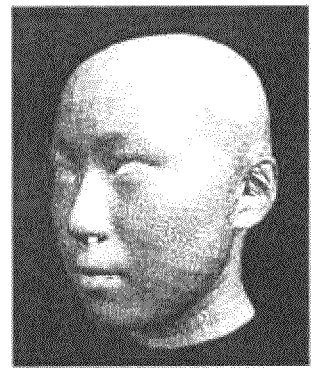 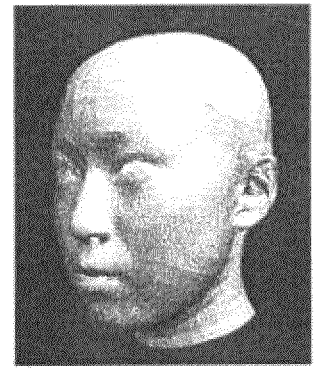

FIG. 33
(a) 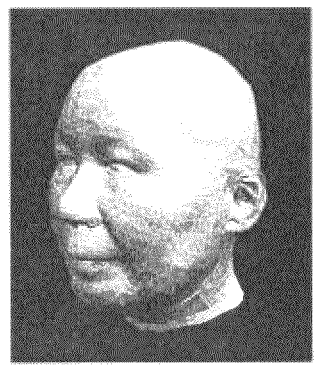  (b) 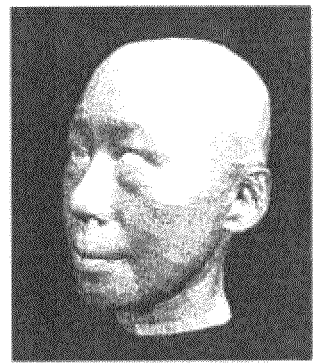
(c) 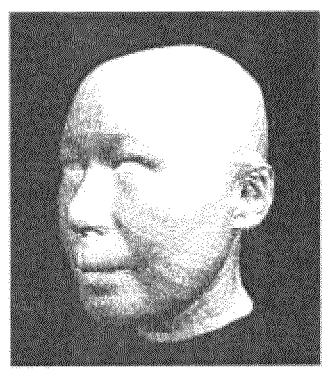  (d) 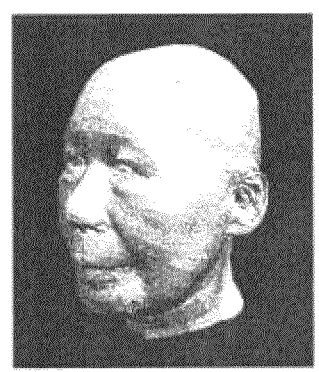

FIG. 34

| AGE GROUP | HAVING ONE FACTOR | HAVING TWO FACTORS | HAVING THREE FACTORS OR MORE | TOTAL NUMBER OF FACTORS |
|---|---|---|---|---|
| 20S | 3 SUBJECTS | 0 SUBJECT | 0 SUBJECT | 3 |
| 30S | 2 SUBJECTS | 1 SUBJECT | 0 SUBJECT | 4 |
| 40S | 2 SUBJECTS | 2 SUBJECTS | 0 SUBJECT | 6 |
| 50S | 7 SUBJECTS | 1 SUBJECT | 0 SUBJECT | 9 |
| 60S | 3 SUBJECTS | 6 SUBJECTS | 0 SUBJECT | 15 |

FIG. 35

| TYPE NUMBER | PERCENTAGE | DESCRIPTION | 40S | 50S | 60S |
|---|---|---|---|---|---|
| TYPE I | 40% | DIMENSIONS OTHER THAN 2nd-DIMENSION DEVELOP MIXED TYPE | 2 SUBJECTS | 2 SUBJECTS | 2 SUBJECTS |
| TYPE II | 36% | 2nd-DIMENSION OR 9th-DIMENSION DEVELOPS (DOES NOT DEVELOP IN 7th-DIMENSION OR 11th DIMENSION) LOWER-SWELLING TYPE | 2 SUBJECTS | 2 SUBJECTS | 1 SUBJECT |
| TYPE III | 17% | 2nd-DIMENSION OR 7th-DIMENSION DEVELOPS (DOES NOT DEVELOP IN 9th-DIMENSION) SLIM TYPE | 2 SUBJECTS | 0 SUBJECT | 2 SUBJECTS |
| TYPE IV | 7% | ONLY 2nd-DIMENSION OR 11th-DIMENSION DEVELOPS (DOES NOT DEVELOP IN 7th-DIMENSION) SLIM TYPE | 0 SUBJECT | 1 SUBJECT | 1 SUBJECT |

FIG. 36

| PRINCIPAL COMPONENT | PERCENTAGE OF CONTRIBUTION % | ACCUMULATED PERCENTAGE OF CONTRIBUTION % |
|---|---|---|
| pca01 | 19.7 | 19.7 |
| pca02 | 12.9 | 32.6 |
| pca03 | 8.1 | 40.6 |
| pca04 | 7.1 | 47.7 |
| pca05 | 6.7 | 54.4 |
| pca06 | 5.5 | 59.9 |
| pca07 | 3.9 | 63.8 |
| pca08 | 3.6 | 67.3 |
| pca09 | 3.0 | 70.3 |
| pca10 | 2.8 | 73.1 |
| pca11 | 2.3 | 75.4 |
| pca12 | 2.0 | 77.4 |
| ... | ... | ... |
| pca20 | 0.8 | 87.3 |

FIG. 37

| PRINCIPAL COMPONENT | ATTRIBUTE |
|---|---|
| pca01 | SIZE OF FACE, SWELLING OF LOWER FACE |
| pca02 | HEIGHT OF GNATHION |
| pca03 | INCLINATION OF ENTIRE HEAD IN FRONT-REAR DIRECTION |
| pca04 | WIDTH OF FACE AND HEAD |
| pca05 | LENGTH OF HEAD AND WIDTH OF HEAD |
| pca06 | WIDTH OF HEAD |
| pca07 | HEIGHT OF ENTIRE HEAD AND WIDTH OF FACE |
| pca08 | HEIGHT OF GNATHION |
| pca09 | RECESS OF ANGULUS ORIS IN FRONT-REAR DIRECTION, WIDTH OF NOSE, SAGGING OF OUTER CANTHUS |
| pca10 | ORBIT WIDTH AND CHEEK WIDTH, FRONT-REAR POSITION OF LOWER JAW |
| pca11 | ASYMMETRY OF WIDTH OF ORBIT |
| pca12 | RECESS OF ANGULUS ORIS IN VERTICAL DIRECTION, HEIGHT OF NOSE, SAGGING UNDER CHIN |
| ... | ... |
| pca16 | SWELLING OF LOWER CHEEK |
| ... | ... |
| pca20 | EXTENSION OF PORTION BELOW NOSE, SAGGING OF OUTER CANTHUS |
| ... | ... |
| pca26 | DEGREE OF EYE OPENING, SWELLING OF LOWER CHEEK |
| ... | ... |
| pca36 | DEGREE OF EYE OPENING |
| ... | ... |

FIG. 38

| DIMENSION OF BASE | CORRELATION COEFFICIENT |
|---|---|
| 1 | 0.231 |
| 2 | -0.006 |
| 3 | 0.075 |
| 4 | -0.082 |
| 5 | 0.172 |
| 6 | -0.073 |
| 7 | -0.195 |
| 8 | 0.072 |
| 9 | -0.361 |
| 10 | -0.389 |
| 11 | 0.106 |
| 12 | 0.316 |
| ... | ... |
| 20 | 0.260 |

|        |    | + | − | − | + | + |
|--------|----|---|---|---|---|---|
| TYPE I | n  | 1 | 9 | 10 | 12 | 20 |
| all    | 39 | −0.142 | 0.263 | 0.229 | 0.992 | −0.285 |
| 24−46  | 20 | −0.415 | 0.708 | 0.342 | 0.824 | −0.330 |
| 46−65  | 19 | 0.145 | −0.206 | 0.109 | 1.168 | −0.237 |
| F-TEST |    | 0.152 | 0.433 | 0.055 | 0.080 | 0.112 |
| T-TEST |    | 0.093 | 0.000 | 0.440 | 0.106 | 0.697 |

(b)

|         |    | + | − | − | + | + |
|---------|----|---|---|---|---|---|
| TYPE II | n  | 1 | 9 | 10 | 12 | 20 |
| all     | 38 | 0.075 | −0.088 | 0.685 | −0.052 | 0.942 |
| 22−45   | 19 | −0.424 | 0.105 | 1.200 | −0.421 | 0.406 |
| 46−68   | 19 | 0.574 | −0.280 | 0.169 | 0.317 | 1.478 |
| F-TEST  |    | 0.788 | 0.032 | 0.089 | 0.326 | 0.018 |
| T-TEST  |    | 0.005 | 0.168 | 0.001 | 0.005 | 0.000 |

(c)

|          |    | + | − | − | + | + |
|----------|----|---|---|---|---|---|
| TYPE III | n  | 1 | 9 | 10 | 12 | 20 |
| all      | 38 | 0.310 | 0.577 | −0.832 | −0.521 | −0.137 |
| 21−46    | 19 | 0.165 | 1.004 | −0.456 | −0.799 | −0.306 |
| 47−63    | 19 | 0.454 | 0.151 | −1.208 | −0.243 | 0.032 |
| F-TEST   |    | 0.357 | 0.650 | 0.496 | 0.706 | 0.818 |
| T-TEST   |    | 0.352 | 0.003 | 0.001 | 0.069 | 0.216 |

(d)

|         |    | + | − | − | + | + |
|---------|----|---|---|---|---|---|
| TYPE IV | n  | 1 | 9 | 10 | 12 | 20 |
| all     | 33 | −0.275 | −0.874 | −0.100 | −0.512 | −0.590 |
| 23−43   | 17 | −0.082 | −0.440 | 0.060 | −0.787 | −0.864 |
| 46−65   | 16 | −0.479 | −1.335 | −0.271 | −0.219 | −0.300 |
| F-TEST  |    | 0.087 | 0.602 | 0.317 | 0.754 | 0.413 |
| T-TEST  |    | 0.123 | 0.001 | 0.109 | 0.011 | 0.035 |

|  | PARTIAL REGRESSION COEFFICIENT |
|---|---|
| 9 | -0.387 |
| 12 | 0.410 |
| CONSTANT TERM | 40.032 |

(b)

|  | PARTIAL REGRESSION COEFFICIENT |
|---|---|
| 10 | -0.307 |
| 20 | 0.626 |
| CONSTANT TERM | 40.707 |

(c)

|  | PARTIAL REGRESSION COEFFICIENT |
|---|---|
| 9 | -0.212 |
| 10 | -0.326 |
| CONSTANT TERM | 43.454 |

(d)

|  | PARTIAL REGRESSION COEFFICIENT |
|---|---|
| 9 | -0.495 |
| CONSTANT TERM | 34.730 |

FIG. 42
(a) 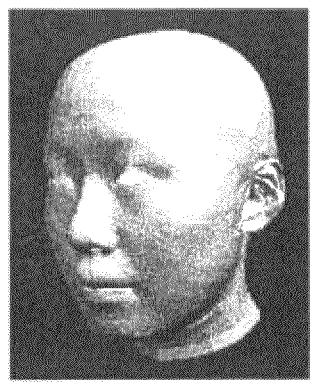
(b) 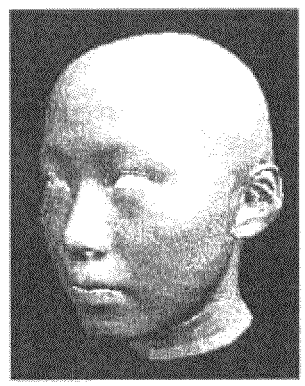
(c) 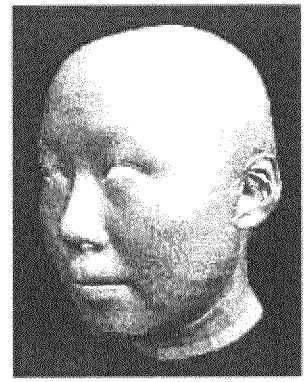

FIG. 43
(a) 
(b) 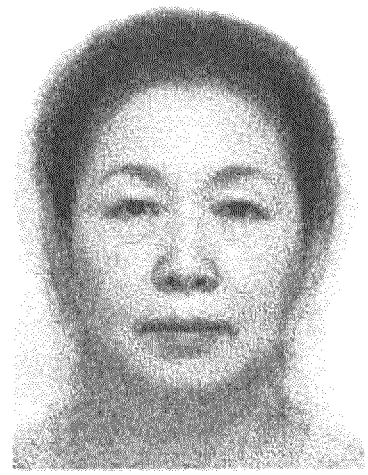

FIG. 44
(a) 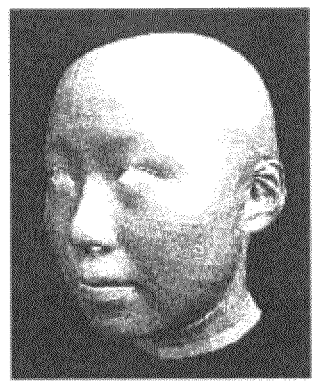
(b) 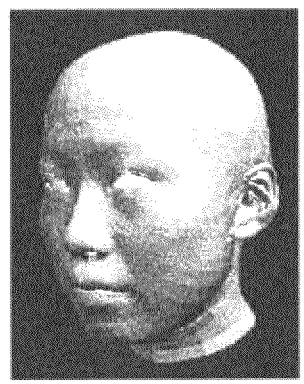
(c) 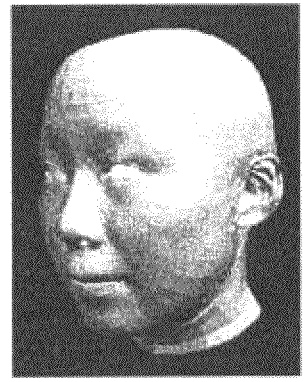

FIG. 45
(a) 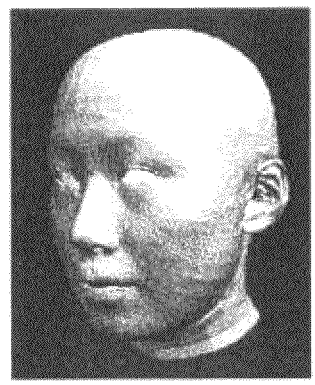
(b) 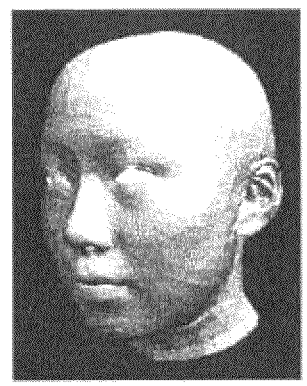
(c) 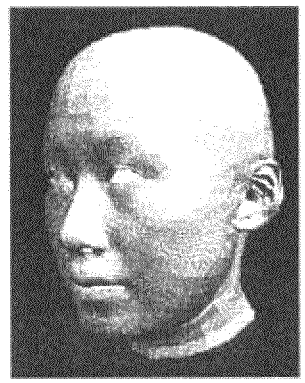

FIG. 46
(a) 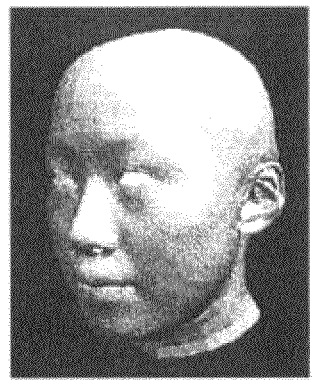
(b) 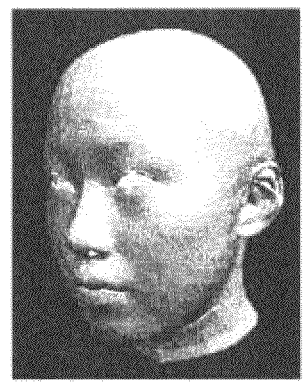
(c) 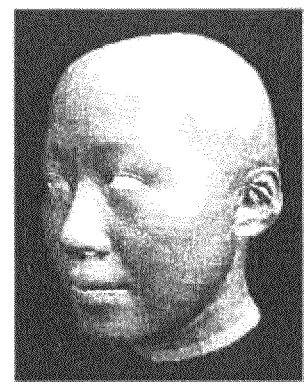

FIG. 47

| DIMENSION OF BASE | CORRELATION COEFFICIENT |
|---|---|
| 1 | 0.128 |
| * 2 | 0.180 |
| 3 | -0.022 |
| 4 | -0.082 |
| 5 | -0.002 |
| 6 | -0.031 |
| ** 7 | -0.285 |
| ** 8 | 0.399 |
| 9 | -0.092 |
| ** 10 | -0.219 |
| * 11 | 0.200 |
| 12 | 0.093 |
| 13 | 0.068 |
| 14 | 0.062 |
| 15 | 0.055 |
| 16 | -0.095 |
| 17 | -0.140 |
| 18 | 0.041 |
| 19 | -0.047 |
| 20 | -0.100 |
| 21 | 0.084 |
| * 22 | -0.179 |
| 23 | -0.024 |
| 24 | 0.042 |
| 25 | -0.031 |
| 26 | 0.011 |
| 27 | -0.109 |
| 28 | -0.030 |
| 29 | -0.041 |
| 30 | 0.135 |
| 31 | -0.071 |
| 32 | 0.012 |
| 33 | -0.123 |
| 34 | -0.095 |
| 35 | 0.156 |
| 36 | -0.063 |
| 37 | -0.047 |

FIG. 48
(a)
(b)

FIG. 49

| CLUSTER | APPARENT AGE | DEGREE OF HAVING AN ADULT FACE | PC07 | PC08 | PC10 |
|---|---|---|---|---|---|
| 1 | 40.3 | 2.9 | -8.6 | -22.9 | 8.4 |
| 2 | 44.2 | 3.4 | -16.6 | 11.9 | -7.6 |
| 3 | 42.2 | 3.3 | 17.3 | 22.7 | 3.8 |
| 4 | 40.5 | 3.0 | 22.9 | -13.2 | -7.3 |

FIG. 50
(a)  (b) 
(c)  (d) 

FIG. 51

| DIMENSION OF BASE | CORRELATION COEFFICIENT |
|---|---|
| ** 1 | 0.408 |
| 2 | 0.156 |
| 3 | -0.100 |
| 4 | -0.123 |
| 5 | 0.127 |
| 6 | -0.112 |
| 7 | -0.125 |
| * 8 | 0.167 |
| 9 | 0.028 |
| 10 | 0.147 |
| ** 11 | 0.214 |
| * 12 | 0.184 |
| 13 | -0.093 |
| 14 | -0.135 |
| 15 | 0.107 |
| ** 16 | 0.274 |
| 17 | 0.018 |
| 18 | 0.012 |
| 19 | 0.074 |
| 20 | -0.058 |
| 21 | -0.089 |
| 22 | 0.009 |
| 23 | 0.028 |
| 24 | -0.020 |
| 25 | -0.041 |
| * 26 | -0.207 |
| 27 | 0.079 |
| 28 | 0.093 |
| 29 | -0.008 |
| 30 | 0.181 |
| 31 | 0.068 |
| 32 | -0.085 |
| 33 | 0.012 |
| 34 | -0.086 |
| 35 | 0.062 |
| 36 | 0.061 |
| 37 | 0.015 |

FIG. 52
(a)
(b)

FIG. 53

| CLUSTER | APPARENT AGE | IMPRESSION OF HAVING LARGE FACE | PC01 | PC11 | PC16 |
|---|---|---|---|---|---|
| 1 | 40.2 | 3.1 | −35.0 | 3.5 | 10.6 |
| 2 | 41.2 | 3.2 | 37.5 | −11.5 | 2.4 |
| 3 | 41.0 | 2.6 | −28.5 | −9.2 | −13.1 |
| 4 | 46.6 | 3.4 | 38.3 | 20.1 | −3.7 |

FIG. 55

| DIMENSION OF BASE | CORRELATION COEFFICIENT |
|---|---|
| * 1 | -0.135 |
| 2 | -0.156 |
| 3 | -0.023 |
| 4 | 0.021 |
| 5 | 0.087 |
| 6 | -0.040 |
| 7 | 0.006 |
| 8 | 0.128 |
| 9 | 0.130 |
| 10 | 0.124 |
| 11 | -0.065 |
| ** 12 | -0.234 |
| * 13 | 0.201 |
| 14 | 0.063 |
| 15 | -0.055 |
| 16 | 0.032 |
| 17 | -0.150 |
| * 18 | 0.192 |
| 19 | 0.032 |
| * 20 | -0.173 |
| 21 | 0.054 |
| 22 | 0.110 |
| 23 | -0.034 |
| 24 | 0.077 |
| 25 | 0.019 |
| ** 26 | 0.241 |
| 27 | 0.003 |
| 28 | -0.047 |
| 29 | -0.029 |
| 30 | -0.084 |
| 31 | -0.075 |
| 32 | -0.040 |
| 33 | -0.148 |
| 34 | -0.002 |
| 35 | 0.056 |
| ** 36 | -0.261 |
| 37 | -0.198 |

FIG. 56
(a)
(b)

FIG. 57

| CLUSTER | APPARENT AGE | IMPRESSION OF HAVING LARGE EYES | PC12 | PC26 | PC36 |
|---|---|---|---|---|---|
| 1 | 46.7 | 2.9 | 17.6 | −2.4 | −1.8 |
| 2 | 40.3 | 3.3 | −7.6 | 6.9 | 3.2 |
| 3 | 42.4 | 2.8 | −5.8 | −8.7 | 3.3 |
| 4 | 36.6 | 3.6 | −9.1 | 3.5 | −5.7 |

FIG. 58
(a)
(b)
(c)
(d)

FACE IMPRESSION ANALYZING METHOD, AESTHETIC COUNSELING METHOD, AND FACE IMAGE GENERATING METHOD

CROSS REFERENCE TO RELATED APPLICATION

This application is a 371 of PCT/JP2012/004404, filed on Jul. 6, 2012, and claims priority to the following Japanese Patent Applications: 2011-151289, filed on Jul. 7, 2011; and 2012-019529, filed on Feb. 1, 2012.

TECHNICAL FIELD

The present invention relates to a face impression analyzing method, an aesthetic counseling method using it, a face image generating method, a face impression analyzing device that realizes the face impression analyzing method, and a face impression analyzing system.

BACKGROUND ART

As an example of conventional aesthetic counseling methods, an average face prepared for each age group and the face of a subject, which is a customer, are compared, and by using an index formed by the results of examining the comparison, changes in facial features of the subject with age are qualitatively obtained. However, such an index is not quantitatively obtained, and quantitative judgment as to the degree of change in the facial features of the subject in relation to aging largely depends on the personal viewpoint of a counselor.

For middle-aged and elderly females and many other subjects, "looking younger" is the first "impression that they want to give to others." In particular, these middle-aged and elderly people, regardless of gender, are highly interested in "keeping themselves looking younger than his or her actual age."

Thus, it is considered that it is highly useful to quantify factors in the face (facial feature) of a subject that determines the impression of aging. This is because it is considered that, by performing quantification as to whether the apparent age, determined by the impression based on the facial shape of the subject, is younger than the actual age, it is possible to provide aesthetic treatments such as makeup and aesthetic massage that, at the finish of the treatment, the subject can be highly satisfied with.

Further, other than "looking younger," young females want to appear to have a "small face" and an "adult face" as the "impression that they want to give to others." The term "adult face" is opposed to the term "baby face," and represents a degree to which the facial feature looks adult. The degree to which they have an adult face and the apparent age is different ideas. The apparent age relates to an index indicating how old the subject looks. The degree of adult face is irrelevant to the apparent age, and relates to an index indicating whether the facial feature of the subject looks adult-like or child-like.

Patent Document 1 describes a method of estimating a change in the subject's face with age using a two-dimensional image of the face of a subject. Patent Document 1 describes generating an average face for each age group on the basis of a large number of two-dimensional images, setting, as factors, the size or position of, for example, the facial form, the upper eyelid, the angulus oris, the nasolabial sulcus, and the lower jaw, and comparing the average face and the subject's face.

Patent Document 2 describes measuring three-dimensional form information on the head including the face using a device, calculating a distribution of curvature of the curved surface at each point on the face, and evaluating the form of the face.

Patent Document 3 describes a calculation method of generating a homologous model in which three-dimensional form models of the heads of humans each has the number of data points (number of vertexes) and topology consistent with each other, so that multivariate analysis such as principal component analysis can be performed with the relatively small amount of data. In other words, Patent Document 3 relates to a method of generating a homologous model.

Patent Document 4 describes applying the principal component analysis to the form feature vectors of the two-dimensional image of the front view of the subject's face to obtain the first principal component, changing the eigenvalues of this first principal component, thereby reconfiguring the image. With this method, it is possible to change the apparent age and facial expression of the image of the subject's face, and the body shape of the subject.

RELATED DOCUMENT

Patent Document

Patent Document 1: Japanese Patent Application Laid-open No. 2001-331791
Patent Document 2: Japanese Patent Application Laid-open No. 2009-054060
Patent Document 3: Japanese Patent Application Laid-open No. 2008-171074
Patent Document 4: Japanese Patent Application Laid-open No. 2004-102359

SUMMARY OF THE INVENTION

A face impression analyzing method according to the present invention calculates, on the basis of facial form information and one or more feature values, an amount of revelation of each of one or more feature values in the face of a subject, and obtains a degree of an impression tendency of the facial shape of the subject on the basis of the amount of revelation. The facial form information is information representing a form of a facial surface of the subject. The feature value is obtained by applying multivariate analysis to target population face information representing three-dimensional forms of facial surfaces of a target population formed by a plurality of persons.

A first aesthetic counseling method according to the present invention is an aesthetic counseling method using the face impression analyzing method described above, and outputs aesthetic information associated in advance with the feature value having the calculated amount of revelation more than or equal to a predetermined value.

The second aesthetic counseling method according to the present invention is an aesthetic counseling method using the face impression analyzing method described above, and includes classifying the target population into plural groups according to a degree of match of tendencies of plural weighting factors related to plural base vectors having a high correlation with the impression tendency, obtaining a group to which the subject belongs according to the amount of revelation of the subject, and outputting aesthetic information associated in advance with the group to which the subject belongs.

The face image generating method according to the present invention calculates, on the basis of facial form information and one or more feature values, an amount of revelation of the feature value of the face of a subject, changes the amount of revelation in the facial form information, and generates an impression changed image in which an impression tendency of the facial shape of the subject is changed on the basis of the changed facial form information. The facial form information is information representing a form of a facial surface of the subject. The feature value is obtained by applying multivariate analysis to target population face information representing three-dimensional forms of facial surfaces of a target population formed by a plurality of persons.

A face impression analyzing device according to the present invention includes a facial form acquiring unit, a storage unit, a face component analyzing unit, and a face impression determining unit. The facial form acquiring unit is a unit that acquires facial form information representing a form of a facial surface of a subject. A storage unit is a unit that stores one or more feature values obtained by applying multivariate analysis to target population face information representing three-dimensional forms of facial surfaces of a target population formed by a plurality of persons, and tendency information indicating an impression tendency of a facial shape associated with the feature value. The face component analyzing unit is a unit that calculates an amount of revelation of the feature value of the face of the subject on the basis of the facial form information and the feature value. The face impression determining unit is a unit that refers to the storage unit, and acquires the impression tendency or the degree of the impression tendency on the basis of the feature value and the amount of revelation.

A face impression analyzing system according to the present invention includes a receiving unit, a storage unit, a face component analyzing unit, a face impression determining unit, and a transmitting unit. The receiving unit is a unit that receives facial form information representing a form of a facial surface of a subject through a network. The storage unit is a unit that stores one or more feature values obtained by applying multivariate analysis to target population face information representing three-dimensional forms of facial surfaces of a target population formed by a plurality of persons, and tendency information indicating an impression tendency of a facial shape associated with the feature value. The face component analyzing unit is a unit that calculates an amount of revelation of the feature value of the face of the subject on the basis of the facial form information and the feature value. The face impression determining unit is a unit that refers to the storage unit, and acquires the impression tendency or the degree of the impression tendency on the basis of the feature value and the amount of revelation. The transmitting unit is a unit that transmits output information indicating the acquired impression tendency or the acquired degree of the impression tendency through a network.

In the present invention, the impression tendency of the facial shape represents an attribute related to the appearance of the face that others receive from a three-dimensional form of all or part of the face. The degree of the impression tendency of the facial shape represents the degree of saliency of the attribute.

BRIEF DESCRIPTION OF THE DRAWINGS

The above-described object and other objects of the present invention, and features and advantages of the present invention will be made further clear by the preferred exemplary embodiments described below and the following drawings attached thereto.

FIG. 3 is a table showing results of principal component analysis concerning target population analysis models in the first exemplary embodiment and Example 1.

FIG. 4 is a table showing features of changes in forms in association with first to fifteenth principal components that correspond to analysis results shown in FIG. 3.

FIG. 8 is a table showing aesthetic information.

FIG. 9($a$) is a diagram illustrating three-dimensional optical data on the entire head of a subject, FIG. 9($b$) is a diagram illustrating 13 feature points, and FIG. 9($c$) is a diagram illustrating a generic model.

FIG. 11($a$) to FIG. 11($e$) are diagrams illustrating average facial forms of subjects in age groups ranging from 20s to 60s.

FIG. 12($a$) is a diagram illustrating an average facial form of subjects in their 20s and 30s, FIG. 12($b$) is a diagram illustrating an average facial form of subjects in groups of subjects aged from their 20s to 60s, FIG. 12($c$) is a diagram illustrating an average facial form of subjects in their 50s and 60s.

FIG. 13($a$) is a perspective view illustrating a virtual form obtained by setting only the first principal component to −3σ, FIG. 13($b$) is a perspective view illustrating an entire average face, and FIG. 13($c$) is a perspective view illustrating a facial form obtained by setting only the first principal component to +3σ.

FIG. 14($a$) is a perspective view illustrating a virtual form obtained by setting only the second principal component to −3σ, FIG. 14($b$) is a perspective view illustrating an entire average face, and FIG. 14($c$) is a perspective view illustrating a facial form obtained by setting only the second principal component to +3σ.

FIG. 15($a$) is a perspective view illustrating a virtual form obtained by setting only the third principal component to −3σ, FIG. 15($b$) is a perspective view illustrating an entire average face, and FIG. 15($c$) is a perspective view illustrating a facial form obtained by setting only the third principal component to +3σ.

FIG. 16($a$) is a perspective view illustrating a virtual form obtained by setting only the fourth principal component to −3σ, FIG. 16($b$) is a perspective view illustrating an entire average face, and FIG. 16($c$) is a perspective view illustrating a facial form obtained by setting only the fourth principal component to +3σ.

FIG. 17($a$) is a perspective view illustrating a virtual form obtained by setting only the fifth principal component to −3σ, FIG. 17($b$) is a perspective view illustrating an entire average face, and FIG. 17($c$) is a perspective view illustrating a facial form obtained by setting only the fifth principal component to +3σ.

FIG. 18($a$) is a perspective view illustrating a virtual form obtained by setting only the sixth principal component to −3σ, FIG. 18($b$) is a perspective view illustrating an entire average face, and FIG. 18(c) is a perspective view illustrating a facial form obtained by setting only the sixth principal component to +3σ.

FIG. 19(a) is a perspective view illustrating a virtual form obtained by setting only the seventh principal component to −3σ, FIG. 19(b) is a perspective view illustrating an entire average face, and FIG. 19(c) is a perspective view illustrating a facial form obtained by setting only the seventh principal component to +3σ.

FIG. 20(a) is a perspective view illustrating a virtual form obtained by setting only the eighth principal component to −3σ, FIG. 20(b) is a perspective view illustrating an entire average face, and FIG. 20(c) is a perspective view illustrating a facial form obtained by setting only the eighth principal component to +3σ.

FIG. 21(a) is a perspective view illustrating a virtual form obtained by setting only the ninth principal component to −3σ, FIG. 21(b) is a perspective view illustrating an entire average face, and FIG. 21(c) is a perspective view illustrating a facial form obtained by setting only the ninth principal component to +3σ.

FIG. 22(a) is a perspective view illustrating a virtual form obtained by setting only the tenth principal component to −3σ, FIG. 22(b) is a perspective view illustrating an entire average face, and FIG. 22(c) is a perspective view illustrating a facial form obtained by setting only the tenth principal component to +3σ.

FIG. 23(a) is a perspective view illustrating a virtual form obtained by setting only the eleventh principal component to −3σ, FIG. 23(b) is a perspective view illustrating an entire average face, and FIG. 23(c) is a perspective view illustrating a facial form obtained by setting only the eleventh principal component to +3σ.

FIG. 24(a) is a perspective view illustrating a virtual form obtained by setting only the twelfth principal component to −3σ, FIG. 24(b) is a perspective view illustrating an entire average face, and FIG. 24(c) is a perspective view illustrating a facial form obtained by setting only the twelfth principal component to +3σ.

FIG. 25(a) is a perspective view illustrating a virtual form obtained by setting only the thirteenth principal component to −3σ, FIG. 25(b) is a perspective view illustrating an entire average face, and FIG. 25(c) is a perspective view illustrating a facial form obtained by setting only the thirteenth principal component to +3σ.

FIG. 26(a) is a perspective view illustrating a virtual form obtained by setting only the fourteenth principal component to −3σ, FIG. 26(b) is a perspective view illustrating an entire average face, and FIG. 26(c) is a perspective view illustrating a facial form obtained by setting only the fourteenth principal component to +3σ.

FIG. 27(a) is a perspective view illustrating a virtual form obtained by setting only the fifteenth principal component to −3σ, FIG. 27(b) is a perspective view illustrating an entire average face, and FIG. 27(c) is a perspective view illustrating a facial form obtained by setting only the fifteenth principal component to +3σ.

FIG. 28 is a table showing correlation coefficients between a weighting factor for each dimension of base and an apparent age.

FIG. 29 is a table showing results of t-tests.

FIG. 30 is a table showing correlation coefficients between a weighting factor for each dimension of base and an actual age.

FIG. 31(a) to FIG. 31(f) are six images each obtained by varying the weighting factor of the ninth base vector from +1σ to +3σ and from −1σ to −3σ.

FIG. 33(a) to FIG. 33(d) are perspective views each illustrating a homologous model obtained by combining plural aging impression axes.

FIG. 34 is a table showing the number of aging impression axes owned by subjects in each target population formed by age groups between 20s and 60s, each of the age groups including 10 persons.

FIG. 35 is an example of a table showing groups of aging tendencies.

FIG. 36 is a table showing results of principal component analysis concerning a target population analysis model in Example 2.

FIG. 37 is a table showing features of changes in forms associated with first to twentieth principal components corresponding to results of analysis in FIG. 36.

FIG. 38 is a table showing correlation coefficients between a weighting factor for each dimension of base and an apparent age in Example 2.

FIG. 40(a) to FIG. 40(d) are tables each showing the average of the principal component scores for each of the aging factors related to the subjects in the type I to the type IV.

FIG. 41(a) to FIG. 41(d) are tables each showing partial regression coefficient and a constant term for each significant aging factor concerning subjects belonging to the type I to the type IV.

FIG. 42(a) is a perspective view illustrating an average facial form model of all the subjects belonging to the type I, FIG. 42(b) is a perspective view illustrating a state where the model in FIG. 42(a) is rejuvenated to 30 years old, and FIG. 42(c) is a perspective view illustrating a state where the model in FIG. 42(a) is aged to 60 years old.

FIG. 43(a) an elevation view illustrating an average face of 20 persons belonging to a younger age group in the type I, and FIG. 43(b) is an elevation view illustrating an average face of 19 persons belonging to an advanced age group in the type I.

FIG. 44(a) is a perspective view illustrating an average facial form model of all the subjects belonging to the type II, FIG. 44(b) is a perspective view illustrating a state where the average facial form model in FIG. 44(a) is rejuvenated to 30 years old, and FIG. 44(c) is a perspective view illustrating a state where the average facial form model illustrated in FIG. 44(a) is aged to 60 years old.

FIG. 45(a) is a perspective view illustrating an average facial form model of all the subjects belonging to the type III, FIG. 45(b) is a perspective view illustrating a state where the average facial form model illustrated in FIG. 45(a) is rejuvenated to 30 years old, and FIG. 45(c) is a perspective view illustrating a state where the average facial form model illustrated in FIG. 45(a) is aged to 60 years old.

FIG. 46(a) is a perspective view illustrating an average facial form model of all the subjects belonging to the type IV, FIG. 46(b) is a perspective view illustrating a state where the average facial form model illustrated in FIG. 46(a) is rejuvenated to 30 years old, and FIG. 46(c) is a perspective view illustrating the average facial form model illustrated in FIG. 46(a) is aged to 60 years old.

FIG. 47 is a table showing correlation coefficients between a weighting factor for each dimension of base and the degree of having an adult face in Example 3.

FIG. 48(a) illustrates an average face of 10 subjects with the highest degree of having an adult face of all the subjects in a target population. FIG. 48(b) illustrates an average face of 10 subjects with the highest degree of having a baby face of all the subjects in the target population.

FIG. 49 is a table showing results of cluster classification in Example 3.

FIG. 50 relate to Example 3, and FIG. 50(a) illustrates an average face of subjects belonging to a cluster 1. FIG. 50(b) illustrates an average face of subjects belonging to a cluster 2. FIG. 50(c) illustrates an average face of subjects belonging to a cluster 3. And, FIG. 50(d) illustrates an average face of subjects belonging to a cluster 4.

FIG. 51 is a table showing correlation coefficient between a weighting factor for each dimension of base and the degree of impression of having a smaller face in Example 4.

FIG. 52(a) illustrates an average face of 10 subjects with the least impression of having a smaller face of all the subjects in a target population. FIG. 52(b) illustrates an average face of 10 subjects with the largest impression of having a smaller face of all the subjects in the target population.

FIG. 53 is a table showing results of cluster classification in Example 4.

FIG. 54(a) illustrates an average face of subjects belonging to a cluster 1. FIG. 54(b) illustrates an average face of subjects belonging to a cluster 2. FIG. 54(c) is an average face of subjects belonging to a cluster 3. And, FIG. 54(d) illustrates an average face of subjects belonging to a cluster 4.

FIG. 55 is a table showing correlation coefficient between a weighting factor for each dimension of base and the degree of impression of the size of eyes in Example 5.

FIG. 56(a) illustrates an average face of 10 subjects with an impression of having the largest eyes of all the subjects in a target population. FIG. 56(b) illustrates an average face of 10 subjects with an impression of having the smallest eyes of all the subjects in the target population.

FIG. 57 is a table showing results of cluster classification in Example 5.

FIG. 58 relate to Example 5, and FIG. 58(a) illustrates an average face of subjects belonging to a cluster 1. FIG. 58(b) illustrates an average face of subjects belonging to a cluster 2. FIG. 58(c) illustrates an average face of subjects belonging to a cluster 3. And, FIG. 58(d) illustrates an average face of subjects belonging to a cluster 4.

DESCRIPTION OF EMBODIMENTS

Figure 1:
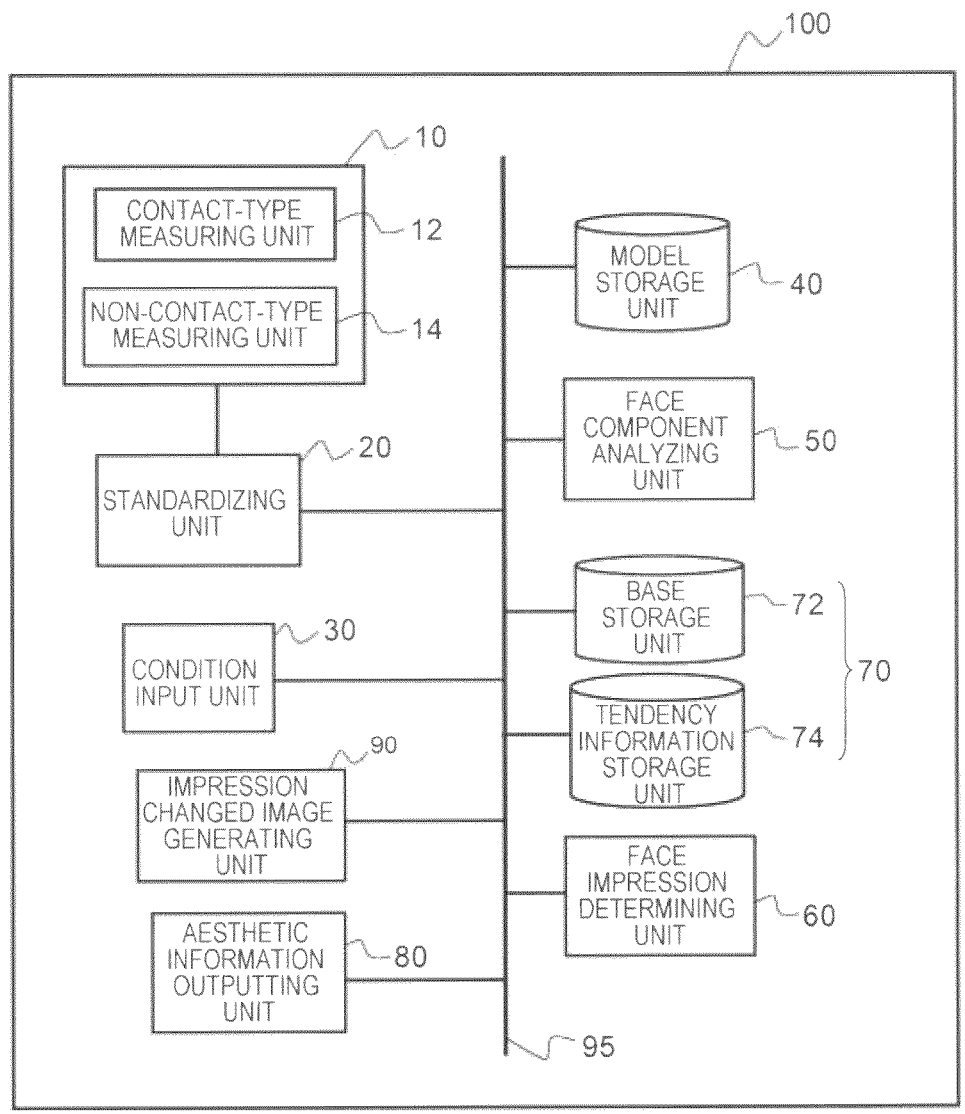
FIG. 1 is a functional block diagram illustrating a face impression analyzing device according to a first exemplary embodiment of the present invention.

Hereinbelow, exemplary embodiments according to the present invention will be described with reference to the drawings. Note that, in all the drawings, the same constituent components are denoted by the same reference numerals, and detailed explanation thereof will not be repeated.

First, the outline of the present invention will be described.

The method described in Patent Document 1 described above lacks the accuracy of estimation since it estimates how the face of a subject will change with age on the basis of modes of specific portions in the face. This is because the forms of faces slightly differ from subject to subject, and hence, it is difficult to universally estimate aging on the basis of the modes of the specific portions. With the method described in Patent Document 2, it is also difficult to accurately quantify the impression of the entire face of the subject.

Further, since the first principal component for the vector data of the form of the face largely contributes to the form, it is possible to vary the facial form of the subject by varying eigenvalues of the first principal component in a manner similar to the method described in Patent Document 4. However, the method described in Patent Document 4 cannot make an analysis in an accurate manner, and describes that no correlation can be found between the principal components each corresponding to a higher-dimension other than the first principal component and the apparent age, facial expression, body shape, or the like.

The exemplary embodiment according to the present invention provides a method of objectively evaluating the impression of the appearance of a subject's face in terms of changes in the form of the face, thereby obtaining information effective in accurately giving counseling such as advice on makeup.

The present inventor acquired three-dimensional forms of the surfaces of the faces from the target population formed by a plurality of persons, generated target population face information, applied multivariate analysis, which is a statistical analysis method, to this target population face information, and extracted base vectors. As a result, the present inventor found that several feature values (base vectors) have a high correlation with the impression tendency of the facial shape. On the basis of this finding, the present inventor reached the idea that the impression tendency of the subject can be made objective by quantitatively calculating how much these feature values develop in the facial form information on the subject.

With a face impression analyzing method and a face impression analyzing device according to the exemplary embodiments of the present invention, it is possible to objectively evaluate the impression of the appearance of a subject's face and obtain information effective in accurately giving counseling such as advice on makeup. Thus, with an aesthetic counseling method using the face impression analyzing method, it is possible to provide objective information on aesthetic for each subject. Further, with the face impression analyzing system according to the exemplary embodiments of the present invention, the subject can receive and acquire objective evaluation of the impression of their appearance by transmitting facial form information through a network.

In the descriptions of the face impression analyzing method and the aesthetic counseling method according to the present invention with reference to the exemplary embodiments, the order of plural processes are specified. However, the specification of the order of the processes does not necessarily limit the order or timing of the processes performed. When the face impression analyzing method and the aesthetic counseling method according to the present invention are performed, the order of the processes may be exchanged, provided that such exchange does not cause any technical impairment. Further, the plural processes may be performed at the same time or may be performed so as to partially overlap each other.

Constituent elements for realizing the face impression analyzing device and the face impression analyzing system according to the present invention are not limited to a specific hardware configuration, provided that these constituent elements realize the functions of the device and the system. For example, these constituent elements related to the present invention may be achieved by dedicated hardware having a predetermined function, a data processing device having a predetermined function performed by a computer program, a predetermined function achieved in a data processing device by a computer program, or a given combination thereof. More specifically, the present invention can be implemented by using, for example, hardware formed by general devices such as a central processing unit (CPU), a read only memory (ROM), a random access memory (RAM), and an I/F (interface) unit; dedicated logical circuits formed so as to achieve predetermined processing operations; and a combination thereof in a manner that can read a computer program and perform processing operations corresponding to the computer program.

The expression "constituent element of the present invention stores data" means that a device that implements the present invention has a function of storing data, and does not necessarily require that the data is actually being stored in the device.

First Exemplary Embodiment

FIG. 1 is a functional block diagram illustrating a face impression analyzing device 100 according to a first exemplary embodiment of the present invention.

First, an outline of this exemplary embodiment will be described.

The face impression analyzing device 100 includes a facial form acquiring unit 10, a face component analyzing unit 50, a face impression determining unit 60, and a storage unit 70.

The facial form acquiring unit 10 is a unit that acquires facial form information representing the form of a subject's face.

The storage unit 70 stores one or more feature values (base vectors) obtained by applying multivariate analysis to the target population face information representing three-dimensional forms of facial surfaces of a target population formed by a plurality of persons, and tendency information indicating an impression tendency of a facial shape associated with the feature value. The storage unit 70 according to this exemplary embodiment includes a base storage unit 72, and a tendency information storage unit 74. The base storage unit 72 is a unit that stores one or more feature values extracted from the target population face information, and a weighting factor (eigenvalue) for each dimension. The tendency information storage unit 74 is a unit that stores tendency information indicating the impression tendency of a facial shape.

The face component analyzing unit 50 is a unit that calculates an amount of revelation of the feature value related to the face of a subject on the basis of the facial form information on the subject and the feature value extracted from the target population face information.

The face impression determining unit 60 is a unit that refers to the storage unit 70 (tendency information storage unit 74), and acquires the impression tendency of the face of the subject or the degree thereof, on the basis of the feature value related to the face of the subject and the corresponding amount of revelation.

Below, the face impression analyzing device 100 according to this exemplary embodiment and a face impression analyzing method (hereinafter, also referred to as a first method) using the face impression analyzing device 100 will be described in detail.

The first method is a method of analyzing a tendency of an impression received from the appearance of the facial shape of a subject. In the first method, the degree to which others get an impression tendency from the facial shape of a subject is obtained on the basis of the facial form information of the subject, and a base vector obtained in a statistical manner. The facial form information is information indicating the form of the face of a subject, and more specifically, represents coordinate information on the three-dimensional form of a facial surface of the subject, namely, a customer. The base vector represents a feature value (eigenvector) obtained by applying multivariate analysis to the target population face information representing three-dimensional forms of facial surfaces of a target population face formed by a plurality of persons. This feature value includes at least one base vector of the high-degree base vectors each corresponding to a second-dimension or a higher-dimension having a high correlation with the impression tendency of the facial shape of a subject and extracted from the plural base vectors obtained through the multivariate analysis.

With the first method, on the basis of the facial form information on the subject and one or more base vectors, the amount of revelation of each of the base vectors of the face of the subject is calculated, and the degree of the impression tendency is obtained on the basis of the amount of revelation thus calculated.

Figure 2:
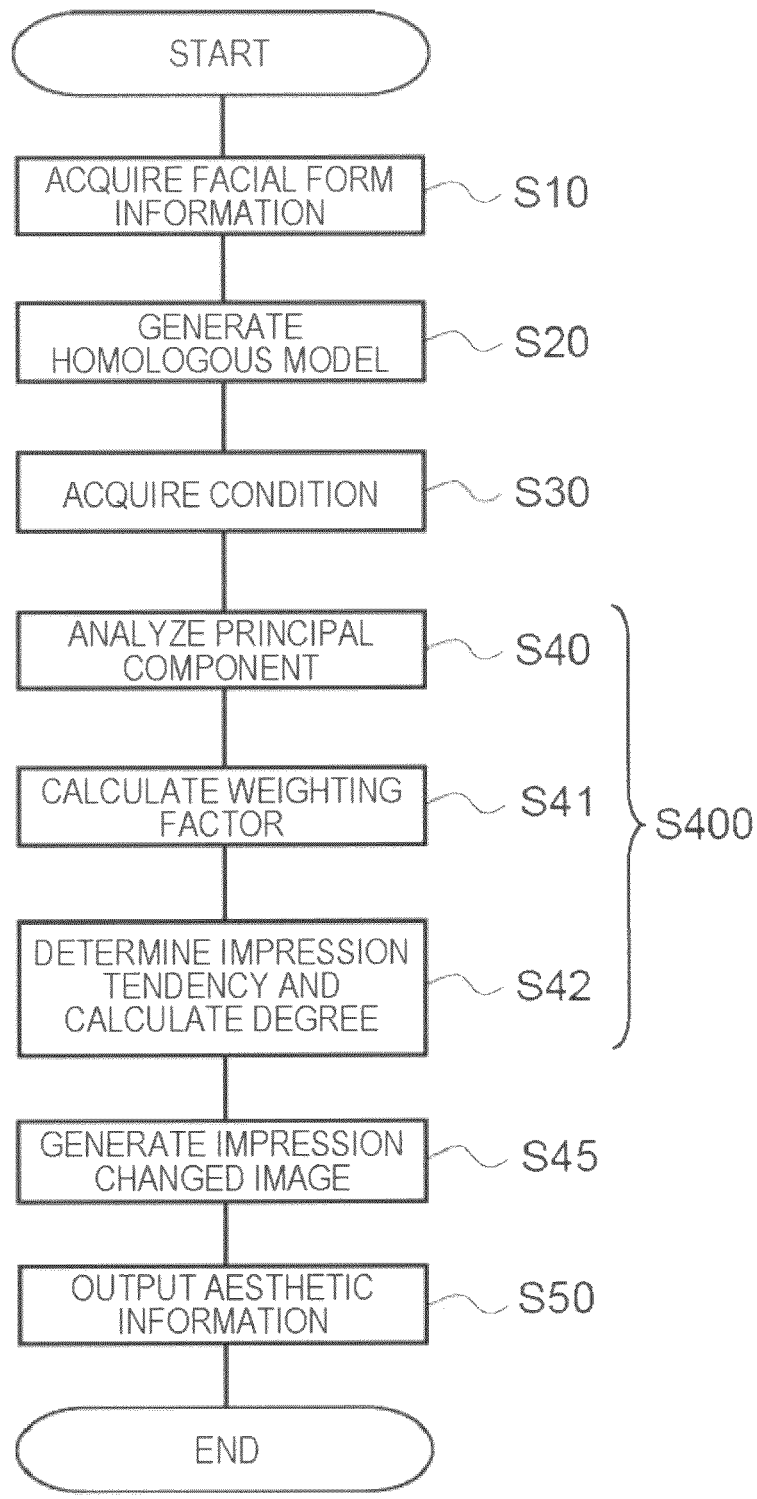
FIG. 2 is a flowchart showing a face impression analyzing method according to the first exemplary embodiment.

FIG. 2 is a flowchart showing the first method. With reference to FIG. 1 and FIG. 2, the face impression analyzing device 100 and the first method will be described in detail.

In addition to the facial form acquiring unit 10, the face component analyzing unit 50, the face impression determining unit 60, and the storage unit 70, the face impression analyzing device 100 further includes a standardizing unit 20, a condition input unit 30, a model storage unit 40, and an aesthetic information outputting unit 80. These units are connected to each other through a bus 95.

The face impression analyzing device 100 according to this exemplary embodiment is installed, for example, in sales stores for cosmetic products or service stores for aesthetic counseling. In the face impression analyzing device 100, the facial form acquiring unit 10 acquires the coordinate information on the three-dimensional form of the facial surface of the subject serving as a customer (FIG. 2: step S10).

More specifically, the facial form acquiring unit 10 is configured to include a contact-type measuring unit 12 and a non-contact-type measuring unit 14. The contact-type measuring unit 12 includes, for example, a contact-type three-dimensional digitizer that acquires a three-dimensional coordinate at a given position on the surface of the scalp by bringing its probe into contact with the scalp. The non-contact-type measuring unit 14 includes, for example, a three-dimensional laser scanner. Other non-contact-type measurements may include use of a lens focusing method or stereo method. These devices are commercially available non-contact measurement devices. However, as described in the second exemplary embodiment below, it may be possible to use, as the facial form acquiring unit 10, a calculating device that calculates a three-dimensional coordinate value on the basis of plural two-dimensional images.

More specifically, the facial form acquiring unit 10 according to this exemplary embodiment uses a contact-type three-dimensional digitizer to acquire, as the facial form information, the three-dimensional coordinate value of the surface of the head including the subject's face. More specifically, the facial form acquiring unit 10 uses the contact-type three-dimensional digitizer to acquire three-dimensional coordinate values concerning plural feature points on the surface of the head, and uses the non-contact three-dimensional measurement device to acquire the three-dimensional coordinate value of other points on the surface of the head of the subject.

In order to accurately measure the three-dimensional coordinates on the surface of the head without receiving the influence of the hair, it is preferable to use the contact-type measuring unit 12 to measure the three-dimensional coordinate in the region from the front to the rear of the head where the hair of head exists. It is preferable to use the non-contact-type measuring unit 14, which does not require a long measurement time, to measure the three-dimensional coordinate of the fore head and therebelow of the surface of the face where the influence of the hair does not exist. It may be possible to cover the hair of the subject with a protection item such as a net cap when the three-dimensional coordinate is measured with the non-contact-type measuring unit 14 in order to reduce the influence of the hair of head. In this case, the three-dimensional coordinate of the surface of the scalp can be measured only with an optical-type measurement device such as a three-dimensional laser scanner. With the non-contact-type measuring unit 14, it is possible to measure the large number of points of three-dimensional coordinates, which exceeds, for example, 100,000 points, from the surface of the head of the subject. Further, it is preferable to use the contact-type measuring unit 12 to measure the three-dimensional coordinates for some feature points on the surface of the subject's face in a highly accurate manner. These feature points include feature points on the surface of the skull (anatomical feature points) and the feature points on the surface of the skin. The anatomical feature points include, for example, the orbitale, the center of a supraorbital margin, the point located in the inner margin of an orbit, the porion, the nasal root point, and the zygion. The feature points on the surface of the skin include, for example, entocanthion, ectocanthion, tragion, otobasion superius, otobasion inferius, subnasale, pronasale, cheilion, stomion, and gonion. Note that the subject as used in this specification includes a customer, who is a target of the face impression analyzing method according to this exemplary embodiment, and a data provider who provides the three-dimensional coordinate value used for generating the target population face information. By sequentially applying the face impression analyzing method according to this exemplary embodiment to plural customers, the facial form information that has been acquired from the customers in the past is newly added to the target population face information, which will be provided to customers after this. Further, by measuring the three-dimensional coordinates at the feature points common to the large number of subjects, it is possible to standardize the three-dimensional form models with each other to obtain a homologous model. By using both the non-contact-type measurement device and the contact-type measurement device as described above, it is possible to acquire the three-dimensional coordinates on the surface of the scalp in a highly accurate manner. However, it may be possible to only use either one of the non-contact-type measurement device and contact-type measurement device to acquire the three-dimensional coordinates on the surface of the head including the face.

In the face impression analyzing device 100, the facial form acquiring unit 10 (contact-type measuring unit 12, non-contact-type measuring unit 14) measures the three-dimensional form model (facial form information) of the surface of the subject's face.

The standardizing unit 20 is a calculating unit used for converting the high-resolution three-dimensional form model having the large number of points acquired with the contact-type measuring unit 12 and the non-contact-type measuring unit 14 into a homologous model configured to have reduced points. The specific method of generating the homologous model is described in Patent Document 3. Before the first method is performed, the three-dimensional form model representing the large number of the forms of the heads including the surface of the subjects' faces is measured by using the facial form acquiring unit 10. By converting these pieces of facial form information into homologous models in which the number of data points (number of vertexes) and topology are consistent with each other, the standardizing unit 20 generates the target population face information (FIG. 2: step S20). The target population face information (target population analysis model) serving as the homologous model generated is stored in the model storage unit 40. The standardizing unit 20 converts the facial form information on the subjects into a homologous model having the number of data points (the number of vertexes) and the topology same as those of the target population analysis model.

The model storage unit 40 is a unit that stores the target population face information on persons in the target population used in the multivariate analysis. The model storage unit 40 further stores facial form information on the subject acquired by the facial form acquiring unit 10. Hereinafter, the three-dimensional form model indicating the form of the surface of the head including the subject's face is referred to as a subject analysis model. It is preferable that the model storage unit 40 stores a target population analysis model for each attribute such as a gender, an age group and a hometown or region.

The condition input unit 30 is a unit that receives various kinds of input from subjects or operators of the face impression analyzing device 100. For example, the condition input unit 30 receives attributes such as an age and gender of the subject, or designation of patterns of the impression tendency that the subject desires to analyze (FIG. 2: step S30). The face impression analyzing device 100 obtains the degree of the impression tendency of the facial shape of the subject on the basis of the dimension of the base vector and weighting factors (eigenvalues) common to the subject analysis model and the target population analysis model (FIG. 2: step S400).

The face component analyzing unit 50 selects a target population in accordance with the conditions received by the condition input unit 30, and performs multivariate analysis of the subject analysis model. For example, in the case where the subject is a female, the face component analyzing unit 50 extracts a homologous model having the gender category of female from the model storage unit 40, and generates a target population analysis model. This makes it possible to analyze the degree of the impression tendency of the facial shape of the subject with the target population being formed by females. Further, in the case where analysis is carried out to the target population with a more specific range, it may be possible to generate the target population analysis model by only extracting the homologous model of the subject with the same age group (for example, the age of the subject ±5 years old) in addition to the gender of the subject. In this case, it is possible to analyze the degree of the impression tendency of the facial shape of the subject with the target population being formed by females belonging to the age group same as the subject.

Plural examples may be given for the method of calculating the number of dimensions of the base vectors and the weighting factors on the basis of the facial form information on the subject. This exemplary embodiment employs a method of calculating feature values (base vectors) concerning the subject by applying multivariate analysis to the target population face information including the facial form information on the subject using the fact that the target population face information and the facial form information on the subject are homologous models common to each other. In this case, the target population includes sample providers of the forms of the faces and the subject serving as the target of the first method. Note that, as for another method, it may be possible to calculate, in advance, the base vectors by applying the multivariate analysis to a target population that does not contain the subject, as described in the second exemplary embodiment, then reproduce the facial form information on the subject using this calculated base vectors, thereby obtaining the weighting factors thereof.

During the multivariate analysis carried out by the face component analyzing unit 50, the homologous model (target population analysis model) of the target population containing the subject is subjected to a statistical process, and plural base vectors corresponding to plural dimensions are extracted. An example of the specific multivariate analysis includes principal component analysis (PCA). The face component analyzing unit 50 applies the principal component analysis to the forms of the faces concerning the target population analysis model, and calculates plural base vectors $e_i$ (hereinafter, i represents a natural number indicating a dimension) (FIG. 2: step S40). The base vectors $e_i$ can be obtained through eigenvector analysis of covariance matrix concerning the target population analysis model. The base vectors are at right angles to each other. Although the highest-dimension n of the base vectors is not specifically set, it is preferable to set the highest-dimension n in a manner such that all the base vectors having a predetermined percentage of contribution or greater (for example, 0.1% or more) are extracted, or the accumulated percentage of contribution of the first principal component and the principal components which correspond to higher-dimensions than the first principal component is a predetermined value or greater (for example, 95% or more).

FIG. 3 is a table showing an example of results of principal component analysis concerning the target population analysis model based on the target population formed by a total of 50 Japanese females in which 10 persons belong to each age group ranging from 20s to 60s. FIG. 3 shows a case where there are 15 pieces of base vectors with the percentage of contribution of 1% or more, which ranges from the first-dimension (pca01) to the fifteenth-dimension (pca15). In other words, the modes of the heads of the Japanese females in their 20s to 60s (hereinafter, referred to as a Japanese adult females) can be virtually described with 15 axes. These base vectors and the percentages of contribution are stored in the base storage unit 72.

It should be noted that, for the age group of 80s or more, the face impression is more likely to vary since it is generally said that the sizes of bones of the heads tend to reduce. Further, in general, for those in their ages up to mid-teens, the skeletal shapes are in their growth period, so the face impression is also more likely to vary. The change in the face impression resulting from the change in the bones as described above is less likely to appear in the principal component analysis of the three-dimensional form of the surface of the head, and hence, is excluded from this exemplary embodiment. Thus, the target population is set so as to be formed by those in their ages between 20s to 60s. This allows the advance of aging due to the effect of muscle or fat to be statistically extracted in an accurate manner.

The subject analysis model can be decomposed as shown in Equation 1 using the base vectors obtained from the target population analysis model. The character "$b_i$" represents weighting factors for the base vectors $e_i$. The average facial form represents a three-dimensional form obtained by averaging the forms of faces of the target population analysis models.

(Formula 1)

$$\text{Subject analysis model} = \text{average facial form} + b_1 \cdot \text{first base vector } e_1 + b_2 \cdot \text{second base vector } e_2 + b_3 \cdot \text{third base vector } e_3 + \ldots + b_k \cdot k\text{-th base vector } e_k + \ldots + b_n \cdot n\text{-th base vector } e_n \quad (1)$$

The face component analyzing unit 50 decomposes the subject analysis model into a linear combination of base vectors (principal components) common to the large number of the target population analysis models (FIG. 2: step S41). The weighting factors $b_i$ for the dimensions of the subject analysis models is stored in the base storage unit 72. Further, the face component analyzing unit 50 according to this exemplary embodiment can reproduce the subject analysis model in which a given weighting factor $b_i$ is changed. In other words, by varying a weighting factor $b_i$ for a given dimension, and performing multiplication and addition with the base vector $e_i$, it is possible to increase or decrease the effect of the base vector $e_i$ while maintaining a natural facial form of a subject.

FIG. 4 is a table showing how forms change in association with first to fifteenth principal components, which correspond to analysis results shown in FIG. 3. Each of the principal components will be specifically described in Examples below.

Figure 5:
FIG. 5 is an example of a table showing tendency information obtained from the analysis results shown in FIG. 3.

FIG. 5 shows an example of a table concerning tendency information PI stored in the tendency information storage unit 74. The tendency information PI is information in which one or more patterns of impression tendency and dimensions of bases each having a high correlation with the impression tendency are associated with each other. In this exemplary embodiment, the tendency information PI contains at least four patterns ranging from pattern 1 to pattern 4. The tendency information PI is information indicating impression factors that govern the impression tendency of the facial shape.

FIG. 5 shows examples of impression factors including the apparent age, actual age, the degree of adult face and baby face of a subject, and the degree of the impression of having a smaller face.

The pattern 1 shows that the second-dimension, the seventh-dimension, the ninth-dimension, and the eleventh-dimension are the dimensions of bases having a high correlation with the high-or-low of the apparent age of the subject (aging factor). As described later, as a result of a study made by the present inventor, it has been found that the apparent age of the subject can be increased by increasing or decreasing the weighting factors for the base vectors corresponding to these dimensions.

The pattern 2 shows that the increase or decrease of the actual age of the subject has a high correlation with the weighting factors for the base vectors corresponding to the second-dimension, the seventh-dimension, the ninth-dimension, and the eleventh-dimension. In other words, pattern 1 and pattern 2 show that the tendency of the apparent age and the tendency of the actual age are correlated with the base vectors corresponding to the common dimensions.

The pattern 3 shows that the impression tendency that the subject's face looks mature (adult face) or looks younger (baby face) is correlated with the weighting factor for the third base vector.

The pattern 4 shows that the impression tendency that the subject's face looks smaller (small face) is correlated with the weighting factors for the third and the twelfth base vectors.

In the case of analyzing the apparent age of the subject, the subject or user operates the condition input unit 30 to select and input the pattern 1. The condition input unit 30 receives the selection and input of the pattern 1. Further, in the first method, it may be possible to extract one or more impression tendencies to which the subject's face belongs from among all the patterns preset in the tendency information storage unit 74, rather than receiving the designation of the pattern of a given impression tendency from the subject or user. Yet further, although the condition acquiring step S30 is set before the principal component analysis step S40 in FIG. 2, the present invention is not limited to this sequential order. For example, it may be possible to perform the condition acquiring step S30 between the base calculating step S41 and the impression-tendency determining step S42.

In the tendency information PI, plus 1σ values are stored so as to be associated with each dimension of base in each of the patterns. In FIG. 5, specific values are not given. The plus 1σ value represents a top ranked score in the target population when scores, each having a plus/minus sign, of the weighting factors for the bases are arranged based on the order in which the tendencies of corresponding patterns (for example, an increase in the apparent age) become increasingly notable.

For example, the present inventor found that, of all the aging factors, the weighting factor for the seventh base vector has a tendency for the apparent age to increase if the score of the weighting factor has a plus sign and the absolute value thereof increases (details of this will be described later). In other words, the weighting factor for the seventh base and the apparent age have a positive correlation. The facial form changes toward the aging direction with the increase in the weighting factor for the seventh base toward the plus direction. Thus, the plus 1σ value associated with the seventh base in the pattern 1 is set to be the plus score of the average value +1σ (standard deviation), which is obtained from a distribution of scores of weighting factors for the seventh bases in the target population. The score of the average value +1σ corresponds to a score in approximately the top one-third (more precisely, top 31.7 percent) where the positive score forms the top rank and the negative score forms the bottom rank.

On the other hand, the present inventor also found that, of all the aging factors, the weighting factor for the second base vector has a tendency for the apparent age to increase if the score of the weighting factor has a minus sign and the absolute value thereof increases (details of this will be described later). In other words, the weighting factor for the second base and the apparent age have a negative correlation. The facial form changes toward the aging direction with the decrease in the weighting factor for the second base toward the minus direction. Thus, the plus to value associated with the second base in the pattern 1 is set to be the minus score of the average value −1σ (standard deviation), which is obtained from a distribution of scores of weighting factors for the second bases in the target population. The score of the average value −1σ to corresponds to a score in approximately the bottom one-third (more precisely, bottom 31.7 percent) when the positive score forms the top rank and the negative score forms the bottom rank.

The face impression determining unit 60 refers to the tendency information storage unit 74 to obtain the pattern of the impression tendency of the subject's face and the degree of revelation thereof on the basis of the dimension of the base vector and the corresponding weighting factor (the amount of revelation) in the subject analysis model. This degree of revelation can be obtained by comparing the weighting factor stored in the base storage unit 72 associated with the subject analysis model, with the plus to value set in the tendency information PI in the tendency information storage unit 74. More specifically, the face impression determining unit 60 refers to the tendency information storage unit 74 to retrieve the dimensions of the bases (second-dimension, seventh-dimension, ninth-dimension, and eleventh-dimension) associated with the pattern 1 in the tendency information PI, and the plus to values for the respective dimensions of the bases. Further, the face impression determining unit 60 refers to the base storage unit 72 to retrieve the weighting factors for the respective dimensions of the bases associated with the subject analysis model. The face impression determining unit 60 divides each of the weighting factors for the respective dimensions of the bases associated with the subject analysis model by the corresponding plus 1σ value, thereby obtaining the degree of revelation of each of the base vectors corresponding to the respective dimensions.

The face impression determining unit 60 compares this degree of revelation with the predetermined plus threshold value (for example, +1.0). If the degree of revelation is more than or equal to the threshold value, the subject analysis model is determined to have the tendency of this dimension of the base.

The face impression determining unit 60 determines the degree of the impression tendency of the facial shape of the subject while taking into consideration the number of dimensions of the bases that the subject analysis model has from among the second-dimension, the seventh-dimension, the ninth-dimension, and the eleventh-dimension, each of which is associated with the pattern 1, or the size of the values of the degree of revelation (FIG. 2: step S42). More specifically, by using a simple determining method, the degree of the impression tendency of a pattern may be set to be the ratio of the number of dimensions of the bases (0 to 4 dimensions) of which tendency the subject analysis model has, relative to the number of dimensions of the bases (four dimensions in the case of the pattern 1) associated with the pattern.

Moreover, in step S42, it may be possible for the face impression determining unit 60 to set the degree of the impression tendency of the pattern to the total sum of values each obtained by dividing the degrees of revelation by the plus 1σ value for each of the dimensions of bases associated with the pattern.

The aesthetic information outputting unit 80 is a unit that outputs results obtained by the face impression determining unit 60 to the subject. For example, a display or a printer is given. In this exemplary embodiment, the aesthetic information outputting unit 80 outputs a pattern to which the impression tendency of the facial shape of the subject belongs, and the quantitative degree of impression tendency of this pattern.

The impression changed image generating unit 90 is a unit that changes the weighting factor $b_i$ in the subject analysis model to generate an impression changed image. The impression changed image generating unit 90 refers to the tendency information storage unit 74 to extracts one or more impression factors from the tendency information PI. Further, the impression changed image generating unit 90 receives, from the subject, aging range information indicating the direction of and the range of change in the degree of the impression tendency (for example, apparent age) through the condition input unit 30. More specifically, the aging range information indicates, for example, minus 5 years (in the rejuvenating direction) or plus 10 years (in the aging direction).

In the face impression analyzing device 100, an aging coefficient is stored for each aging factor in the tendency information storage unit 74 as described in Example 1. The impression changed image generating unit 90 refers to the tendency information storage unit 74 to read the aging factor and the aging coefficient, and increase or decrease the weighting factor for the aging factor in accordance with the amount of change corresponding to the aging range information inputted from the condition input unit 30. The impression changed image generating unit 90 generates the subject analysis model reconfigured on the basis of the weighting factor and the base vector as the impression changed image (FIG. 2: step S45).

Second Exemplary Embodiment

Figure 6:
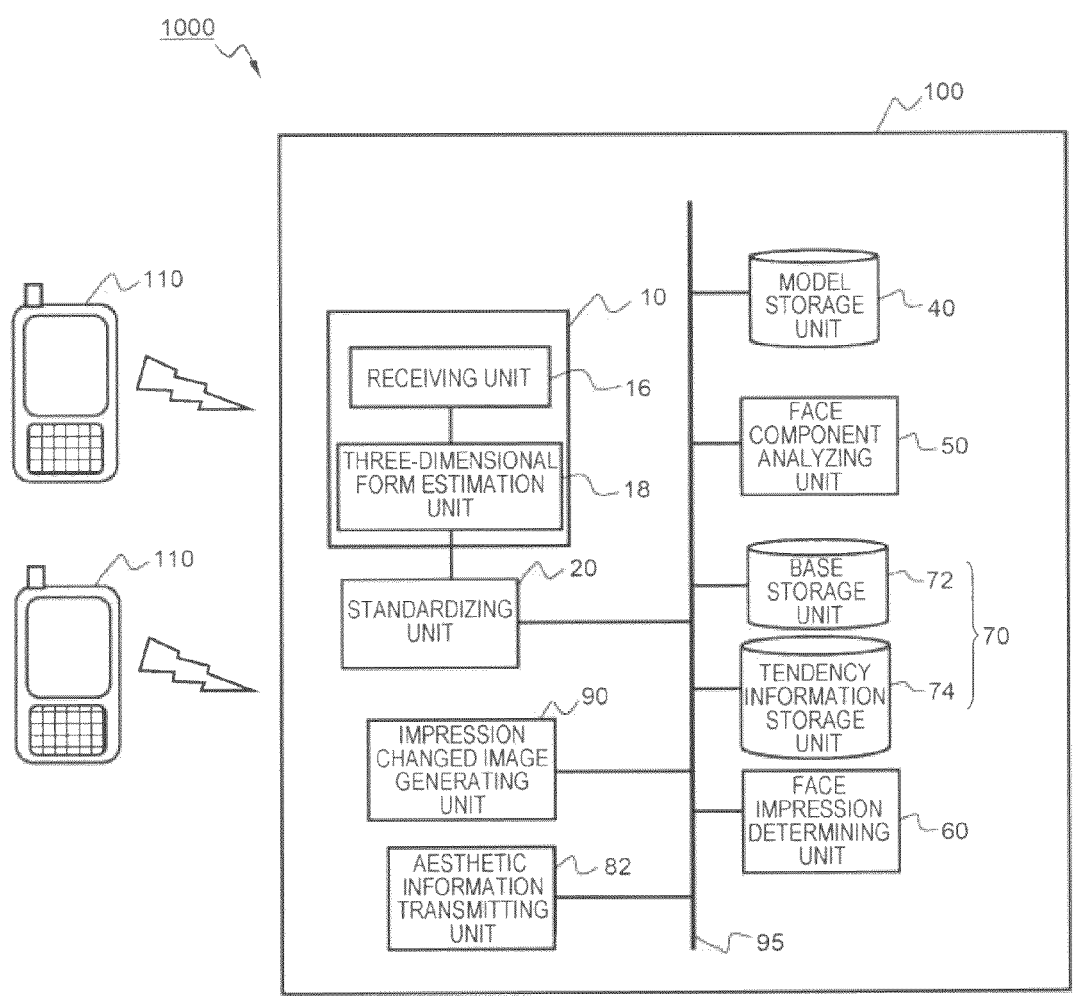
FIG. 6 is a functional block diagram illustrating a face impression analyzing system including a face impression analyzing device according to a second exemplary embodiment of the present invention.
Figure 7:
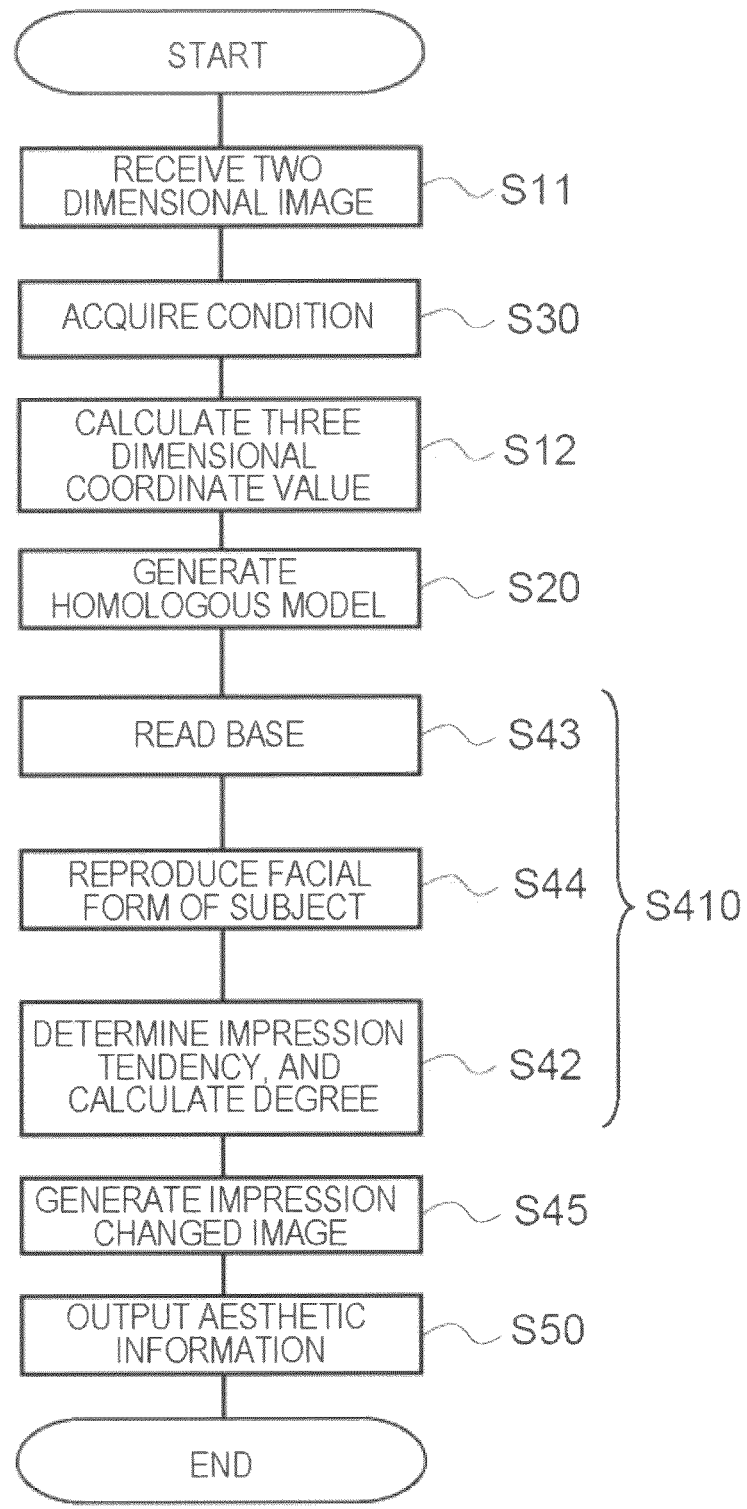
FIG. 7 is a flowchart of a face impression analyzing method using the face impression analyzing system according to the second exemplary embodiment.

FIG. 6 is a functional block diagram illustrating a face impression analyzing system 1000 including a face impression analyzing device 100 according to a second exemplary embodiment of the present invention. FIG. 7 is a flowchart showing a face impression analyzing method (hereinafter, also referred to as a second method) performed by using the face impression analyzing system 1000 according to this exemplary embodiment. Below, this exemplary embodiment will be described with reference to FIG. 6 and FIG. 7. The explanations same as those for the first exemplary embodiment will not be repeated.

First, the outline of the face impression analyzing system 1000 will be described.

The face impression analyzing system 1000 includes the face impression analyzing device 100 and a subject's terminal 110, which are connected to each other through a network. The face impression analyzing device 100 is a WEB server. The subject's terminal 110 is a mobile terminal operated by a subject (user). Either the Internet or a local area network (LAN) may be used for forming the network, and the network may be formed by either wireless network or wired network. In this exemplary embodiment, a mobile phone network will be given as an example. The face impression analyzing device 100 makes a display of the subject's terminal 110 to display a Web application site on the basis of the connection request from the subject's terminal 110.

The face impression analyzing device 100 includes a facial form acquiring unit 10, a standardizing unit 20, a model storage unit 40, a face component analyzing unit 50, a face impression determining unit 60, a storage unit 70, and an aesthetic information transmitting unit 82.

The storage unit 70 includes a base storage unit 72 and a tendency information storage unit 74. The base storage unit 72 stores one or more feature values obtained by applying multivariate analysis to target population face information (target population analysis model) representing three-dimensional forms of facial surfaces of a target population formed by a plurality of persons. It is preferable for the base storage unit 72 to store feature values extracted according to gender or age group and organized by target population. The tendency information storage unit 74 stores tendency information PI (see FIG. 5) indicating the impression tendencies of the facial shape that are associated with these feature values.

The model storage unit 40 arbitrarily accumulates homologous models of three-dimensional forms showing forms of heads including the face surfaces of a large number of subjects. However, data on the homologous models may be deleted from the model storage unit 40 after the face component analyzing unit 50 calculates base vectors by applying multivariate analysis to the homologous models concerning the target population.

The facial form acquiring unit 10 according to this exemplary embodiment is different from that in the first exemplary embodiment in that the facial form acquiring unit 10 is configured by a receiving unit 16 and a three-dimensional form estimation unit 18. The receiving unit 16 is a unit that receives facial form information representing the form of the surface of the subject's face through a network. The receiving unit 16 receives, from the subject's terminal 110, plural two-dimensional images of the head including the subject's face taken from different angles with respect to the target of the image. In the second method, the object of the image is the head of a user including the surface of the face. The subject uses a camera function of the subject's terminal 110 to take images of the head of the subject from the front direction, and left and right oblique directions.

The receiving unit 16 receives the two-dimensional image from the subject's terminal 110 through a network (FIG. 7: step S11). In addition to the receiving process described above, the receiving unit 16 also receives various kinds of inputs from the subject's terminal 110. The receiving unit 16 receives, for example, attributes of the subject such as age and gender, and designation of the pattern of the impression tendency that the subject wishes to analyze, from the subject's terminal 110 (FIG. 7: step S30).

The three-dimensional form estimation unit 18 is a unit that calculates three-dimensional coordinate values concerning the head of the subject on the basis of the plural two-dimensional images received by the receiving unit 16 and taken from different angles of the target (head of the subject). In other words, the second method is different from the first method in that the subject takes the plural two-dimensional images of the subject themselves from different angles with the target of the head including the subject's face, and the facial form acquiring unit 10 calculates, as the facial form information, the three-dimensional coordinate values concerning the surface of the head on the basis of these two-dimensional images. The three-dimensional form estimation unit 18 calculates the three-dimensional coordinate values concerning the head including the surface of the subject's face on the basis of the coordinate calculation including positioning the feature points that appear on the surface of the face commonly to the plural two-dimensional images (FIG. 7: step S12). It may be possible to employ a configuration in which the facial form acquiring unit 10 transmits, to the subject's terminal 110, a message that requests additional imaging of another two-dimensional image of the head and additional transmission, together with information that specifies the imaging angle, if the three-dimensional coordinate values concerning the head of the subject cannot be calculated with a predetermined accuracy or more.

The standardizing unit 20 converts the three-dimensional facial form information generated by the three-dimensional form estimation unit 18 into the homologous model (FIG. 7: step S20).

The second method is different from the first method in that multivariate analysis is applied to the target population face information (target population analysis model) that does not include the facial form information (subject analysis model) on the subject. In the second method, multivariate analysis is first applied to the target population analysis model that does not include the subject analysis model, and plural feature values continuing from the first-dimension to a predetermined dimension are obtained. Then, using Equation 1 described above, calculation including multiplication and addition is applied to these feature values and the corresponding weighting factors, and the facial form information on the subject is reproduced. Further, the weighting factors constituting the subject analysis model are calculated as the amount of revelation of the impression tendency.

With these processes in the second method, it is not necessary to apply the multivariate analysis (principal component analysis) after the subject analysis model is generated.

Thus, it is possible to quickly output the analysis results to the subject. In the case where the number of persons in the target population is sufficiently large, it is possible to reproduce the subject analysis model using Equation 1 in a highly accurate manner even if the base vectors calculated on the basis of multivariate analysis applied to the target population analysis model that does not include the subject are used.

The face component analyzing unit 50 calculates the amount of revelation of feature values on the subject's face on the basis of the facial form information (subject analysis model) on the subject, and the feature values of the target population face information (target population analysis model) (FIG. 7: step S410). The face impression determining unit 60 refers to the storage unit 70 (tendency information storage unit 74), and acquires the impression tendency or the degree of the impression tendency on the basis of the feature values on the subject's face and the amounts of revelation of the feature values. Then, the aesthetic information transmitting unit 82 (transmitting unit) transmits output information indicating the acquired impression tendency or the degree of the acquired impression tendency through the network to the subject's terminal 110.

In the condition acquiring step S30, it may be possible to receive selection of the impression tendency from the subject. More specifically, the receiving unit 16 may receive selection of the subject in connection with the impression tendency from the subject's terminal 110. At this time, the face component analyzing unit 50 refers to the storage unit 70, and extracts the feature values associated with the impression tendency selected by the subject. Then, the face component analyzing unit 50 calculates the degree (amount of revelation) at which the extracted feature values develop in the subject analysis model. The face impression determining unit 60 acquires the degree of the feature values associated with the selected impression tendency.

Detailed description will be made. The face component analyzing unit 50 first refers to the base storage unit 72 to read the base vectors, and generates an eigenvector matrix (FIG. 7: step S43). Then, the face impression determining unit 60 applies matrix calculation to this eigenvector matrix and the subject analysis model stored in the model storage unit 40, and calculates the weighting factor for each dimension of base. Through these processes, the amounts of revelation of the base vectors are calculated. The subject analysis model is reproduced with the base vectors and the weighting factors (FIG. 7: step S44).

Next, the face impression determining unit 60 refers to the tendency information storage unit 74, and acquires, from the tendency information PI (see FIG. 5), the plus 1σ value for each of the dimensions of the bases associated with the patterns of part or all of the impression tendencies selected by the subject. The face impression determining unit 60 uses the plus 1σ value and the weighting factors calculated in step S44 to determine the degrees of the impression tendencies of the facial shape of the subject, as in the first method (FIG. 7: step S42).

In the aesthetic information output step S50, the patterns of the impression tendencies of the facial shape of the subject determined as described above, and the degrees of the patterns are transmitted from the aesthetic information transmitting unit 82 to the subject's terminal 110.

Various modifications may be made to the exemplary embodiments described above. In the first and the second exemplary embodiments, an example is given in which the standardizing unit 20 converts the facial form information on the subject and the target population into the three dimensional homologous model. With this configuration, it is possible to perform multivariate analysis to the target population analysis model having the small number of coordinate points. With the linear combination of base vectors extracted from the target population analysis model, it is possible to reproduce the subject analysis model in a highly accurate manner. However, the present invention is not limited to the case where the three dimensional homologous model is used as the subject analysis model.

For example, the face component analyzing unit 50 may obtain the amount of revelation of the base vector on the basis of the high-resolution facial form information on the subject measured by the facial form acquiring unit 10 (contact-type measuring unit 12, non-contact-type measuring unit 14). More specifically, the size of the head of the facial form information on the subject is first standardized with respect to the size of the head of the average facial form of the target population. Then, preferably, the weighting factors for the base vectors are determined sequentially from the first base in a manner such that the linear combination formed by the base vectors up to a predetermined dimension (for example, the 15th-dimension) concerning the target population is brought closer to the facial form information on the subject.

More specifically, a calculation is made of the three-dimensional coordinate value at a point located closest to each vertex of the average facial form of the target population of all the measurement points constituting the facial form information on the subject. Hereinafter, the measurement point is referred to as a homologous-model corresponding point. Further, the total of distances between each of the vertexes on the average facial form and the homologous-model corresponding point is referred to as a model-to-model distance. Then, the sign of the weighting factor $b_1$ for the first base is changed to be plus or minus, and the weighting factor $b_1$ with which the model-to-model distance is minimum is calculated.

The same applies to the second base. More specifically, by reading the average facial form+$b_1$·first base vector $e_1$ as an average facial form described above, a calculation is made of the three-dimensional coordinate value at a point located closest to each vertex on this new average facial form of all the measurement points constituting the facial form information on the subject. These points form new corresponding points on the homologous model. Then, a calculation is made of the weighting factor $b_2$ for the second base with which the model-to-model distance between each of the vertexes on this new average facial form and the homologous-model corresponding point is minimum. After this, similarly, by setting average facial form+$b_1$·first base vector $e_1$+ ... +$b_{k-1}$·k−$1^{th}$ base vector $e_{k-1}$ to a new average facial form, the weighting factor $b_k$ for the $k^{th}$ base vector is calculated.

With these processes, the facial form information on the subject can be reproduced using the linear combination formed by the first base vector to n-th base vector as shown by Equation 1 described above.

Further, in the face impression analyzing system 1000 according to the second exemplary embodiment, the three-dimensional form estimation unit 18 calculates the three-dimensional coordinate values on the surface of the head of a subject on the basis of plural two-dimensional images received by the receiving unit 16. However, in place of this, in the present invention, the weighting factors may be calculated through image processing using a two-dimensional image (base image) for each dimension of base representing features of the base vectors. More specifically, the base vectors extracted through multivariate analysis applied to the target population analysis model are added separately to the average facial form to generate a virtual facial form model. The virtual facial form model is generated separately for each dimension of base. The weighting factors for the base vectors to be added to the average facial form are set, for example, to a plus 1σ value (see FIG. 5). The virtual facial form model generated as described above is converted into two-dimensional images (hereinafter, referred to as a base image) taken from the front direction, and left and right oblique directions.

Then, the face component analyzing unit 50 determines a weighting factor for the base image in a manner such that a image obtained by combining the respective base images with the weights is brought close to the image of the head of the subject received by the receiving unit 16. More specifically, the image of the head of the subject is first standardized, and texture is abstracted. Then, the face component analyzing unit 50 varies the weighting factors to be multiplied by a pixel value of each dimension of base image, and determines weighting factors for each dimension of base in a manner such that the sum of squares of the differences from the pixel value of the image of the head of the subject (standardized image) is minimum.

As described above, in the first and the second exemplary embodiments, a description has been made of the face impression analyzing method, which includes calculating the amounts of revelation of the base vectors of the subject's face on the basis of the facial form information, which is the coordinate information on the three-dimensional form of the surface of the subject's face, and on the basis of the base vectors (feature values) obtained through the application of multivariate analysis to the target population face information, thereby obtaining the degree of impression tendency on the basis of the calculated amounts of revelation. In the present invention, it may be possible to analyze the impression of the subject's face by varying the degree of impression tendency obtained through the face impression analyzing method on the image. In other words, the present invention further provides a face image generating method that generates an impression changed image obtained by varying the impression tendency of the facial shape of the subject.

This face image generating method includes: calculating the amounts of revelation of the feature values on the subject's face on the basis of the facial form information representing the form of the surface of the subject's face, and one or more features values obtained through the application of multivariate analysis to the target population face information representing three-dimensional forms of facial surfaces of a target population formed by a plurality of persons; varying the amounts of revelation of facial form information; and generating impression changed images having the impression tendency of the facial shape of the subject changed on the basis of the varied facial form information.

More specifically, in the case where the apparent age is used as an example for the impression tendency, it is preferable to generate the impression changed image in which the apparent age of the subject is aged or rejuvenated by increasing or decreasing the weighting factor for a base vector of a predetermined dimension in the subject analysis model. The dimension related to the weight factor to be changed is at least one dimension associated with the feature value (base vector) having a high correlation with the impression tendency (apparent age). More specifically, part or all of the dimensions (the second-dimension, the seventh-dimension, the ninth-dimension, and the eleventh-dimension) of base listed in FIG. 5 as the aging factor are given as the dimension described above. In other words, the feature values obtained by applying multivariate analysis to the target population face information include at least one of high-degree base vectors corresponding to the second-dimension and the higher-dimensions and having a high correlation with the impression tendency. In this exemplary embodiment, the weighting factor for this dimension of base of the subject analysis model is changed in a manner such that the apparent age, which is the degree of the impression tendency, is changed by the predetermined amount toward the plus direction (aging direction) or minus direction (rejuvenating direction). With these processes, the amount of revelation in the facial form information on the subject is changed, and the image indicating the facial form of the subject at the time when he/she gets aged or rejuvenated is generated. The subject can visually recognize that increasing or decreasing the amount of revelation of this impression factor changes his/her apparent age toward the aging or rejuvenating direction. Further, it can be understood that, to rejuvenate the apparent age, it is effective to aesthetically increase or decrease the amount of revelation of this impression factor.

This impression changed image is a still image or moving image of the subject analysis model. The impression changed image has facial form information indicating a three-dimensional form of the surface of the subject's face. Texture data indicating textures of the skin may be combined with the impression changed image. At this time, the textures representing the current textures of the skin of the subject may be combined with the impression changed image, or other texture data representing typical textures of the skin of a person having the apparent age of which impression has been changed may be combined with the impression changed image.

When the impression changed image is generated, the impression changed image generating unit 90 refers to the tendency information storage unit 74 to acquire an aging coefficient for each aging factor, and calculates the amount of change in the weighting factor for each of the aging factors on the basis of the acquired aging coefficient and the aging range information indicating the range of change in the apparent age (see FIG. 1). The aging factors that the impression changed image generating unit 90 changes may be all the aging factors (the second-dimension, the seventh-dimension, the ninth-dimension, and the eleventh-dimension) defined as the pattern 1 in the tendency information PI (see FIG. 5), or may be part of the aging factors that the subject analysis model notably has. When determination is made as to which weighting factor for the aging factor is changed for each of the subjects, it may be possible to classify the target population into plural groups, select base vectors having a high correlation with the impression tendency that commonly appears in the group to which the subject belongs, and change this weighting factor. More specifically, it is preferable to classify the target population into plural groups according to the degree of match in terms of the tendency of the weighting factors related to the impression factors (the second-dimension, the seventh-dimension, the ninth-dimension, and the eleventh-dimension in the exemplary embodiments) which are plural base vectors having a high correlation with the impression tendency (apparent age). Then, it is preferable to select a group to which the subject belongs on the basis of the impression factor that notably develops in the subject analysis model. More detailed descriptions of the face image generating method will be made later with reference to Example 2.

<Aesthetic Counseling Method>

In the first method and the second method, it may be possible to provide an aesthetic counseling by using results of calculation made by the face impression determining unit 60 in addition to determining the degree of the impression tendency of the facial shape of the subject.

This aesthetic counseling method (hereinafter, referred to as a present method) uses the face impression analyzing method according to the first exemplary embodiment or the second exemplary embodiment described above, and outputs aesthetic information associated in advance with the feature values in which the calculated amount of revelation is a predetermined amount or more.

The aesthetic information used in the present method is information showing an aesthetic treatment method including any of a cosmetic surgery, an aesthetic massage method, a hair makeup method, and a cosmetic makeup method, a hair cosmetics, or cosmetics for makeup. FIG. 8 is a table showing the aesthetic information. Moreover, the aesthetic information may include not only options of aesthetic methods but also the amount of use of cosmetics or usage of the cosmetics. The aesthetic information is stored in the tendency information storage unit 74 so as to be associated with each of the aging factors.

In the present method, the subject is informed through a text message of the aesthetic treatment method or cosmetics (collectively referred to as an aesthetic method) for reducing or strengthening the impression tendency to which the subject's face belongs to as a result of analysis. If this impression tendency is not preferable for the subject, the subject is notified of the aesthetic method for reducing the impression tendency. With these processes, the face impression analyzing device 100 provides the subject with not only the impression tendency of the build of the subject's face but also the method for improving the impression tendency. Details of the aesthetic treatment method shown in FIG. 8 will be described in Examples below.

Example 1

Below, the present invention will be described in detail through examples. In Example 1, an aging point and the aging tendency of a subject are obtained, by analyzing three-dimensional data of the head of the subject, which is a customer. Further, objective and effective aesthetic counseling information is provided by outputting the aesthetic treatment method in accordance with the aging tendency. With these processes, areas to which makeup is applied can be clearly arranged in order of priority, and hence, the impression of looking younger can be reliably obtained with the makeup applied by customer his/herself.

The subjects (sample providers) are formed by a total of 150 Japanese females in which 30 persons belong to each age group between 20s to 60s.

FIG. 9(a) is a diagram illustrating three-dimensional optical data (high-resolution data) on the entire head of a subject obtained by measuring the head including the face of the subject with a non-contact-type three-dimensional laser scanner. The total of the measurement points are approximately 180,000 points. The high-resolution data have the number of vertexes and topology different from each other according to subjects.

FIG. 9(b) is a diagram illustrating 13 feature points on the face and the scalp of the subject. Three-dimensional coordinates at these points were measured with a contact-type three-dimensional digitizer.

FIG. 9(c) is a diagram illustrating a generic model. The generic model is a model having the high node density around eyes and mouth and the low node density on the scalp. The number of nodes is 4,703.

Figure 10:
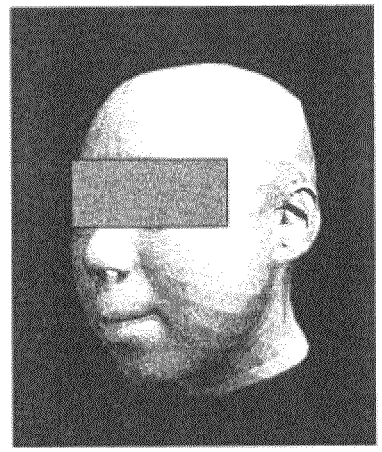
FIG. 10 is a perspective view illustrating a homologous model.

FIG. 10 is a perspective view illustrating a homologous model obtained by making consistent the number of vertexes and topology in the high-resolution data for each subject. The homologous model of the target can be generated by positionally matching the coordinate values of the 13 feature points in the high-resolution data and the coordinate values at the feature points in the generic model, and then, attaching other coordinates of the generic model to the surface of the high-resolution data. The homologous models each have the number of vertexes and the topology made common to each other, and hence, it is possible to apply multivariate analysis by collecting a large number of subjects. The homologous models are generated for 50 persons in total in which 10 persons belong to each age group.

FIG. 11(a) is a diagram illustrating an average facial form (average facial form model) of the homologous model of subjects in their 20s. FIG. 11(b) is a diagram illustrating an average facial form model of the homologous model of subjects in their 30s. FIG. 11(c) is a diagram illustrating an average facial form model of the homologous model of subjects in their 40s. FIG. 11(d) is a diagram illustrating an average facial form model of the homologous model of subjects in their 50s. FIG. 11(e) is a diagram illustrating an average facial form model of the homologous model of subjects in their 60s. In these homologous models, three-dimensional coordinates are extracted, and the textures are abstracted. Then, by averaging the coordinates of these homologous models, it is possible to eliminate the effect of the individual differences of the subject's faces. Thus, the average facial form for each of the age groups shows features of the form of the face that changes with the increase in age of the age group.

FIG. 12(a) shows an average face of the homologous models of subjects formed by 20 young females in total in their 20s and 30s. FIG. 12(b) shows an average face (hereinafter, also referred to as an entire average face) of the homologous model of subjects formed by 50 females in total in all age groups from 20s to 60s. FIG. 12(c) shows an average face of the homologous model of subjects formed by 20 elder females in total in their 50s and 60s.

By comparing FIG. 11(a) and FIG. 11(e) with FIG. 12(a) and FIG. 12(c), it can be understood that nasolabial sulcus deepen, and cheeks loosen and bulge with age. These features are made objective and quantitative through principal component analysis applied to the homologous model.

The base vectors (principal component) and the percentage of contribution of the base vectors extracted through principal component analysis applied to the target population analysis model in relation to the target population formed by 50 subjects in their 20s to 60s have been given in FIG. 3. By changing the subjects in the target population and the number of subjects, the extracted base vector and the percentage of contribution of the base vector vary (see Example 2 that will be described later).

The present inventor applied principal component analysis to the target population analysis model, and examined the variation in face impressions with the variation in principal components, starting from the base corresponding to the low-dimension, relative to those of the average face. As a result, it was found that a specific principal component has a high correlation with aging. Further, it was also found that other specific principal components give an impression of being adult face or childish face, and contribute to the impression of having a smaller face.

FIG. 13(a) to FIG. 13(c), to FIG. 27(a) to FIG. 27(c) are perspective views illustrating virtual forms obtained by varying the principal components from the first principal component (pca01) to the fifteenth principal component (pca15).

FIG. 13(b), FIG. 14(b), . . . , and FIG. 27(b) are perspective views illustrating forms of average faces (the entire average face) of homologous models concerning all the age groups from their 20s to 60s, and are the diagrams same as FIG. 12(b).

FIG. 13(c) is a perspective view illustrating a virtual form in which the weighting factor ($b_1$) for the first base vector in Equation 1 described above is set to +3 times (+3σ) the standard deviation of the target population, and other weighting factors ($b_2$ to $b_n$) for base vectors are set to zero.

FIG. 13(a) is a perspective view illustrating a virtual form in which the weighting factor ($b_1$) for the first base vector is set to −3 times (−3σ) the standard deviation of the target population, and other weighting factors ($b_2$ to $b_n$) for base vectors are set to zero.

FIG. 14(c) is a perspective view illustrating a virtual form in which the weighting factor ($b_2$) for the second base vector is set to +3 times (+3σ) the standard deviation of the target population, and other weighting factors ($b_1$, $b_3$ to $b_n$) for base vectors are set to zero.

FIG. 15(c), FIG. 16(c), . . . , and FIG. 27(c) are perspective views illustrating virtual forms in which the weighting factors for the third base vector to the fifteenth base vector, respectively, are set to +3 times (+3σ) the standard deviation of the target population, and other weighting factors for base vectors are set to zero.

FIG. 14(a) is a perspective view illustrating a virtual form in which the weighting factor ($b_2$) for the second base vector is set to −3 times (−3σ) the standard deviation of the target population, and other weighting factors ($b_1$, $b_3$ to $b_n$) for base vectors are set to zero.

FIG. 15(a), FIG. 16(a), . . . , and FIG. 27(a) are perspective views illustrating virtual forms in which the weighting factors for the third base vector to the fifteenth base vector, respectively, are set to −3 times (−3σ) the standard deviation of the target population, and other weighting factors for base vectors are set to zero.

Descriptions of features of the changes in forms associated with each of the principal components have been made with reference to FIG. 4. Below, the feature of each of the principal components will be described with reference to FIG. 13(a)-FIG. 13(c) to FIG. 27(a)-FIG. 27(c), and FIG. 4.

The first principal component extracted in Example 1 was a factor that contributes to the size of the entire face. As can be understood from comparison between FIG. 13(c) and FIG. 13(a), the face as a whole becomes thinner and smaller as the weighting factor for the first principal component increases toward the plus direction. The size of the weighting factor for the first principal component can be judged relatively easily from the subject's face, by observing the subject's face.

On the other hand, in the case of Example 1, the high-degree bases corresponding to the second-dimension and the higher-dimensions were principal components that contribute to the form of local parts of the face. Thus, it is difficult to judge the size of the weighting factor for the high-degree base only by observing the subject's face. In this regard, by quantifying the weighting factor for each of the dimensions through the application of principal component analysis to the subject analysis model as in this exemplary embodiment, it is possible to make objective the amount of revelation of the feature value (principal component) in the subject's face in an accurate manner.

The second principal component was a factor that contributes to the degree of bulge of the volume of the lower face, the bulges on both sides of the nose, and sagging of the portion below the nose. As can be understood from the comparison between FIG. 14(c) and FIG. 14(a), with the increase in the weighting factor for the second principal component toward the plus direction, the face becomes firmer, and the nasolabial sulcus reduces. As described later, if the second principal component increases toward the minus direction, the apparent age and the actual age advance toward the aging direction.

The third principal component was a factor that contributes to the face heights from gnathion. As can be understood from comparison between FIG. 15(c) and FIG. 15(a), if the weight factor for the third principal component increases toward the plus direction, the temporomandibular joint develops, and the face looks adult. In other words, the impression of an adult looking face advances. On the contrary, if the weight factor for the third principal component increases toward the minus direction, the face looks more baby face. Then, as the third principal component increases toward the minus direction, the impression of having a smaller face advances.

The fourth principal component was a factor that contributes to extension of occiput and the width of orbit. As can be understood from comparison between FIG. 16(c) and FIG. 16(a), the occiput gets smaller and the distance between eyes reduces as the weighting factor for the fourth principal component increases toward the plus direction. In other words, the tendency of the eyes becoming close-set increases.

The fifth principal component was a factor that contributes to forward protrusion of the frontal region of the head and forward protrusion of the mouth. As can be understood from comparison between FIG. 17(c) and FIG. 17(a), the frontal region of the head and the mouth protrudes forward as the weighting factor for the fifth principal component increases toward the plus direction.

The sixth principal component was a factor that contributes to the total head height. As can be understood from comparison between FIG. 18(c) and FIG. 18(a), the length of the portion located above the eyes reduces as the weighting factor for the sixth principal component increases toward the plus direction. On the contrary, the length of the forehead increases as the weighting factor for the sixth principal component increases toward the minus direction.

The seventh principal component was a factor that contributes to the front-rear position of the outside of the orbit and the extension of the portion under the nose. As can be understood from comparison between FIG. 19(c) and FIG. 19(a), with the increase in the weighting factor for the seventh principal component toward the plus direction, the outer canthus moves frontward, the stereoscopic appearance of the eyes reduces, the portion under the nose extends, and the nasolabial sulcus deepens. Thus, the increase in the seventh principal component toward the plus direction gives an impression that the entire face deflates, and hence, the apparent age and the actual age advance toward the aging direction. On the contrary, the increase in the seventh principal component toward the minus direction results in an advance in the apparent age and the actual age toward the rejuvenating direction.

The eighth principal component was a factor that contributes to the width of the orbit. As can be understood from comparison between FIG. 20(c) and FIG. 20(a), the distance between the outside portions of the orbits reduces as the weighting factor for the eighth principal component increases toward the plus direction. This leads to an increase in the tendency of the eyes becoming close-set.

The ninth principal component was a factor that contributes to inward sagging of the portion above the outer canthus, and the degree of deepening of the angulus oris. As can be understood from the comparison between FIG. 21(c) and FIG. 21(a), with the increase in the weighting factor for the ninth principal component toward the minus direction, the outer canthus droops inward of the face, and the angulus oris moves backward to make the nasolabial sulcus deepen. Thus, the apparent age and the actual age advance toward the aging direction. On the contrary, as the weighting factor for the ninth principal component increases toward the plus direction, the outer canthus move upward, and the angulus oris becomes shallow, which gives the impression of youthfulness. In other words, the apparent age and the actual age advance toward the rejuvenating direction.

The tenth principal component was a factor that contributes to distortion of the face. As can be understood from comparison between FIG. 22(c) and FIG. 22(a), the tenth principal component contributes to a twist of the upper portion of the face in the left and right direction.

The eleventh principal component was a factor that contributes to forward protrusion of the central portion of the mouth and flatness of the lower portion of the cheekbones. As can be understood from comparison between FIG. 23(c) and FIG. 23(a), with the increase in the weighting factor for the eleventh principal component toward the minus direction, the cheek becomes thinner, the central portion of the mouth protrudes forward, and the angulus oris deepens. This results in the increase in the apparent age and the actual age toward the aging direction. Further, as the weighting factor for the eleventh principal component increases toward the minus direction, the impression tendency of being a so-called "duck mouth" increases.

The twelfth principal component was a factor that contributes to swelling of the lower jaw. As can be understood from comparison between FIG. 24(c) and FIG. 24(a), with the increase in the weighting factor for the twelfth principal component toward the minus direction, the portion around the lower jaw is firmed up, which leads to an increase in the impression of having a smaller face.

The thirteenth principal component was a factor that contributes to swelling of the portions below the ears and the portion below the jaw. As can be understood from comparison between FIG. 25(c) and FIG. 25(a), with the increase in the weighting factor for the thirteenth principal component toward the minus direction, the portions below the ears and the portion below the jaw swell as if these parts have gained fat.

The fourteenth principal component was a factor that contributes to distortion of the head. As can be understood from comparison between FIG. 26(c) and FIG. 26(a), the fourteenth principal component contributes to the lower portion of the face being asymmetry in the horizontal direction.

The fifteenth principal component was a factor that contributes to distortion of the face. As can be understood from comparison between FIG. 27(c) and FIG. 27(a), the fifteenth principal component contributes to distortion of the face due to twist of the lower portion of the face in the horizontal direction.

Therefore, in the case where the apparent age and the actual age of the subject are determined in this exemplary embodiment (hereinafter, collectively referred to as aging determination), it is preferable to evaluate the amount of revelation of part or all of the principal components corresponding to the second-dimension, the seventh-dimension, the ninth-dimension, and the eleventh-dimension in the subject analysis model. More specifically, it is only necessary to investigate whether the weighting factors for base vectors of these dimensions are more than or equal to the predetermined amount (for example, plus 1σ value in the aging advancing direction). Further, in the case where elementary school students to junior high/high school students are judged as to the degree of having an adult face or baby face, it is preferable to evaluate the amount of revelation of the third principal component in a similar manner. Further, in the case where the degree of the impression of having a smaller face is judged, it is preferable to evaluate the amount of revelation of the third and the twelfth principal components in a similar manner.

The table indicating the relationship between these impression tendencies and the dimensions of bases is the tendency information PI shown in FIG. 5. However, in the case where attributes concerning the target population or the number of subjects in the target population are varied as described in Example 2 which will be described later, the dimensions of bases having the correlation with the impression tendencies concerning the apparent age and the actual age are changed from the second-dimension, the seventh-dimension, the ninth-dimension, and the eleventh-dimension. In this case, it is preferable to obtain, in advance, the dimensions of base having the high correlation with the impression tendency (aging) in a sensory manner. Further, it is preferable to determine the degree of the impression tendency on the basis of the amount of revelation of the principal component having the obtained dimensions of bases in the subject model.

Below, the aging determination in this Example will be described in more detail. The degree of the impression tendency in the aging determination is directed at the apparent age or actual age of a subject. The feature values for which the amount of revelation is judged includes at least one base vector having a high correlation with the impression tendency (aging) as described above. Here, the base vector having a high correlation with the impression tendency means a base vector that has the high correlation coefficient with the impression tendency in a statistical sense. For example, this base vector is a base vector more than the critical value for the 5% significance level with the number of samples in the target population.

As described in the first exemplary embodiment, principal component analysis was applied to the homologous model of subjects that belong to the target population formed by 50 Japanese females in which 10 persons belong to each of the age groups in their ages between 20s to 60s. The base vectors up to the fifteenth-dimension having the percentage of contribution of 1% or more were obtained on the basis of the target population (see FIG. 3). Then, the weight factors (eigenvalues) for each dimension of bases, ranging from the first base to 15th base, were calculated for each of the subjects.

Five aesthetic specialists estimated an age of each of the subjects by observing a photograph of each of the subjects, and the average value of the ages estimated by five aesthetic specialists was calculated as the "apparent age." Further, the "actual age" for each of the subjects was also investigated.

Relationships between the weighting factors (eigenvalues) for the first base to 15th base of each of the subjects and their apparent ages were obtained. FIG. 28 is a table showing correlation coefficients for each dimension of the bases between the weighting factors and the apparent age.

The four bases, which correspond to the second-dimension, the seventh-dimension, the ninth-dimension, and the eleventh-dimension, exhibit the high correlation with the apparent age. The correlation coefficients for the second-dimension, the ninth-dimension, and the eleventh-dimension took negative values, and the correlation coefficient for the seventh-dimension took a positive value.

From these results, it can be understood that, with the increase in the age, the principal components of the second-dimension, the ninth-dimension, and the eleventh-dimension shift toward the minus direction, and the principal component of the seventh-dimension shifts toward the plus direction.

Here, in the case where the number of samples (N) in the target population is 50, the critical value for the 5% significance level is 0.279. Thus, the absolute values of the seventh-dimension and the ninth-dimension are larger than the critical value for the 5% significance level. In other words, the feature values of the seventh-dimension and the ninth-dimension are base vectors (principal components) with the percentage of contribution being more than or equal to 1%, and have the correlation coefficients between the impression tendency and the feature values larger than the critical value of the 5% significance level under this number of samples in the target population. Therefore, it can be said that judging the age on the basis of the base vectors corresponding to the seventh-dimension and the ninth-dimension is statistically positive.

The target population was divided into two groups according to the actual age, and tests were carried out as to whether any significant difference can be found in the relationships between the weighting factors and the apparent ages for each dimension of base. More specifically, t-tests were carried out by dividing the target population into two groups: 20 persons aged between 20 and 40 years old and 30 persons aged between 41 and 69 years old. FIG. 29 is a table showing the results. In this specification, the significant difference is determined to exist if the t-test value is less than 0.05. More specifically, the t-test values for the seventh-dimension and the ninth-dimension were less than 0.05, and the t-test values for the other dimensions of the bases were more than or equal to 0.05. Thus, it was found that a significant difference can be found in terms of ages in the principal components corresponding to the seventh-dimension and the ninth-dimension. Further, the t-test values for the second-dimension and the eleventh-dimension were relatively small values of less than 0.2, and a slight difference can be found in terms of ages for these dimensions.

It should be noted that FIG. 30 is a table showing a correlation for each dimension of base between the weighting factors and the actual ages in connection with the entire target population. By comparing FIG. 28 and FIG. 30, it can be found that the four bases, which correspond to the second-dimension, the seventh-dimension, the ninth-dimension, and the eleventh-dimension, have a high correlation in terms of the actual age. Further, in a similar manner to the apparent age, it can be understood that, with the increase in the actual age, the principal components of the second-dimension, the ninth-dimension, and the eleventh-dimension shift toward the minus direction, and the principal component of the seventh-dimension shifts toward the plus direction. The target population was divided into two groups according to the actual age, and t-tests were carried out as to whether any significant difference can be found in the relationships between the weighting factors and the actual ages for each dimension of base. As a result, a tendency almost similar to that of the results shown in FIG. 29 was found (not illustrated).

As described above, it is found that, as for the judgment over aging, it is possible to treat the apparent ages of the subjects in a similar manner to the actual age. In other words, it is found that, according to the present invention, it is possible to determine the apparent ages of the subjects, and it is possible to estimate the actual ages of the subjects whose ages are not known. From the viewpoint of the aesthetics, youthfulness of the apparent age when viewed by himself/herself or other persons is more important than the actual age. Thus, in Example 1 and Example 2, which will be described later, the apparent age of the subject is used for the degree of the impression tendency.

Next, for the principal components of the second-dimension, the seventh-dimension, the ninth-dimension, and the eleventh-dimension, sensory values of the apparent age were obtained for homologous models obtained by varying the weighting factors for the base vector for each of the principal components in a stepwise manner up to ±3σ, on the basis of the form of the average face of the entire target population (the entire average face). The apparent ages were estimated by using the average values of the results of the age estimation made by four aesthetic specialists. For example, FIG. 31(a) to FIG. 31(f) illustrate six images obtained by varying the weighting factor for the ninth base vector up to ±3σ in increments of 1σ. FIG. 31(a) is a diagram obtained by setting the weighting factor for the ninth base vector to +1σ on the basis of the form of the entire average face with the aging-advancing direction (direction in which the aging tendency increases) being the positive direction. As described above, the aging tendency increases as the ninth principal component moves toward the minus direction. Thus, the form of the face changes toward the aging-advance direction by +1σ by increasing the weighting factor for the ninth base vector by −1σ.

FIG. 31(b) is a diagram obtained by setting the weighting factor for the ninth base vector to +2σ toward the aging-advance direction. Similarly, FIG. 31(c) is a diagram obtained by setting the weighting factor to +3σ, and is the diagram same as FIG. 21(a). Similarly, FIG. 31(d) is a diagram obtained by setting the weighting factor to −1σ. Similarly, FIG. 31(e) is a diagram obtained by setting the weighting factor to −2σ. Similarly, FIG. 31(f) is a diagram obtained by setting the weighting factor to −3σ, and is the diagram same as FIG. 21(c).

Figure 32:
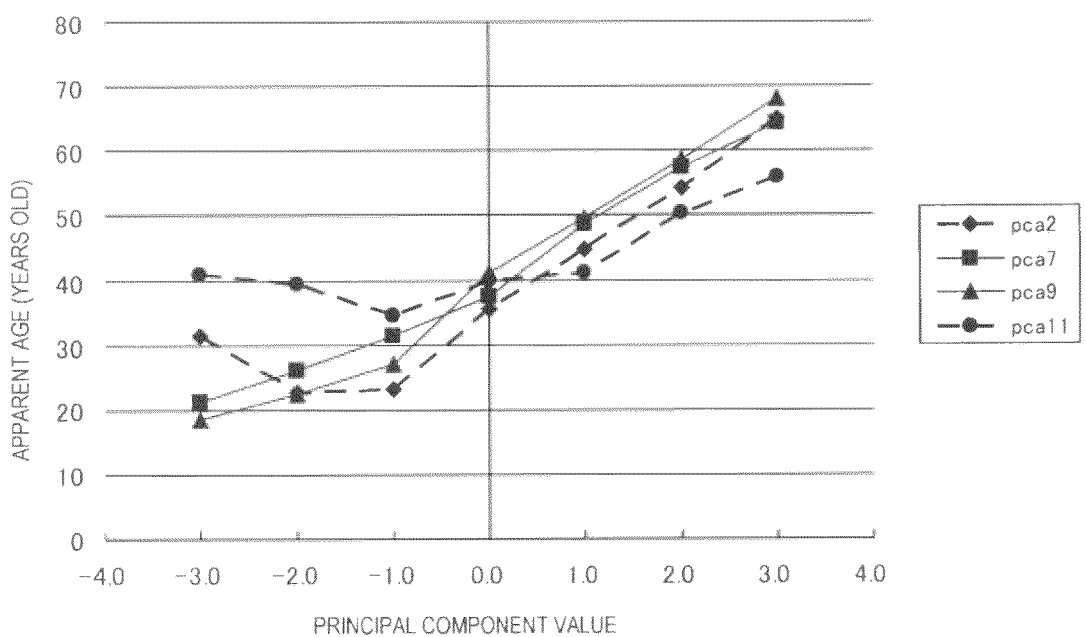
FIG. 32 is a graph showing variations of impressions about age in a virtual mode when aging impression factors are varied.

FIG. 32 is a graph showing variations of impressions of age in a virtual mode obtained when the aging impression factors (aging factor) are varied. In the case where the weighting factors for the second, the seventh, the ninth, and the eleventh base vectors are varied from +1σ to +3σ toward the aging tendency, all the sensory values of the apparent ages linearly increase. On the contrary, in the case where the weight factors are varied from −1σ to −3σ, the sensory values for the seventh-dimension and the ninth-dimension almost linearly change toward a rejuvenating direction. However, for the second-dimension and the eleventh-dimension, the tendency toward the rejuvenation in appearance could not be seen. In other words, in this Example, it was found that the seventh base and the ninth base function as an aging factor that works in both the aging and the rejuvenating directions, and the second base and the eleventh base function as an aging factor that only works in the aging direction. In FIG. 32, the slope of the graph represents the amount of change in the apparent age in the case where the weighting factor for the base vector serving as the aging factor is changed by the predetermined amount (for example, 1σ). This slope is referred to as an aging coefficient. In the face impression analyzing device 100, the aging coefficient is stored in the tendency information storage unit 74 so as to be associated with each dimension of the aging factor.

From these findings, as for the age-advancing direction, it can be understood that all principal components (aging impression axis) of the second-dimension, the seventh-dimension, the ninth-dimension, and the eleventh-dimension show that the weighting factors for the base vectors and the apparent age linearly change. Further, as for the seventh-dimension and the ninth-dimension, it is possible to make the apparent age younger by applying a sign contrary to the aging tendency to the weighting factor for the base vector.

Next, an example of an aesthetic treatment method for reducing the aging tendency will be described for each of the aging impression axes.

The second principal component contributes to the degree of bulge of the lower face, the bulges on both sides of the nose, and sagging of the portion below the nose, and hence, it is effective to lift the cheeks in order to change the facial impression. To this end, it is preferable to actually lift the cheek through aesthetic massage, or to given an impression that the cheeks are lifted by applying cosmetic makeup that makes the upper part of the face prominent, or styling of hair, for example, in arranging hair in an updo. Further, it is also effective to use a concealer to hide the nasolabial sulcus. Thus, the method of reducing the aging tendency caused by the second base includes, for example, the following five aesthetic treatment methods: (i) highlighting the upper portions of the cheeks, (ii) applying blush on the cheeks, (iii) hiding the nasolabial sulcus, (iv) increasing the volume of the top of hair, and (v) lifting the cheeks through facial exercises, as shown in FIG. 8.

Further, the seventh principal component influences an impression that the size of the entire face deflates, and hence, it is effective to employ an aesthetic treatment method such as (i) applying makeup that makes the entire face look bright and (ii) applying lipstick to the upper lip to increase in thickness.

The ninth principal component contributes to inward sagging of the portion above the outer canthus, and the degree of deepening of angulus oris. Thus, it is effective to employ the aesthetic treatment method such as (i) applying makeup that lifts the outer canthus, and (ii) hiding the nasolabial sulcus.

The eleventh principal component reduces the pits at the angulus oris. Thus, it is effective to employ the aesthetic treatment method such as (i) hiding the recess at the angulus oris, (ii) drawing the outer edge of the lip clearly, and (iii) tightening the facial muscles through facial exercises.

It is preferable to output the aesthetic treatment methods described above as aesthetic information outputted through the aesthetic counseling method in the exemplary embodiments described above. Further, it may be possible to output, as the aesthetic information, an appropriate type or product name of hair cosmetics or cosmetics for makeup, or usage or amount of use of these cosmetics for each of the aging impression axes that the subject has.

Further, it may be possible to employ a configuration in which the input of the actual age of a subject is received by the condition input unit 30 (see FIG. 1), and the aesthetic information outputting unit 80 outputs a difference between the apparent age of the subject calculated by the face impression determining unit 60 and the actual age received.

FIG. 33(*a*) to FIG. 33(*d*) are perspective views each illustrating a homologous model obtained by combining plural aging impression axes. From these drawings, it can be understood that the aging tendency further significantly advances if plural aging impression axes are combined. FIG. 33(*a*) is a diagram obtained by setting the weighting factors for the second-dimension and the ninth-dimension to +3σ toward the aging tendency. FIG. 33(*b*) is a diagram obtained by setting the weighting factors for the seventh-dimension and the ninth-dimension to +3σ toward the aging tendency. FIG. 33(*c*) is a diagram obtained by setting the weighting factors for the second-dimension and the eleventh-dimension to +3σ toward the aging tendency. And, FIG. 33(*d*) is a diagram obtained by setting the weighting factors for the second-dimension, the seventh-dimension, the ninth-dimension, and the eleventh-dimension to +3σ toward the aging tendency. The apparent ages based on FIG. 33(*a*) to FIG. 33(*c*) were higher than those based on FIG. 14(*a*), FIG. 19(*c*), FIG. 21(*a*), and FIG. 23(*a*). Further, the apparent age based on FIG. 33(*d*) was higher than those based on FIG. 33(*a*) to FIG. 33(*c*). Therefore, it can be understood that it is appropriate to judge that, if the subject has plural aging impression axes, the aging tendency increases.

FIG. 34 is a table showing the number of aging impression axes possessed by subjects in target populations each formed by 10 persons in groups of subjects aged from their 20s to 60s.

FIG. 34 shows the number of the principal components (aging impression axes) of the second-dimension, the seventh-dimension, the ninth-dimension, and the eleventh-dimension that the subjects in each of the age groups have.

Three subjects in the age group of 20s each owned one aging impression axis (factor). No subject owned two or more factors.

Two subjects in the age group of 30s each owned one aging impression axis (factor). One subject in this age group owned two factors.

Two subjects in the age group of 40s each owned one aging impression axis (factor). Two subjects in this age group each owned two factors.

Seven subjects in the age group of 50s each owned one aging impression axis (factor). One subject in this age group owned two factors.

Three subjects in the age group of 60s each owned one aging impression axis (factor). Six subjects in this age group each owned two factors.

No subjects from among 50 subjects in the target populations owned three or more factors.

As illustrated in FIG. 34, by comparing the total numbers of factors that subjects in their 40s to 60s developed, it can be understood that there is a positive correlation between the age group and the total number of factors. This correlation can be seen in the subjects in the 20s and 30s age groups. In other words, it can be understood that the total number of factors tends to simply increase with age. Thus, it can be understood that it is effective to use the number of aging impression axes to have an aging determination of the subject.

Further, a cluster analysis was carried out on the basis of the dimensions of the aging impression axes that each of the subjects in the 40s or above age groups in FIG. 34 possesses. The Ward's method was used for the analysis. FIG. 35 is an example of a table showing groups of the aging tendency. In the face impression analyzing device 100, it is preferable to store this table in the tendency information storage unit 74 (see FIG. 1 and FIG. 6). The face impression determining unit 60 determines a group of the aging tendency to which the subject belongs on the basis of the amount of revelation of each of the feature values calculated by the face component analyzing unit 50. Then, it is preferable to output this result of determination by the aesthetic information outputting unit 80.

In other words, as for the aesthetic information outputted in the aesthetic counseling method according to the exemplary embodiments, it may be possible to use information indicating the group of impression tendency that the subject belongs to and that is selected according to the percentage of contribution of the feature value (base vector).

In FIG. 35, four groups, which are from type I to type IV, are given as the groups of the aging tendency. The type I is a group into which subjects who develop 1σ or more of the aging impression axes other than the aging impression axis of the second-dimension are categorized. In other words, subjects that develop only one or more principal components of the seventh-dimension, the ninth-dimension, and the eleventh-dimension with the amount of 1σ or more toward the aging tendency are categorized into the type I. The type II is a group into which subjects who develop 1σ or more of only either one of or both of the second-dimension and the ninth-dimension toward the aging tendency are categorized. The type III is a group into which subjects who develop 1σ or more of only either one of or both of the second-dimension and the seventh-dimension toward the aging tendency are categorized. The type IV is a group into which subjects who develop 1σ or more of only either one of or both of the second-dimension and the eleventh-dimension toward the aging tendency are categorized.

Example 2

Principal component analysis was applied to the target population analysis model in a similar manner except that the number of homologous models is larger than that in Example 1. The target population of subjects is formed by 148 Japanese females in total including 29 subjects in their 20s, 29 subjects in their 30s, 30 subjects in their 40s, 30 subjects in their 50s, and 30 subjects in their 60s. Base vectors up to 147 dimensions were obtained through principal component analysis. FIG. 36 is a table showing percentages of contribution and accumulated percentages of contribution for up to the twentieth-dimension of the 147 dimensions, part of which is omitted. The accumulated percentage of contribution of the principal component up to the twentieth base exceeded 80%, more specifically 87.3%. Further, the percentage of contribution related to each of the principal components corresponding to the twentieth-dimension and higher (more specifically, the eighteenth-dimension and higher) was less than 1%.

As for the average facial form of the target population analysis model, the features of form variation in association with each principal component when the weighting factors for the first principal component and the following principal components are varied were examined. FIG. 37 illustrates forms of the face associated with the respective principal components of the first-dimension to the 36th-dimension, part of which are omitted.

Five aesthetic specialists estimated the ages of 148 subjects by observing a photograph of each of the subjects, and the average value of the ages estimated by five aesthetic specialists was calculated as "apparent age." The relationship between the weighting factors (eigenvalue) for the first base to the 20th base of each of the subjects and the apparent age of each of the subjects was obtained. FIG. 38 is a table showing simple correlation coefficients between the weighting factor for each dimension of base and the apparent age. The base having the absolute value of the simple correlation coefficient of 0.2 or higher is judged to be a significant aging factor. In Example 2, five dimensions of bases, including the first-dimension, the ninth-dimension, the tenth-dimension, the twelfth-dimension, and the twentieth-dimension, had a high correlation with the apparent age. Further, the ninth-dimension and the tenth-dimension had a negative correlation coefficient, and the first-dimension, the twelfth-dimension, and the twentieth-dimension had a positive correlation coefficient. As a result, it was found that, with the increase in the aging of the subject, the principal components of the ninth-dimension and the tenth-dimension advance toward the minus direction, and the principal components of the first-dimension, the twelfth-dimension, and the twentieth-dimension advance toward the plus direction.

More specifically, as the first principal component advances toward the plus direction, the lower part of the face bulges, in other words, the tendency for the lower part of the cheek to bulge can be seen. As the ninth principal component advances toward the minus direction, the tendency that the angulus oris deepens toward the back, the width of the nose widens, and the outer canthus sags can be seen. As the tenth principal component advances toward the minus direction, the tendency that the width of the orbit and the width of the cheeks become narrow, and the lower jaw protrudes can be seen. Further, as compared to other aging factors, the degree of deepening of the nasolabial sulcus was small when the tenth principal component was changed. As the twelfth principal component advances toward the plus direction, the tendency that the angulus oris was drawn downward, the height of the nose lowers, and the portion below the jaw loosens can be seen. As the twentieth principal component advances toward the plus direction, the tendency that the portion below the nose extends, the tubercle of upper lip lowers, and the outer canthus sags can be seen. These are changes in impression tendencies of the face of the Japanese females when their aging advances.

The impression changed image in which the impression tendency of the facial shape in the subject analysis model or average face model is changed was generated by varying the weighting factors for the first, the ninth, the tenth, the twelfth, and the twentieth principal components, which are aging factors, toward the aging direction or the rejuvenating direction.

In Example 2, the target population was classified into plural groups in accordance with the impression tendency of the face, and the group to which each of the subjects belongs was obtained on the basis of the tendency of the amount of revelation of the five aging factors (weighting factor). More specifically, the target population was classified into plural groups in accordance with the degree of match in terms of the tendency of the weighting factors related to the aging factors. The group classification method is not specifically limited. One example of this method includes setting scores for the principal components of the five aging factors as a distance function, and making classification into a predetermined number of groups through a cluster analysis method such as the Ward's method.

In this embodiment, the population was classified into four groups ranging from the type I to the type IV.

Figure 39:
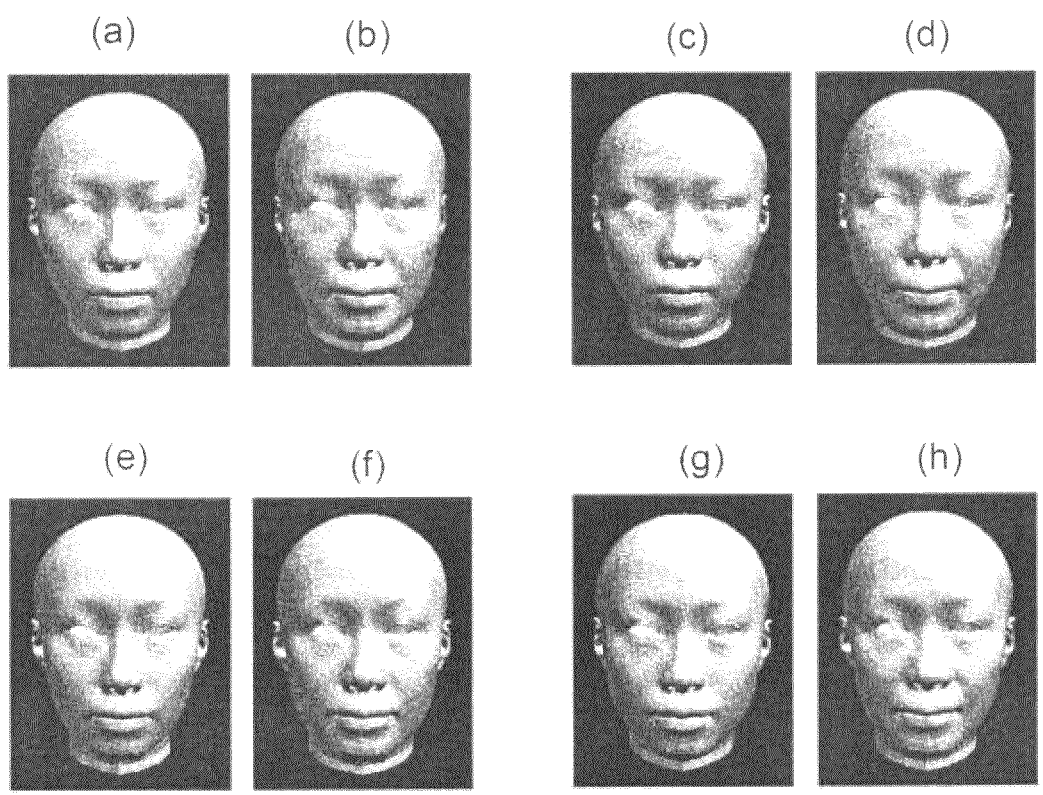
FIG. 39(a) is an elevation view illustrating an average facial form for a younger age group in a type I.
FIG. 39(b) is an elevation view illustrating an average facial form for an advanced age group in the type I.
FIG. 39(c) is an elevation view illustrating an average facial form for a younger age group in a type II.
FIG. 39(d) is an elevation view illustrating an average facial form for an advanced age group in the type II.
FIG. 39(e) is an elevation view illustrating an average facial form for a younger age group in a type III.
FIG. 39(f) is an elevation view illustrating an average facial form for an advanced age group in the type III.
FIG. 39(g) is an elevation view illustrating an average facial form for a younger age group in a type IV.
FIG. 39(h) is an elevation view illustrating an average facial form for an advanced age group in the type IV.

The type I contains 39 subjects (26%) from among the target population formed by 148 persons, and the average of the apparent ages thereof was 44.7 years old. The feature of this group is that the subjects in the type I each have a large amount of the ninth and the twelfth principal components. FIG. 39(*a*) is an elevation view illustrating an average facial form model for 20 persons with the ages of not less than 24 years old and less than 46 years old in the type I (younger age group). FIG. 39(*b*) is an elevation view illustrating an average facial form model for 19 persons with the ages of not less than 46 years old and less than 65 years old in the type I (advanced age group).

Similarly, FIG. 39(*c*) is an elevation view illustrating an average facial form model for 20 persons with the ages of not less than 22 years old and less than 46 years old in the type II (younger age group), and FIG. 39(*d*) is an elevation view illustrating an average facial form model for 19 persons with the ages of not less than 46 years old and less than 68 years old in the type II (advanced age group).

FIG. 39(*e*) is an elevation view illustrating an average facial form model for 20 persons with the ages of not less than 21 years old and less than 47 years old in the type III (younger age group), and FIG. 39(*f*) is an elevation view illustrating an average facial form model for 19 persons with the ages of not less than 47 years old and less than 63 years old in the type III (advanced age group).

FIG. 39(*g*) is an elevation view illustrating an average facial form model for 20 persons with the ages of not less than 23 years old and less than 46 years old in the type IV (younger age group), and FIG. 39(*h*) is an elevation view illustrating an average facial form model for 19 persons with the ages of not less than 46 years old and less than 65 years old in the type IV (advanced age group).

FIG. 40(*a*) to FIG. 40(*d*) are tables each showing the average of the scores for the principal components for each of the aging factors related to the subjects in the type I to the type IV. FIG. 40(*a*) is a table showing the averages of the scores for the principal components of each of the five aging factors related to all the 39 persons in the younger age group and the advanced age group belonging to the type I, the average values of the scores for the principal components related to the younger age group, and the average values of the scores for the principal components related to the advanced age group. As a result, it can be found that the younger age group of the subjects belonging to the type I had high scores in the ninth and the twelfth principal components, and the advanced age group had a significantly high score in the twelfth principal component. F-tests were carried out to the two groups: the younger age group and the advanced age group in the type I. The test results for the ninth-dimension and the twelfth-dimension were larger than 0.05. Thus, the distribution of the scores for the principal components in these aging factors can be regarded as being statistically homoscedastic. Under this assumption, t-tests were carried out to the two groups: the younger age group and the advanced age group. The test result for the ninth-dimension was less than 0.01, and it can be found that the significant difference exists between the younger age group and the advanced age group. On the other hand, the test result for the twelfth-dimension was 0.01 or more, and the significant difference could not be found.

The signs of the positive (+) and the negative (−) shown outside the table in FIG. 40(*a*) represent reference characters indicating the aging direction directed from the younger age group to the advanced age group. For example, for the ninth-dimension, which is one of the aging factors, the aging direction directed from the younger age group to the advanced age group is indicated by multiplying the negative sign by the average of the scores for the principal components. From these results, it can be found that all the subjects in the type I commonly have the twelfth principal component throughout the entire age groups, and with the aging change from the young to the old, the score of the ninth principal component having the negative sign added thereto is changed from the small value (−0.708) to the middle value (+0.206). Here, the expression "score for the principal component being a small value" means a negative value and its absolute value being more than or equal to 0.25. Similarly, the expression "score for the principal component being a middle value" means that the absolute value thereof is less than 0.25. Further the expression "score for the principal component being a large value" means a positive value, and that the absolute value is 0.25 or more.

Similarly, from the results in FIG. 40(*b*), it was found that the subjects belonging to the type II have the significantly large scores for the tenth and the twentieth principal components. Further, it was found that, with the aging change, the scores for the tenth principal component having the negative sign added thereto are changed from the small value (−1.200) to the middle value (−0.169), and the scores for the twentieth principal component having the positive sign added thereto are changed from the large value (+0.406) to the further larger value (+1.478).

From the results in FIG. 40(*c*), it was found that the subjects belonging to the type III have the significantly large scores for the ninth and the tenth principal components. Further, it was found that, with the aging change, the scores for the ninth principal component having the negative sign added thereto are changed from the small value (−1.004) to the middle value (−0.151), and the scores for the tenth principal component having the negative sign added thereto are changed from the large value (+0.456) to the further larger value (+1.208).

From the results of FIG. 40(*d*), it was found that the subjects belonging to the type IV have the significantly large scores for the ninth principal component. It was found that, with the aging change, the scores for the ninth principal component having the negative sign added thereto are changed from the relatively large value (+0.440) to the further larger value (+1.335).

From the results of analysis, by selecting a group to which a given subject belongs from the type I to the type IV, and applying, to the subject analysis model, the above-described tendencies of the aging change averagely indicated by subjects belonging to the selected group serving as the target population, it is possible to simulate the facial form of the subject when the subject gets older or the facial form of the subject in the case where the subject gets younger (past). This simulation is based on the results of the statistical analysis applied to the facial forms of the large number of sample providers, and it can be said that this simulation is a calculation having a high probability of simulating the actual aging change of the subject.

FIG. 41(*a*) is a table showing partial regression coefficients and a constant term for each significant aging factor concerning the subjects belonging to the type I (hereinafter, referred to as a significant aging factor). The significant aging factors for the subjects belonging to the type I are the ninth and the twelfth principal component. Similarly, FIG. 41(*b*) to FIG. 41(*d*) are tables each showing partial regression coefficients and a constant term for each significant aging factor concerning the type II to the type IV, respectively. In this exemplary embodiment, the significant aging factor for the subjects belonging to the type IV is only the ninth-dimension. However, in this specification, the (simple) regression coefficient and the partial regression coefficient are not specifically separated. The number of significant figures of the partial regression coefficient may be set depending on the number of persons in the target population or other conditions. By using the scores for the principal component of the significant aging factor as a predictor variable, it may be possible to express the apparent age, which is the target variable, in a form of the multiple regression equation using these partial regression coefficients and the constant term.

In the face impression analyzing device 100 in FIG. 1, it is preferable to store the values (aging calculation coefficient) shown in these tables in the tendency information storage unit 74 so as to be associated with each of the significant aging factors. The impression changed image generating unit 90 sets, as a distance function, scores for the principal component associated with the amount of revelation of each of the five aging factors extracted from the subject analysis model, and selects a group that minimizes this distance function from the type I to the type IV. Next, the impression changed image generating unit 90 acquires, from the tendency information storage unit 74, the aging calculation coefficient of the significant aging factor corresponding to this selected group. Then, the impression changed image generating unit 90 receives input of aging range information from a user through the condition input unit 30. This aging range information is information that indicates the range of change in the apparent age of a subject increased or decreased from the current apparent age. The aging range information takes a positive value in the case where the apparent age increases, and takes a negative value in the case where the apparent age decreases.

The impression changed image generating unit 90 adds the aging range information to the apparent age of the subject to calculate the age after the aging changes (age after change). The impression changed image generating unit 90 obtains a predictor variable (significant aging factor) corresponding to this age after change on the basis of a (multiple) regression equation with the aging calculation coefficients. Here, the significant aging factors or the combinations thereof differ according to the groups from the type I to the type VI to which subjects belong. As described above, the significant aging factors of the type I are the ninth-dimension and the twelfth-dimension, the significant aging factors for the type II are the 10th-dimension and the 20th-dimension, the significant aging factors of the type III are the ninth-dimension and the tenth-dimension, and the significant aging factor of the type IV is only the ninth-dimension.

The impression changed image generating unit 90 calculates each of predicator variables, whose solution is the desired age after change, through a multiple regression equation having predictor variables formed by scores for the principal components related to the significant aging factors (for example, two factors: ninth-dimension and twelfth-dimension in the case of the type I) corresponding to the type to which the subject belongs. More specifically, it is preferable to calculate the predictor variable in a form of a multiple of the standard deviation of the weighting factor $b_i$ of each of the significant aging factors.

The impression changed image generating unit 90 applies the newly obtained weighting factor $b_i$ (for example, i=9, 12 in the case of the type I: see Equation 1 above) to the subject analysis model to make a reconfiguration, thereby generating the impression changed image.

It should be noted that, in the above descriptions, the weighting factor $b_i$ for the desired age after change is calculated by changing the score for the principal component of the significant aging factor on the basis of the multiple regression equation having predictor variables formed by only one or two significant aging factors for each of the groups from the type I to the type IV. However, the present invention is not limited to this. It may be possible to calculate the score for the principal component and the weighting factor whose solution is the age after change on the basis of the multiple regression equation having the predictor variables formed by all the aging factors including the significant aging factors (five aging factors: the first-dimension, the ninth-dimension, the tenth-dimension, the twelfth-dimension, and the twentieth-dimension in Example 2). Then, the subject analysis model is reconfigured by changing the weighting factor related to the aging factor, whereby it is possible to generate the impression changed image in which the facial form of a subject is aged (or rejuvenated) in a desired manner. Here, if only the weighting factor related to the significant aging factor is changed as in Example 2, it is possible to generate the impression changed image retaining the facial form with the uniqueness and naturalness of the target subject, and this is more preferable.

FIG. 42(*a*) is a perspective view illustrating an average facial form model of all the subjects belonging to the type I (averaged apparent age is 44.7 years old). In other words, FIG. 42(*a*) illustrates the average form of the faces of the subjects with the apparent age of approximately 45 years old and possessing an impression tendency in which the ninth and the twelfth-principal components are notable.

FIG. 42(*b*) is a perspective view illustrating a state where the apparent age of the average facial form model illustrated in FIG. 42(*a*) is rejuvenated to approximately 30 years old. FIG. 42(*c*) is a perspective view illustrating a state where the apparent age of the average facial form model illustrated in FIG. 42(*a*) is aged to approximately 60 years old.

From comparison between FIG. 42(*b*) and FIG. 42(*c*), the calculation results with the aging direction based on Example 2 can be seen. More specifically, in the form of the face illustrated in FIG. 42(*b*), which is a rejuvenated image, the nasolabial sulcus and the angulus oris are shallow. On the other hand, in the form of the face illustrated in FIG. 42(*c*), which is an aged image, it can be seen that the nasolabial sulcus and the angulus oris are deep, the lower part of the cheek bulges, and the outer canthus sags.

FIG. 43(*a*) is an elevation view illustrating the average face of 20 persons belonging to the younger age group in the type I. This drawing is a composite photographed image corresponding to the average face model illustrated in FIG. 39(*a*). FIG. 43(*b*) is an elevation view illustrating an average face of 19 persons belonging to the advanced age group in the type I. This drawing is a composite photographed image corresponding to the average face model illustrated in FIG. 39(*b*). The average apparent age of the younger age group was 30 years old, and the average apparent age of the advanced age group was 57 years old. It can be said that FIG. 43(*a*) shows the average facial form of actual young subjects, and FIG. 43(*b*) shows the average facial form of actual advanced aged subjects. Further, by comparing FIG. 42(*b*) with FIG. 43(*a*), and FIG. 42(*c*) with FIG. 43(*b*), it can be understood that the aging tendency appearing in the average facial form model can be also seen in the actually existing subjects. More specifically, it is confirmed that the nasolabial sulcus and the angulus oris of the young subjects illustrated in FIG. 43(*a*) are shallow, the nasolabial sulcus and the angulus oris of the aged subjects illustrated in FIG. 43(*b*) are deep, the lower part of the cheek bulges, and the outer canthus sags.

FIG. 44(*a*) is a perspective view illustrating an average facial form model of all the subjects belonging to the type II (averaged apparent age is 42.9 years old). In other words, FIG. 44(*a*) illustrates the average facial form of the subjects with ages equivalent to the above-described average age and possessing an impression tendency in which the tenth and the twentieth principal components are notable.

FIG. 44(*b*) is a perspective view illustrating a state where the apparent age of the average facial form model of the subjects belonging to the type II is rejuvenated to approximately 30 years old. FIG. 44(*c*) is a perspective view illustrating a state where the apparent age of the average facial form model of the subjects belonging to the type II is aged to approximately 60 years old.

FIG. 45(*a*) is a perspective view illustrating an average facial form model of all the subjects belonging to the type III (averaged apparent age is 46.3 years old). In other words, FIG. 45(*a*) illustrates the average form of the faces of the subjects with ages equivalent to the above-described average age and possessing an impression tendency in which the ninth and the tenth principal components are notable.

FIG. 45(*b*) is a perspective view illustrating a state where the apparent age of the average facial form model of the subjects belonging to the type III is rejuvenated to approximately 30 years old. FIG. 45(*c*) is a perspective view illustrating a state where the apparent age of the average facial form model of the subjects belonging to the type III is aged to approximately 60 years old.

FIG. 46(*a*) is a perspective view illustrating an average facial form model of all the subjects belonging to the type IV (averaged apparent age is 43.6 years old). In other words, FIG. 46(*a*) illustrates the average form of the faces of the subjects with ages equivalent to the above-described average age and possessing an impression tendency in which only the ninth principal components of all the aging factors are notable.

FIG. 46(*b*) is a perspective view illustrating a state where the apparent age of the average facial form model of the subjects belonging to the type IV is rejuvenated to approximately 30 years old. FIG. 46(*c*) is a perspective view illustrating a state where the apparent age of the average facial form model of the subjects belonging to the type IV is aged to approximately 60 years old.

As for the type II to the type IV, by comparing the average faces (not illustrated) of the subjects between the actually existing younger age group and the actually existing advanced age group in a similar manner to that for FIG. 43(a) and FIG. 43(b), it was confirmed that, in each of the groups, the tendency of the amount of revelation of each of the aging factors is well simulated. Therefore, it is understood that, according to the face image generating method in Example 2, it is possible to generate the impression changed image that simulates aging and rejuvenating of the actual subject in a highly accurate manner. Further, although the apparent age is used as the impression tendency in Example 2, it is confirmed that a similar result can be obtained by using the actual ages of the subjects instead (not illustrated).

It should be noted that it is preferable to output and display the generated impression changed image with the aesthetic information outputting unit 80 (see FIG. 1) to provide it to the subject.

By summarizing the results of Example 2, the following effectivenesses of the face image generating method are obtained. First, on the assumption that the degree of the impression tendency is the apparent age or actual age of the subject, a target population is classified, according to the age, into a first group (for example, younger age group) that includes the subject and a second group (for example, advanced age group) that does not include the subject. Then, a first weight is applied to an aging factor (the ninth base vector in the case of the type I) that develops in either the first group or the second group in an imbalanced manner, and a second weight smaller than the first weight is applied to aging factors (the first, the tenth, and the twentieth base vectors in the case of the type I) that develop in both the first group and the second group, whereby the score for the principal component (weighting factor) is changed.

Here, the sizes of the first and the second weights each correspond to the size of a value obtained by multiplying the percentage of contribution shown in FIG. 36 and the absolute value of the partial regression coefficient shown in the table in FIG. 41(a). In other words, the groups of the type I to the type IV are further classified into the younger age group and the advanced age group; factors that develop notably in either of the age groups are estimated to be governing aging factors in each of the groups; a larger weight is set as the aging factor; and an impression changed image is generated. With these processes, it is possible to obtain an impression changed image that simulates aging or rejuvenating of the subject with a high probability. Thus, at the time of changing the age of the facial form of a subject, it is preferable to do this within the range between the average ages of the younger age group and the advanced age group. In other words, it is preferable that the apparent age or actual age that has been changed by a predetermined amount falls within a range between the average age of the first group (for example, younger age group) and the average age of the second group (for example, advanced age group). This makes it possible to obtain the score for the principal component of the aging factor after the age is changed within a predetermined aging range, on the basis of the interpolation operation of the average value of the first group and the average value of the second group.

In Example 2, the target population of the subjects is classified into the groups of the type I to the type IV, and is further classified into the younger age group and the advanced age group. Further, the imbalance of the amounts of revelation of the aging factors is analyzed. However, the present invention is not limited to this. It may be possible to classify the entire target population into the younger age group and the advanced age group without classifying it into the groups of the type I to the type IV, analyze the imbalance of the amounts of revelation of the aging factors, and identify the governing aging factor.

Further, as for the method of classifying the target population of the subjects into the plural groups, the cluster analysis based on the degree of match of the aging factors is used in this Example. However, the present invention is not limited to this. It may be possible to classify the target population into plural groups on the basis of measurable form-related features such as dimensions or relative positions of a specific portion in the facial form of a subject.

Part of the subjects belonging to the target population may belong to both the first group and the second group. In other words, in Example 2, the subjects are classified into the younger age group and the advanced age group with 46 years old as the borderline, fitting into either group, without leaving any subject out or putting them into both groups. However, the present invention is not limited to this. For example, it may be possible to set the first group to be formed by subjects aged not less than 24 years old and not more than 50 years old, and set the second group to be formed by subjects aged not less than 40 years old and not more than 60 years old. Even if part of the subjects belong to both groups, the adequacy of the method according to the present invention, which includes analyzing the aging tendency on the basis of the tendency of revelation of the feature values in the average facial form within each of the groups, remains valid. Further, it may be possible to classify the target population into three or more groups including, for example, the younger age group, the intermediate age group, and the advanced age group. Further, it may be possible to specify, as the governing factor, a factor having the amount of revelation gradually increasing from the younger age group toward the intermediate age group, and from the intermediate age group toward the advanced age group from among the aging factors, and provide a subject with an aesthetic treatment method or cosmetics that reduces the revelation of the specified factor. Further, it may be possible to specify an aging factor that only develops in the advanced age group and does not develop in the younger age group and the intermediate age group, and provide a subject with an aesthetic treatment method or cosmetics that reduces the revelation of this factor.

Further, in Example 2, the target population of the subjects is classified into the plural groups in the face impression analyzing method. However, as in Example 1, the target population may be similarly classified into plural groups in the aesthetic counseling method that outputs aesthetic information such as an aesthetic treatment method in accordance with the degree of the impression tendency of the facial shape of a subject. In other words, it is preferable to classify the target population formed by plural subjects into plural groups, and obtain a group to which a subject belongs on the basis of the amount of revelation of each feature value on the subject's face. More specifically, it is preferable to classify the target population into plural groups according to the degree of match of tendencies of plural weighting factors for plural base vectors (the aging factors) having a high correlation with an impression tendency.

At the time of providing the aesthetic counseling method, it is preferable to classify the target population into plural groups according to the degree of match of tendencies of plural weighting factors for plural base vectors (the aging factors) having a high correlation with an impression tendency (apparent age), and obtain a group to which a subject belongs on the basis of the amount of revelation of each feature value on the subject's face. Then, it is preferable to output aesthetic information associated in advance with the group to which the subject belongs. In Example 1, descriptions have been made that the aesthetic treatment methods are stored in a table (see FIG. 8) so as to be associated with each of the aging factors. However, alternatively, it may be possible to store the aesthetic treatment methods in a table, not illustrated, so as to be associated in advance with each group classified according to tendencies of the amount of revelation of the aging factors.

More specifically, as for the aesthetic information for improving the aging tendencies of the subjects belonging to the type I to the type IV, it is preferable to store, in the tendency information storage unit 74, information indicating an aesthetic treatment method including any of a cosmetic surgery method, an aesthetic massage method, a hair makeup method, and a cosmetic makeup method, hair cosmetics, and cosmetics for makeup, so as to be associated with each of the groups of the type I to the type IV. It is preferable for the face impression determining unit 60 to determine a group to which a subject belongs on the basis of the weighting factor for the aging factor that the subject analysis model has, refer to the tendency information storage unit 74, further acquire the aesthetic information associated with the group thus determined, and output it with the aesthetic information outputting unit 80. With these processes, the aesthetic information suitable for the group to which the subject belongs is provided. Since the tendencies of revelation of the aging factor for the subjects belonging to this group are common to each other, it is estimated that the aesthetic treatment method or cosmetics that suppresses the aging factor has a high aesthetic effect on these subjects. Thus, according to this aesthetic counseling method, it is possible to propose an aesthetic treatment method or cosmetics effective for each of the subjects.

By comparing FIG. 42(*a*), FIG. 44(*a*), FIG. 45(*a*), and FIG. 46(*a*), it was found that no significant difference can be seen in the facial forms at the age of 45 years old, which is closer to the average age for each of the groups. This means that, with regards to the types I to the type IV, which are classified according to the degree of match of the tendencies of the amount of revelation of the aging factors, the subjects belonging to each of the groups are adequately homoscedastic at a degree at which no significant difference can be seen in the average forms of the faces at this time. Further, by comparing the rejuvenated images illustrated in FIG. 42(*b*), FIG. 44(*b*), FIG. 45(*b*), and FIG. 46(*b*), differences can be seen in the facial forms. Yet further, by comparing the aged images illustrated in FIG. 42(*c*), FIG. 44(*c*), FIG. 45(*c*), and FIG. 46(*c*), significant differences can be seen in the facial forms.

More specifically, from the aged image on the type I illustrated in FIG. 42(*c*), it can be understood that the lower parts of the cheeks bulge, the lower part of the face expands, which advances aging, and the angulus oris deepens toward the back. Thus, it is preferable to store the type I so as to be associated with the aesthetic information related to the portion of the face ranging from the middle to the lower parts, which includes, for example, applying highlight having a high brightness to the cheeks, which are located above the mouth, or applying a lip liner with high chroma in a manner such that the angulus oris looks sharp.

In the aged image on the type II illustrated in FIG. 44(*c*), the tendency that the outer canthus sags downward and the tubercle of upper lip lowers can be seen. Thus, it is preferable to store the type II so as to be associated with the aesthetic information related to the vicinity of the eyes including applying eyebrow makeup in a manner such that the outer end of the eyebrow lifts, and the aesthetic information related to the vicinity of the lip including application of the lip liner.

In the aged image on the type III illustrated in FIG. 45(*c*), the tendency that, although the nasolabial sulcus is shallow, upward slanted eyes can be seen. Thus, it is preferable to store the type III so as to be associated with the aesthetic information related to the middle portion of the face including applying highlight to the cheeks.

In the aged image on the type IV illustrated in FIG. 46(*c*), the tendency that the angulus oris lowers, the nasolabial sulcus deepens, and the outer canthus sags downward can be seen. Thus, it is preferable to store the type IV so as to be associated with the aesthetic information related to the vicinity of the lip including applying the lip liner and the aesthetic information related to the entire face including, for example, applying concealer that hides the nasolabial sulcus and applying eyebrow makeup that lifts the outer end of the eyebrow.

The type I and the type III have a common tendency of sagging downward of the cheeks, which relates to a change in the form of the outline of the face as a whole due to aging. These effects are common in that base makeup cosmetics, rather than makeup cosmetics, are more effective in suppressing the aging impression. On the other hand, the type II and the type IV have a common tendency of sagging downward of the outer canthus, which relates to a significant change in the form of parts (partial component) of the face due to aging. These are common in that makeup cosmetics, rather than the base makeup cosmetics, are more effective in suppressing the aging impression.

Thus, in the face impression analyzing device 100, it is preferable to store the group significantly developing the tendency of the change in the form of the outline of the face as a whole due to aging, so as to be associated with the base makeup cosmetics, and store the group significantly developing the tendency of the change in the form of the partial component of the face due to aging, so as to be associated with the makeup cosmetics.

In Example 2, the target population is classified into the first group and the second group according to ages. However, the present invention is not limited to this. Another example may include classifying the target population into the first group to which subjects belong and the second group to which subjects do not belong according to hometowns or regions. With this classification, it is possible to specify feature values (base vectors) that govern the impression tendency of the facial shape resulting from the hometown or region. Then, by generating an impression changed image in which the amount of revelation of each of the feature values in a subject analysis model has been changed, it is possible to estimate the facial form of descendants of the subject.

Example 3

The degree of the impression tendency of the facial shape other than aging was analyzed using the target population analysis model and the results of the principal component analysis, which are common to Example 2.

Five aesthetic specialists observed a photograph of each of 148 subjects, and evaluated the degree of the adult face and the baby face into seven levels ranging from zero to six. The evaluation value increases with the increase in the strength of the degree of adult face, and the evaluation value decreases with the increase in the strength of the degree of baby face.

FIG. 47 is a table showing simple correlation coefficients between a weighting factor for each dimension of base and the degree of having an adult face. The character "*" is attached to dimensions of bases having a weighting factor larger than the critical value of the 5% significance level, and the character "*" is attached to dimensions of bases having a weighting factor larger than the critical value of the 1% significance level. From this table, it can be understood that the amount of revelation of each of the dimensions of the bases, which are the seventh-dimension, the eighth-dimension, and the tenth-dimension, has a significant correlation with the degree of being the adult face or baby face. Hereinafter, the dimensions of bases of the seventh-dimension, the eighth-dimension, and the tenth-dimension are referred to as adult face factors.

FIG. 48(a) illustrates an average face of 10 subjects with the highest evaluation values of the adult face of all the subjects in the target population. FIG. 48(b) illustrates an average face of 10 subjects with the lowest evaluation values of the adult face, in other words, evaluated as having the highest degree of having a baby face, of all the subjects in the target population. By comparing FIG. 48(a) and FIG. 48(b), it can be understood that the impression of being adult face increases as the positions of eyes become higher, the jaw becomes longer, and the face looks longer shaped.

Next, all the persons in the target population were classified into plural groups through cluster analysis in accordance with the similarity of patterns of revelation of the adult face factors. More specifically, the target population was classified into four groups (clusters). FIG. 49 is a table of comparison including the average of apparent ages of subjects classified into groups from a cluster 1 to a cluster 4, the degree of having an adult face (evaluation value), and the average value of scores for each of the principal components serving as the adult face factors.

FIG. 50(a) illustrates an average face of approximately 30% of subjects belonging to the cluster 1 in the target population. The average face of the cluster 1 had a round face, and the positions of its eyes were equivalent to those of the entire average face. The degree of having an adult face was evaluated as being ordinary.

FIG. 50(b) illustrates an average face of approximately 20% of subjects belonging to the cluster 2 in the target population. The average face of the cluster 2 had a long face, and the positions of its eyes were located higher than those of the entire average face. The average face of the cluster 2 was evaluated as being the highest degree of having an adult face.

FIG. 50(c) illustrates an average face of approximately 24% of subjects belonging to the cluster 3 in the target population. The average face of the cluster 3 had a long face, and the positions of its eyes were located around the middle. The average face of the cluster 3 was evaluated as being relatively high degree of having an adult face.

FIG. 50(d) illustrates an average face of approximately 16% of subjects belonging to the cluster 4 in the target population. The average face of the cluster 4 had a round face, and the positions of its eyes were located lower than those of the entire average face. The average face of the cluster 4 was evaluated as being the lowest degree of having an adult face, in other words, as being baby face.

With this Example, it can be understood that, by quantifying the amounts of revelation of the adult face factors, it is possible to quantitatively analyze the degree of having an adult face or baby face serving as the degree of impression tendency of the face. Further, as in this Example, it is preferable to classify the target population into plural clusters according to the amount of revelation of the adult face factor, and obtain a cluster to which a given subject belongs. With these processes, it is possible to realize the aesthetic counseling method, which provides the aesthetic information for increasing the tendency of being adult face or decreasing the tendency of being adult face (increasing the tendency of being baby face) in accordance with the cluster to which the subject belongs. The aesthetic information includes, for example, information concerning a method of selecting or applying color to the cheeks.

As shown in FIG. 49, of the adult face factors, the eighth base especially had a high principal component score, which was common to the cluster 2 and the cluster 3 each having a relatively high degree of having an adult face. Thus, it may be possible to apply a higher weight to part of the high-degree factors (more specifically, to the eighth base) of the plural adult face factors, apply a weight lower than that described above to other factors, and quantitatively evaluate the degree of having an adult face or baby face.

In this Example, descriptions have been made of classifying the target population including subjects into plural clusters according to the pattern of revelation of the impression tendency. It may be possible to further vary the amount of revelation (weighting factor) of the adult face factor in the facial image of each of the subjects, and then generate the impression changed image. In the face image generating method provided in this Example, the target population is classified into the first group (cluster) that includes a subject and the second group (another cluster) that does not include the subject in accordance with the degree of the impression tendency. Then, the first weight is applied to the base vector that develops in either the first group or the second group in an imbalanced manner, and a second weight smaller than the first weight is applied to the base vector that develops in both the first group and the second group, thereby changing the weighting factor for the base vector. In this Example, it may be possible to multiply a relatively large first weight by the weighting factor for the eighth base, multiply a relatively small second weight by the seventh base and the tenth base, thereby generating the impression changed image.

Example 4

The degree of the impression tendency of the facial shape other than aging was analyzed using the target population analysis model and the results of the principal component analysis common to Example 2 and Example 3.

Five aesthetic specialists observed a photograph of each of 148 subjects, and evaluated the degree of impression from the impression of having a larger face and the impression of having a smaller face into seven levels ranging from zero to six. The evaluation value increases with the increase in the strength of the impression of having a larger face, and the evaluation value decreases with the increase in the strength of the impression of having a smaller face.

FIG. 51 is a table showing simple correlation coefficients between a weighting factor for each dimension of base and the degree of the impression of having a smaller face. The character "*" is attached to dimensions of bases having a weighting factor larger than the critical value of the 5% significance level, and the character "**" is attached to dimensions of bases having a weighting factor larger than the critical value of the 1% significance level. From this table, it can be understood that the amount of revelation of each of the dimensions of the bases, which are the first-dimension, the eleventh-dimension, and the sixteenth-dimension, has a significant correlation with the impression of having a larger face or the impression of having a smaller face. Hereinafter, the bases of the first-dimension, the eleventh-dimension, and the sixteenth-dimension are referred to as smaller face factors.

FIG. 52(a) illustrates an average face of 10 subjects with the highest evaluation value of the impression of having a larger face of all the subjects in the target population. FIG. 52(b) illustrates an average face of 10 subjects with the lowest evaluation value of the impression of having a larger face, in other words, evaluated as being the smallest face of all the subjects in the target population. By comparing to the average face having the impression of having a larger face illustrated in FIG. 52(a), the average face having the impression of having a smaller face illustrated in FIG. 52(b) has a narrow jaw and reduced volume of the lower cheeks, and further, the height at the point where the width of the face is the widest is located at a position almost equal to the position of the eye. On the other hand, the average face having the impression of having a larger face illustrated in FIG. 52(a) has a large jaw, and the lower portions of the cheeks bulge. Further, the height at which the width of the face is the widest is located lower than that of the eye.

Next, cluster analysis was applied to all the subjects in the target population according to the similarity of the patterns of revelation of the smaller face factors, and the target population was classified into plural groups. More specifically, the target population was classified into four groups (clusters). FIG. 53 is a table of comparison including the average of apparent ages of subjects classified into groups from a cluster 1 to a cluster 4, the degree of impression of having a larger face (evaluation value), and the average value of a score for each of the principal components serving as the smaller face factors.

Figure 54:
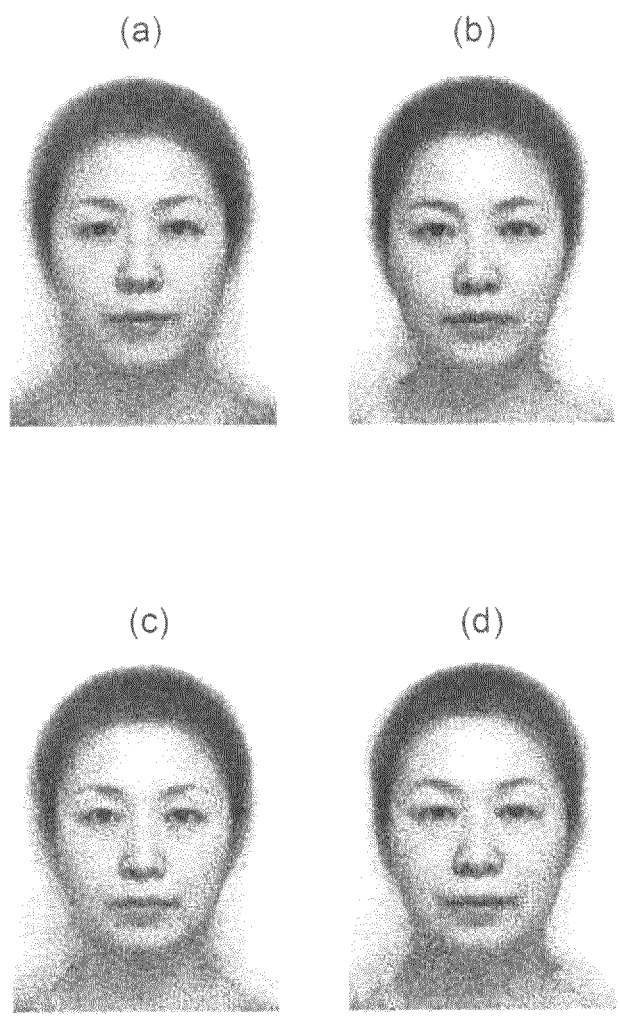
FIG. 54 relate to Example 4.

FIG. 54(a) illustrates an average face of approximately 30% of subjects belonging to the cluster 1 in the target population. The average face of the cluster 1 had a size almost equal to the entire average face. The degree of the large-face impression was evaluated as being ordinary.

FIG. 54(b) illustrates an average face of approximately 26% of subjects belonging to the cluster 2 in the target population. In the average face of the cluster 2, the lower portions of the cheeks slightly bulge as compared with the entire average face. The average face of the cluster 2 was evaluated as being the relatively stronger impression of having a larger face.

FIG. 54(c) illustrates an average face of approximately 24% of subjects belonging to the cluster 3 in the target population. The average face of the cluster 3 had a smaller jaw than the entire average face, and the degree of swelling of the lower cheek was small. The average face of the cluster 3 was evaluated as having the strong impression of having a smaller face.

FIG. 54(d) illustrates an average face of approximately 20% of subjects belonging to the cluster 4 in the target population. The average face of the cluster 4 had a lower cheek more swelling than that of the entire average face. The average face of the cluster 4 was evaluated as having the strongest impression of having a larger face.

From this Example, it can be understood that it is possible to quantitatively analyze the impression of having a larger face or impression of having a smaller face serving as the degree of the impression tendency of the face by quantifying the amounts of revelation of the smaller face factors. Then, as in this Example, it is preferable to classify the target population into plural clusters according to the amount of revelation of the smaller face factor, and obtain a cluster to which a given subject belongs. With these processes, it is possible to realize the aesthetic counseling method, which provides the aesthetic information for increasing the impression of having a smaller face in accordance with the cluster to which the subject belongs. The aesthetic information includes, for example, information concerning cosmetics for makeup with a darker color for the application to the cheeks or jaw to make the line of the jaw look sharp to strengthen the impression of having a smaller face and a cosmetic application method.

Example 5

The degree of the impression tendency of the facial shape other than aging was analyzed using the target population analysis model and the results of the principal component analysis, which are common to Example 2 to Example 4.

Five aesthetic specialists observed a photograph of each of 148 subjects, and evaluated the sizes of the eyes into seven levels ranging from zero to six. The evaluation value increases with the increase in the impression of having larger eyes, and the evaluation value decreases with the increase in the impression of having smaller eyes.

FIG. 55 is a table showing simple correlation coefficients between a weighting factor for each dimension of base and the degree of the impression of the size of the eyes. The character "*" is attached to dimensions of bases having a weighting factor larger than the critical value of the 5% significance level, and the character "**" is attached to dimensions of bases having a weighting factor larger than the critical value of the 1% significance level. From this table, it can be understood that the amount of revelation of each of the dimensions of the bases, which are the 12th-dimension, the 26th-dimension, and the 36th-dimension, has a significant correlation with the degree of the impression of the size of the eyes. Hereinafter, the bases of the 12th-dimension, the 26th-dimension, and the 36th-dimension are referred to as eye size factors.

FIG. 56(a) illustrates an average face of 10 subjects with the highest evaluation value of the size of the eyes of all the subjects in the target population. FIG. 56(b) illustrates an average face of 10 subjects with the lowest evaluation value of the size of the eyes of all the subjects in the target population. By comparing FIG. 56(a) and FIG. 56(b), it can be understood that the average face illustrated in FIG. 56(a) evaluated as having the large eyes not only has large eyes, but also has a small distance measured from the position of the widest width of the face to the outer canthus.

Next, cluster analysis was applied to all the subjects in the target population according to the similarity of the patterns of revelation of the eye size factors, and the target population was classified into plural groups. More specifically, the target population was classified into four groups (clusters). FIG. 57 is a table of comparison including the average of apparent ages of subjects classified into groups from a cluster 1 to a cluster 4, the degree of the impression of having large eyes (evaluation value), and the average value of a score for each of the principal components serving as the eye size factors.

FIG. 58(a) illustrates an average face of approximately 30% of subjects belonging to the cluster 1 in the target population. The average face of the cluster 1 had a round face, and was a face that gives an impression of having eyes smaller than those of the entire average face.

FIG. 58(b) illustrates an average face of approximately 28% of subjects belonging to the cluster 2 in the target population. The average face of the cluster 2 had a long face, and gave an impression of having eyes larger than those of the entire average face.

FIG. 58(c) illustrates an average face of approximately 22% of subjects belonging to the cluster 3 in the target population. The average face of the cluster 3 had a long face, and gave an impression of having eyes smaller than those of the entire average face.

FIG. 58(*d*) illustrates an average face of approximately 20% of subjects belonging to the cluster 4 in the target population. The average face of the cluster 4 had a small face, and gave an impression of having eyes larger than those of the entire average face have.

From this Example, it can be understood that it is possible to quantitatively analyze the degree of the impression of having larger eyes serving as the degree of the impression tendency of the face by quantifying the amount of revelation of the eye size factors. Then, as in this Example, it is preferable to classify the target population into plural clusters according to the amount of revelation of the eye size factors, and obtain a cluster to which a given subject belongs. With these processes, it is possible to realize the aesthetic counseling method, which provides the aesthetic information for giving the impression of having large eyes in accordance with the cluster to which the subject belongs. One example of the aesthetic information includes information concerning a method of selecting colors of eye shadows or inner line or a method of applying them.

In place of Examples described above, it may be possible to quantitatively evaluate the degree of various impression tendencies of the facial shape. For example, as a modification example of Example 3, it may be possible to evaluate the degree of having a round face or a long face. Further, it may be possible to evaluate, for example, the "degree of having masculine or feminine facial features," the "degree of having oriental or occidental facial features," and the "degree of having the impression of a straight nose." Yet further, it may be possible to quantitatively evaluate the degree of sensory impression tendencies of the facial shape such as the "degree of the facial form that looks healthy," the "degree of the facial form that looks attractive," and the "degree of the facial form that gives a good appearance impression." Each of these impression tendencies is associated with one or more feature values (bases), and in this associated way, is stored as the tendency information PI (FIG. 5) in the tendency information storage unit 74 (FIG. 1). At this time, as a result of a study made by the present inventor, it has been already known that, for example, the "degree of the facial form that looks attractive" increases if the face has the high degree of impression of having a smaller face and gives a strong impression that the eyes are large. Thus, on the basis of the amount of revelation (weighting factor) of the feature values (bases) common to plural impression tendencies, it may be possible to quantitatively evaluate the degree of other impression tendencies.

In the aesthetic counseling method provided in Examples described above and modification examples of these Examples, the degree of the impression tendency includes the degree at which a subject has an adult face or baby face, the degree of the impression of having a smaller face, the degree of having a round face or long face, and the degree of the impression given by the sizes of the eyes. Further, the aesthetic information that has been associated in advance with a group (cluster) to which the subject belongs and a group to which the subject does not belong is outputted. The aesthetic information is information indicating an aesthetic treatment method including at least one method of a cosmetic surgery method, an aesthetic massage method, a hair makeup method, and a cosmetic makeup method, or hair cosmetics, or cosmetics for makeup.

The aging factors in Example 2, the adult face factors in Example 3, the smaller face factors in Example 4, and the eye size factor in Example 5 are each formed by plural base vectors. At least one base vector constituting each of the factors is different from each other. More specifically, the ninth and the twentieth bases for the aging factors, the seventh and the eighth bases for the adult face factors, the eleventh and the sixteenth bases for the smaller face factors, and the 26th and the 36th bases for the eye size factors are unique base vectors, and are not included in other factors.

In the aesthetic counseling method provided in Examples described above and modification examples of these Examples, an impression changed image of a subject may be displayed and outputted to the subject. At this time, it is preferable to perform the display and output in a way that contrasts the current face image of the subject with the impression changed image. Further, it may be possible to generate an aesthetic simulation image that simulates a subject's face subjected to an aesthetic treatment method that includes the hair makeup method or cosmetic makeup method and does not change the form of the surface of the subject's face, and display and output this aesthetic simulation image so as to be compared with the impression changed image. This makes it possible to show the subject that the impression change obtained by applying the aesthetic treatment method is a simulation of an impression change obtained by changing the form of the face of the subject. In other words, the subject can visually check the hair makeup method or cosmetic makeup method that changes the impression tendency almost equally to the change of the facial form of a subject into the adult face or smaller face.

In Examples described above and the modification examples of these Examples, evaluations were made of the young/old of the apparent age or actual age of a subject, the degree of having an adult face or baby face, the degree of the impression of having a smaller face, the degree of having a round face or long face, and the degree of the impression of having large eyes. It may be possible to evaluate plural impression tendencies of all these tendencies. In other words, the degree of the impression tendency, which the face impression analyzing method and the aesthetic counseling method provided in Examples described above are directed to, may be two or more of the following tendencies: the young/old of the apparent age or actual age of the subject, the degree of having an adult face or baby face, the degree of the impression of having a smaller face, the degree of having a round face or long face, and the degree of the impression of having large eyes. Further, one or more feature values, which are associated with each of these two or more impression tendencies, may include base vectors of dimensions different from each other.

For the three impression tendencies: the adult face factor in Example 3, the smaller face factor in Example 4, and the eye size factor in Example 5, the base vectors constituting these impression tendencies are completely different. Thus, the face impression analyzing method and the aesthetic counseling method provided in Examples described above analyze two or more impression tendencies, and one or more feature values, which are associated with each of at least two impression tendencies, may be formed only by base vectors of dimensions different from each other.

The exemplary embodiments and Examples described above disclose technical ideas of the face impression analyzing method, the aesthetic counseling method, and the face impression analyzing system described below.

<1> A face impression analyzing method, including:

on the basis of facial form information representing a form of a facial surface of a subject, and a feature value corresponding to the high-dimension obtained by applying multivariate analysis to target population face information representing three-dimensional forms of facial surfaces of a target population formed by a plurality of persons, calculating an amount of revelation of the feature value in the face of the subject, and obtaining a degree of an impression tendency of a facial shape of the subject on the basis of the amount of revelation.

<2> The face impression analyzing method according to <1> above, in which
the target population face information is a homologous model in which the number of data points and topology are consistent among the faces.

<3> The face impression analyzing method according to <2> above, further including
calculating the feature value of the subject by applying multivariate analysis to the target population face information containing the facial form information, in which
the facial form information of the subject is the homologous model.

<4> The face impression analyzing method according to <1> or <2> above, further including:
applying multivariate analysis to the target population face information that does not contain the facial form information of the subject to obtain plural feature values continuing from the first-dimension to a predetermined dimension; and
calculating, as the amount of revelation, a weighting factor by reproducing the facial form information of the subject through calculation including multiplication and addition applied to the feature values and a weighting factor for each of the feature values.

<5> The face impression analyzing method according to any one of <1> to <4> above, in which
the degree of the impression tendency is a degree of an apparent age, an actual age, an adult face, or a baby face of the subject, or a degree of an impression of having a small face.

<6> The face impression analyzing method according to <5> above, in which
the degree of the impression tendency is an apparent age or actual age of the subject, and
the feature value includes at least one base vector having a high correlation with the impression tendency.

<7> The face impression analyzing method according to any one of <1> to <6> above, in which
the feature value is a base vector having a percentage of contribution of not less than 1%, and
a correlation coefficient between the feature value and the impression tendency is larger than a critical value of a 5% significance level with the number of samples in the target population.

<8> The face impression analyzing method according to any one of <1> to <7> above, further including
acquiring a three-dimensional coordinate value of a surface of the head including the face of the subject as the facial form information using a contact-type three-dimensional digitizer.

<9> The face impression analyzing method according to <8> above, in which
said acquiring the three-dimensional coordinate value includes:
acquiring a three-dimensional coordinate value related to plural feature points on the surface of the head using the contact-type three-dimensional digitizer; and
acquiring a three-dimensional coordinate value related to another point on the surface of the head using a non-contact three-dimensional measurement device.

<10> The face impression analyzing method according to any one of <1> to <7> above, further including:
capturing plural two-dimensional images on the head including the face of the subject from different angles; and
calculating a three-dimensional coordinate value on the surface of the head as the facial form information on the basis of the two-dimensional images.

<11> The face impression analyzing method according to any one of <1> to <10> above, further including
receiving selection of the impression tendency from the subject.

<12> An aesthetic counseling method using the face impression analyzing method according to any one of <1> to <11>, including
outputting aesthetic information associated in advance with the feature value having the calculated amount of revelation more than or equal to a predetermined value.

<13> The aesthetic counseling method according to <12> above, in which
the aesthetic information is information indicating an aesthetic treatment method including any method of a cosmetic surgery method, an aesthetic massage method, a hair makeup method, and a cosmetic makeup method, or a hair cosmetic, or a cosmetic for makeup.

<14> The aesthetic counseling method according to <12> or <13> above, in which
the aesthetic information is information indicating a group of the impression tendency that the subject belongs to, this group being selected according to a percentage of contribution of the feature value.

<15> A face impression analyzing device, including:
a facial form acquiring unit that acquires facial form information representing a form of a face surface of a subject;
a storage unit that stores a high dimensional feature value obtained by applying multivariate analysis to target population face information representing three-dimensional forms of facial surfaces of a target population formed by a plurality of persons, and tendency information indicating an impression tendency of a facial shape associated with the feature value;
a face component analyzing unit that calculates an amount of revelation of the feature value of the face of the subject on the basis of the facial form information and the feature value; and
a face impression determining unit that refers to the storage unit, and acquires the impression tendency or the degree of the impression tendency on the basis of the feature value and the amount of revelation.

<16> A face impression analyzing system, including:
a receiving unit that receives facial form information representing a form of a face surface of a subject through a network;
a storage unit that stores a high dimensional feature value obtained by applying multivariate analysis to target population face information representing three-dimensional forms of facial surfaces of a target population formed by a plurality of persons, and tendency information indicating an impression tendency of a facial shape associated with the feature value;
a face component analyzing unit that calculates an amount of revelation of the feature value of the face of the subject on the basis of the facial form information and the feature value;
a face impression determining unit that refers to the storage unit, and acquires the impression tendency or the degree of the impression tendency on the basis of the feature value and the amount of revelation; and
a transmitting unit that transmits output information indicating the acquired impression tendency and the acquired degree of the impression tendency through a network.

<17> The face impression analyzing system according to <16> above, further including:
a three-dimensional form estimating unit that calculates a three-dimensional coordinate value of an image target on the basis of plural two-dimensional images of the image target captured from angles different from each other, in which the receiving unit receives, from a subject's terminal, plural two-dimensional images concerning the head including the face of a subject and captured from angles different from each other, the three-dimensional form estimating unit calculates a three-dimensional coordinate value of a surface of the head of the subject as the facial form information on the basis of the two-dimensional images received by the receiving unit, the face component analyzing unit calculates the amount of revelation on the basis of the calculated facial form information, and the transmitting unit transmits the output information to the subject's terminal.

<18> The face impression analyzing system according to <17> above, in which the receiving unit receives selection of the impression tendency from the subject's terminal, the face component analyzing unit refers to the storage unit to extract the feature value associated with the selected impression tendency, and calculates the amount of revelation of the extracted feature value, and the face impression determining unit acquires the degree of the feature value associated with the selected impression tendency.

Further, the exemplary embodiments and Examples described above disclose technical ideas of the face impression analyzing method, the aesthetic counseling method, and the face impression analyzing system described below.

<1a> A face impression analyzing method, including:

on the basis of facial form information representing a form of a facial surface of a subject, and one or more feature values obtained by applying multivariate analysis to target population face information representing three-dimensional forms of facial surfaces of a target population formed by a plurality of persons, calculating an amount of revelation of the feature value in the face of the subject, and obtaining a degree of an impression tendency of a facial shape of the subject on the basis of the amount of revelation.

<2a> The face impression analyzing method according to <1a> above, in which the target population face information is a homologous model in which the number of data points and topology are consistent among the faces.

<3a> The face impression analyzing method according to <1a> or <2a> above, further including:

classifying the target population into plural groups; and obtaining a group to which the subject belongs according to the amount of revelation of the subject.

<4a> The face impression analyzing method according to <3a> above, further including classifying the target population into the plural groups according to a degree of match of tendencies of plural weighting factors related to plural base vectors having a high correlation with the impression tendency.

<5a> The face impression analyzing method according to any one of <1a> to <4a> above, in which the degree of the impression tendency is a degree of an apparent age, an actual age, an adult face, or a baby face of the subject, or a degree of an impression of having a small face.

<6a> The face impression analyzing method according to <4a> above, in which the degree of the impression tendency is an apparent age or actual age of the subject, and the feature value includes at least one base vector having a high correlation with the impression tendency.

<7a> The face impression analyzing method according to any one of <1a> to <6a> above, in which a correlation coefficient between the feature value and the impression tendency is larger than a critical value of a 5% significance level with the number of samples in the target population.

<8a> The face impression analyzing method according to any one of <1a> to <7a> above, further including acquiring a three-dimensional coordinate value of a surface of the head including the face of the subject as the facial form information using a contact-type three-dimensional digitizer.

<9a> The face impression analyzing method according to <8a> above, in which said acquiring the three-dimensional coordinate value includes:

acquiring a three-dimensional coordinate value related to plural feature points on the surface of the head using the contact-type three-dimensional digitizer; and acquiring a three-dimensional coordinate value related to another point on the surface of the head using a non-contact three-dimensional measurement device.

<10a> The face impression analyzing method according to any one of <1a> to <9a> above, further including:

capturing plural two-dimensional images on the head including the face of the subject from different angles; and calculating a three-dimensional coordinate value on the surface of the head as the facial form information on the basis of the two-dimensional images.

<11a> The face impression analyzing method according to <2a> above, further including calculating the feature value of the subject by applying multivariate analysis to the target population face information containing the facial form information, wherein the facial form information of the subject is the homologous model.

<12a> The face impression analyzing method according to any one of <1a> to <10a> above, further including:

applying multivariate analysis to the target population face information that does not contain the facial form information of the subject to obtain plural feature values continuing from the first-dimension to a predetermined dimension; and calculating, as the amount of revelation, a weighting factor by reproducing the facial form information of the subject through calculation including multiplication and addition applied to the feature values and the weighting factor for each of the feature values.

<13a> The face impression analyzing method according to any one of <1a> to <12a> above, further including:

receiving selection of the impression tendency from the subject.

<14a> An aesthetic counseling method using the face impression analyzing method according to any one of <1a> to <13a> above, including outputting aesthetic information associated in advance with the feature value having the calculated amount of revelation more than or equal to a predetermined value.

<15a> The aesthetic counseling method according to <14a> above, in which the aesthetic information is information indicating a group of the impression tendency that the subject belongs to, this group being selected according to a percentage of contribution of the feature value.

<16a> An aesthetic counseling method using the face impression analyzing method according to any one of <1a> to <13a> above, including:

classifying the target population into plural groups according to a degree of match of tendencies of plural weighting factors related to plural base vectors having a high correlation with the impression tendency:

obtaining a group to which the subject belongs according to the amount of revelation of the subject; and outputting aesthetic information associated in advance with the group to which the subject belongs.

<17a> The aesthetic counseling method according to any one of <14a> to <16a> above, in which the aesthetic information is information indicating an aesthetic treatment method including any method of a cosmetic surgery method, an aesthetic massage method, a hair makeup method, and a cosmetic makeup method, or a hair cosmetic, or a cosmetic for makeup.

<18a> A face image generating method, including:

on the basis of facial form information representing a form of a facial surface of a subject, and one or more feature values obtained by applying multivariate analysis to target population face information representing three-dimensional forms of facial surfaces of a target population formed by a plurality of persons, calculating an amount of revelation of the feature value in the face of the subject;

varying the amount of revelation in the facial form information; and generating, on the basis of varied facial form information, an impression changed image in which an impression tendency of the facial shape of the subject is changed.

<19a> The face image generating method according to <18a> above, in which the feature value includes at least one base vector having a high correlation with the impression tendency, and said varying the amount of revelation in the facial form information includes changing a weighting factor for the base vector in a manner such that the degree of the impression tendency changes by a predetermined amount.

<20a> The face image generating method according to <19a> above, further including classifying the target population into a first group that includes the subject and a second group that does not include the subject based on an apparent or actual age of the subject indicated by the degree of the impression tendency, wherein said changing the weighting factor includes:

applying a first weight to the base vector that develops in the first group or the second group in an imbalanced manner; and applying a second weight smaller than the first weight to the base vector that develops in both of the first group and the second group.

<21a> The face image generating method according to <20a> above, in which the age that has changed by the predetermined amount falls between an average age of the first group and an average age of the second group.

<22a> The face image generating method according to any one of <19a> to <21a> above, further including:

classifying the target population into plural groups according to a degree of match of tendencies of plural weighting factors related to plural base vectors having a high correlation with the impression tendency; and obtaining a group to which the subject belongs according to the amount of revelation of the subject, wherein said changing the weighting factor targets ata weighting factor for a base vector having a high correlation with the impression tendency in the group to which the subject belongs.

<23a> A face impression analyzing device, including:

a facial form acquiring unit that acquires facial form information representing a form of a face surface of a subject;

a storage unit that stores one or more feature values obtained by applying multivariate analysis to target population face information representing three-dimensional forms of facial surfaces of a target population formed by a plurality of persons, and tendency information indicating an impression tendency of a facial shape associated with the feature value;

a face component analyzing unit that calculates an amount of revelation of the feature value of the face of the subject on the basis of the facial form information and the feature value; and a face impression determining unit that refers to the storage unit, and acquires the impression tendency or the degree of the impression tendency on the basis of the feature value and the amount of revelation.

<24a> A face impression analyzing system, including:

a receiving unit that receives facial form information representing a form of a face surface of a subject through a network;

a storage unit that stores one or more feature values obtained by applying multivariate analysis to target population face information representing three-dimensional forms of facial surfaces of a target population formed by a plurality of persons, and tendency information indicating an impression tendency of a facial shape associated with the feature value;

a face component analyzing unit that calculates an amount of revelation of the feature value of the face of the subject on the basis of the facial form information and the feature value;

a face impression determining unit that refers to the storage unit, and acquires the impression tendency or the degree of the impression tendency on the basis of the feature value and the amount of revelation; and a transmitting unit that transmits output information indicating the acquired impression tendency or the acquired degree of the impression tendency through a network.

<25a> The face impression analyzing system according to <24a> above, further including:

a three-dimensional form estimating unit that calculates a three-dimensional coordinate value of an image target on the basis of plural two-dimensional images of the image target captured from angles different from each other, in which the receiving unit receives, from a subject's terminal, plural two-dimensional images concerning the head including the face of a subject and captured from angles different from each other, the three-dimensional form estimating unit calculates a three-dimensional coordinate value of a surface of the head of the subject as the facial form information on the basis of the two-dimensional images received by the receiving unit, the face component analyzing unit calculates the amount of revelation on the basis of the calculated facial form information, and the transmitting unit transmits the output information to the subject's terminal.

<26a> The face impression analyzing system according to <25a> above, in which the receiving unit receives selection of the impression tendency from the subject's terminal, the face component analyzing unit refers to the storage unit to extract the feature value associated with the selected impression tendency, and calculates the amount of revelation of the extracted feature value, and the face impression determining unit acquires the degree of the feature value associated with the selected impression tendency.

Further, the exemplary embodiments and Examples described above disclose technical ideas of the face impression analyzing method, the aesthetic counseling method, and the face impression analyzing system described below.

<1b> The face impression analyzing method according to <1a> above, in which the feature value includes at least one of base vectors corresponding to the second-dimension and higher, the base vectors having a high correlation with the impression tendency.

<2b> The face impression analyzing method according to any one of <1a> to <4a>, and <1b> above, in which the degree of the impression tendency is high-or-low relative to an apparent age or actual age of the subject.

<3b> The face impression analyzing method according to any one of <1a> to <4a>, and <1b> above, in which the degree of the impression tendency is a degree at which the subject has an adult face or baby face, a degree of an impression of having a small face, a degree of having a round face or long face, or a degree of an impression of having a large eye.

<4b> The face impression analyzing method according to <1b> above, in which the degree of the impression tendency is two or more impression tendencies selected from high-or-low of an apparent age or actual age of the subject, a degree of being an adult face or baby face, a degree of an impression of having a small face, a degree of having a round face or long face, and a degree of an impression of having a large eye, and the one or more feature values associated with each of these two or more impression tendencies include base vectors corresponding to dimensions different from each other.

<5b> The face impression analyzing method according to <4b> above, in which the one or more feature values associated with each of the two or more impression tendencies are formed only by base vectors corresponding to dimensions different from each other.

<6b> The aesthetic counseling method according to <15a> or <16a> above, in which the degree of the impression tendency is a degree at which the subject has an adult face or baby face, a degree of an impression of having a small face, a degree of having a round face or long face, or a degree of an impression of having a large eye, and aesthetic information associated in advance with the group to which the subject belongs and another group to which the subject does not belong is outputted.

<7b> The face image generating method according to <18a> above, in which each of the one or more feature values includes at least one of base vectors corresponding to the second-dimension and higher, the base vectors having a high correlation with the impression tendency and extracted from plural base vectors obtained through the multivariate analysis, and said varying the amount of revelation in the facial form information includes changing a weight factor for the base vector in a manner such that the degree of the impression tendency changes by a predetermined amount.

<8b> The face impression analyzing device according to <23a> above, in which the feature value includes at least one of base vectors corresponding to the second-dimension and higher, base vectors having a high correlation with the impression tendency and extracted from plural base vectors obtained through the multivariate analysis, and the amount of revelation in the facial form information is changed by changing a weight factor for the base vector in a manner such that the degree of the impression tendency changes by a predetermined amount.

<9b> The face impression analyzing system according to any one of <24a> to <26a> above, in which the feature value includes at least one of base vectors corresponding to the second-dimension and higher, the base vectors having a high correlation with the impression tendency and extracted from plural base vectors obtained through the multivariate analysis, and the amount of revelation in the facial form information is changed by changing a weighting factor for the base vector in a manner such that the degree of the impression tendency changes by a predetermined amount.

<10b> The face image generating method according to any one of <18a> to <22a>, and <7b> above, in which the degree of the impression tendency is a degree at which the subject has an adult face or baby face, a degree of an impression of having a small face, a degree of having a round face or long face, or a degree of an impression of having a large eye.

<11b> The face image generating method according to <7b> above, in which the degree of the impression tendency is two or more impression tendencies selected from high-or-low of an apparent age or actual age of the subject, a degree of being an adult face or baby face, a degree of an impression of having a small face, a degree of having a round face or long face, and a degree of an impression of having a large eye, and the one or more feature values associated with each of these two or more impression tendencies include base vectors corresponding to dimensions different from each other.

<12b> The face image generating method according to <11b> above, in which the one or more feature values associated with each of the two or more impression tendencies are formed only by base vectors corresponding to dimensions different from each other.

<13b> The face impression analyzing device according to <23a> above, in which the target population face information is a homologous model in which the number of data points and topology are consistent among the faces.

<14b> The face impression analyzing device according to <23a> above or <13b> above, in which the storage unit classifies the target population into plural groups and stores it, and the face impression determining unit determines a group to which the subject belongs on the basis of the amount of revelation of the subject.

<15b> The face impression analyzing device according to <14b> above, in which the storage unit stores the plural groups classified on the basis of the degree of match of tendencies of plural weighting factors related to plural base vectors having a high correlation with the impression tendency.

<16b> The face impression analyzing device according to any one of <23a>, and <13b> to <15b> above, in which the degree of the impression tendency is high or low relative to an apparent age or actual age of the subject.

<17b> The face impression analyzing device according to any one of <23a>, and <13b> to <15b> above, in which the degree of the impression tendency is a degree at which the subject has an adult face or baby face, a degree of an impression of having a small face, a degree of having a round face or long face, or a degree of an impression of having a large eye.

<18b> The face impression analyzing device according to <8b> above, in which the degree of the impression tendency is two or more impression tendencies selected from high-or-low of an apparent age or actual age of the subject, a degree of being an adult face or baby face, a degree of an impression of having a small face, a degree of having a round face or long face, and a degree of an impression of having a large eye, and the one or more feature values associated with each of these two or more impression tendencies include base vectors corresponding to dimensions different from each other.

<19b> The face impression analyzing device according to <18b> above, in which the one or more feature values associated with each of the two or more impression tendencies are formed only by base vectors corresponding to dimensions different from each other.

<20b> The face impression analyzing device according to any one of <23a>, and <13b> to <19b> above, in which the face impression determining unit acquires the impression tendency or the degree of the impression tendency on the basis of the feature value having a correlation coefficient with the impression tendency larger than a critical value of a 5% significance level with the number of samples in the target population.

<21b> The face impression analyzing device according to any one of <23a>, and <13b> to <20b> above, further includes a contact-type three-dimensional digitizer that acquires, as the facial form information, a three-dimensional coordinate value at each of plural feature points on a surface of the head including the face of the subject.

<22b> The face impression analyzing device according to <21b> above, further including a non-contact three-dimensional measurement device that acquires a three-dimensional coordinate value at another point on a surface of the head.

<23b> The face impression analyzing device according to any one of <23a>, and <13b> to <22b> above, further including a three-dimensional form estimating unit that calculates a three-dimensional coordinate value of a surface of the head including the face of a subject as the facial form information on the basis of plural two-dimensional images concerning the head and captured from angles different from each other.

<24b> The face impression analyzing device according to <13b> above, in which the facial form information of the subject is the homologous model, and the face component analyzing unit calculates the feature value of the subject by applying multivariate analysis to the target population face information containing the facial form information.

<25b> The face impression analyzing device according to any one of <23a>, and <13b> to <23b>, wherein the face component analyzing unit:

applies multivariate analysis to the target population face information that does not contain the facial form information of the subject to obtain plural feature values continuing from the first-dimension to a predetermined dimension, and reproduces the facial form information of the subject through calculation including multiplication and addition applied to the feature values and a weighting factor for each of the feature values, thereby calculating the amount of revelation of the weighting factor.

<26b> The face impression analyzing device according to any one of <23a>, and <13b> to <25b> above, further including a condition input unit that receives selection of the impression tendency from the subject.

<27b> The face image generating method according to any one of <10b> to <12b> above, further including classifying the target population into a first group that includes the subject and a second group that does not include the subject based on the degree of the impression tendency, wherein said changing the weighting factor includes:

applying a first weight to the base vector that develops in either the first group or the second group in an imbalanced manner; and applying a second weight smaller than the first weight to the base vector that develops in both of the first group and the second group.

<28b> The face image generating method according to any one of <18a> to <22a>, <7b>, and <10b> to <12b> above, further including display output is performed in a manner that compares an image of the face of the subject and the impression changed image.

<29b> An aesthetic counseling method using the face image generating method according to <28b> above, including:

generating an aesthetic simulation image that simulates a state where the aesthetic treatment method that includes a hair makeup method or cosmetic makeup method and does not change a form of a surface of the face of the subject is applied to the face of the subject, and displaying and outputting the aesthetic simulation image and the impression changed image so as to be compared.

The invention claimed is:

1. A face impression analyzing method, comprising:
providing, memory, one or more base vectors obtained by applying multivariate analysis to target population face information representing three-dimensional forms of facial surfaces of a target population formed by a plurality of persons;
based on facial form information representing a form of a face surface of a subject, and the one or more base vectors provided from the memory and obtained by applying multivariate analysis to target population face information representing three-dimensional forms of facial surfaces of the target population formed by the plurality of persons, calculating, using processing circuitry, a weighting factor of each of the one or more base vectors in the face of the subject; and
obtaining, using the processing circuitry, a degree of an impression tendency of a facial shape of the subject based on the weighting factor,
wherein a correlation coefficient between the base vector and the impression tendency is greater than a critical value of a 5% significance level with the number of samples in the target population.

2. The face impression analyzing method according to claim 1, wherein the target population face information is represented by a homologous model in which the number of data points and topology are consistent among the faces.

3. The face impression analyzing method according to claim 2, further comprising:

calculating the base vector of the subject by applying multivariate analysis to the target population face information containing the facial form information, wherein the facial form information of the subject is represented by the homologous model.

4. The face impression analyzing method according to claim 1, further comprising:
classifying the target population into a plurality of groups; and
obtaining a group to which the subject belongs according to the weighting factor of the subject.

5. The face impression analyzing method according to claim 4, further comprising:
classifying the target population into the plurality of groups according to a degree of match of tendencies of a plurality of weighting factors related to plural base vectors having a correlation with the impression tendency above a threshold.

6. The face impression analyzing method according to claim 1, wherein said obtaining the degree of the impression tendency is performed based on the weighting factor of at least one base vector, the at least one base vector corresponding to a second-dimension or higher, having a high correlation with the impression tendency, and extracted from the one or more base vectors obtained through the multivariate analysis.

7. The face impression analyzing method according to claim 6, wherein
the degree of the impression tendency is two or more impression tendencies selected from above or below an apparent age or actual age of the subject, a degree of being an adult face or baby face, a degree of an impression of having a small face, a degree of having a round face or long face, and a degree of an impression of having a large eye, and
the one or more base vectors associated with each of these two or more impression tendencies include base vectors corresponding to dimensions different from each other.

8. The face impression analyzing method according to claim 7, wherein the one or more base vectors associated with each of the two or more impression tendencies are formed only by base vectors corresponding to dimensions different from each other.

9. The face impression analyzing method according to claim 1, wherein the degree of the impression tendency is above or below an apparent age or actual age of the subject.

10. The face impression analyzing method according to claim 1, wherein the degree of the impression tendency is one or more selected from above or below an apparent age or actual age of the subject, a degree to which the subject has an adult face or baby face, a degree of an impression of having a small face, a degree of having a round face or long face, and a degree of an impression of having a large eye.

11. The face impression analyzing method according to claim 1, further comprising:
acquiring a three-dimensional coordinate value of a surface of the head and the face of the subject as the facial form information using a contact-type three-dimensional digitizer.

12. The face impression analyzing method according to claim 11, wherein
said acquiring the three-dimensional coordinate value includes:
acquiring a three-dimensional coordinate value related to a plurality of feature points on the surface of the head using the contact-type three-dimensional digitizer, and
acquiring a three-dimensional coordinate value related to another point on the surface of the head using a non-contact three-dimensional measurement device.

13. The face impression analyzing method according to claim 1, further comprising:
capturing a plurality of two-dimensional images on the head and the face of the subject from different angles; and
calculating a three-dimensional coordinate value on the surface of the head as the facial form information based on the two-dimensional images.

14. The face impression analyzing method according to claim 1, further comprising:
applying multivariate analysis to the target population face information that does not contain the facial form information of the subject to obtain a plurality of base vectors continuing from a first-dimension to a predetermined dimension; and
calculating the weighting factor by reproducing the facial form information of the subject through calculation including multiplication and addition applied to the base vectors and the weighting factor for each of the base vectors.

15. The face impression analyzing method according to claim 1, further comprising:
receiving selection of the impression tendency from the subject.

16. An aesthetic counseling method using the face impression analyzing method according to claim 1, comprising:
outputting aesthetic information associated in advance with the base vector having the calculated weighting factor more than or equal to a predetermined value.

17. The aesthetic counseling method according to claim 16, wherein the aesthetic information is information indicating a group of the impression tendency that the subject belongs to, said group being selected according to a percentage of contribution of the base vector.

18. The aesthetic counseling method according to claim 17, wherein
a degree of the impression tendency is a degree at which the subject has an adult face or baby face, a degree of an impression of having a small face, a degree of having a round face or long face, or a degree of an impression of having a large eye, and
aesthetic information associated in advance with the group to which the subject belongs and another group to which the subject does not belong is outputted.

19. The aesthetic counseling method according to claim 16, wherein the aesthetic information is information indicating an aesthetic treatment method comprising any method of a cosmetic surgery method, an aesthetic massage method, a hair makeup method, and a cosmetic makeup method, or a hair cosmetic, or a cosmetic for makeup.

20. An aesthetic counseling method using the face impression analyzing method according to claim 1, comprising:
classifying the target population into a plurality of groups according to a degree of match of tendencies of a plurality of weighting factors related to plural base vectors having a correlation with the impression tendency above a threshold;
obtaining a group to which the subject belongs according to the weighting factor of the subject; and
outputting aesthetic information associated in advance with the group to which the subject belongs.

21. The face impression analyzing method according to claim 1, further comprising providing facial form information using facial form acquiring circuitry.

22. A face image generating method, comprising:
providing, from memory, one or more base vectors obtained by applying multivariate analysis to target population face information representing three-dimensional forms of facial surfaces of a target population formed by a plurality of persons;
based on facial form information representing a form of a facial surface of a subject, and the one or more base vectors provided from the memory and obtained by applying multivariate analysis to target population face information representing three-dimensional forms of facial surfaces of a target population formed by a plurality of persons, calculating, using a processor, a weighting factor of each of the one or more base vectors in the face of the subject;
varying, using the processor, the weighting factor in the facial form information; and
generating, using the processor, based on varied facial form information, an impression changed image in which an impression tendency of the facial shape of the subject is changed,
wherein a correlation coefficient between the base vector and the impression tendency is larger than a critical value of a 5% significance level with the number of samples in the target population.

23. The face image generating method according to claim 22, wherein said varying the weighting factor in the facial form information includes changing at least one of base vectors such that a degree of the impression tendency changes by a predetermined amount, the base vectors corresponding to a second-dimension and higher, having a correlation with the impression tendency above a threshold, and extracted from the one or more base vectors obtained through the multivariate analysis.

24. The face image generating method according to claim 23, further comprising:
classifying the target population into a plurality of groups according to a degree of match of tendencies of a plurality of weighting factors related to plural base vectors having a correlation with the impression tendency above a threshold; and
obtaining a group to which the subject belongs according to the weighting factor of the subject,
wherein said changing the weighting factor targets at a weighing factor for a base vector having the correlation with the impression tendency above the threshold in the group to which the subject belongs.

25. The face image generating method according to claim 23, further comprising:
classifying the target population into a first group that comprises the subject and a second group that does not include the subject based on the degree of the impression tendency, wherein
said changing the weighting factor includes:
applying a first weight to the base vector that develops in either the first group or the second group in an imbalanced manner, and
applying a second weight smaller than the first weight to the base vector that develops in both of the first group and the second group.

26. The face image generating method according to claim 25, wherein
the degree of the impression tendency is an apparent or actual age of the subject, and
the age that has changed by the predetermined amount falls between an average age of the first group and an average age of the second group.

27. The face image generating method according to claim 22, further comprising:
displaying an image of the face of the subject and the impression changed image so as to be compared.

28. An aesthetic counseling method using the face image generating method according to claim 22, comprising:
generating an aesthetic simulation image that simulates a state where the aesthetic treatment method that comprises a hair makeup method or cosmetic makeup method and does not change a form of a surface of the face of the subject is applied to the face of the subject; and
displaying the aesthetic simulation image and the impression changed image so as to be compared.

29. A face impression analyzing device, comprising:
circuitry including a facial form acquiring circuitry portion configured to
acquire facial form information representing a form of a face surface of a subject;
store one or more base vectors obtained by applying multivariate analysis to target population face information representing three-dimensional forms of facial surfaces of a target population formed by a plurality of persons, and tendency information indicating an impression tendency of a facial shape associated with the one or more base vectors;
calculate a weighting factor of each of the one or more base vectors of the face of the subject based on the facial form information and the base vectors; and
acquire the stored impression tendency or the degree of the impression tendency based on the base vector and the weighting factor,
wherein a correlation coefficient between the base vector and the impression tendency is greater than a critical value of a 5% significance level with the number of samples in the target population.

30. The face impression analyzing device according to claim 29, wherein the circuitry is configured to
transmit output information indicating the acquired impression tendency or the acquired degree of the impression tendency through a first network, and
receive the facial form information representing the form of the face surface of the subject through a second network.

31. The face impression analyzing device according to claim 30, wherein the circuitry is configured to
calculate a three-dimensional coordinate value of an image target based on a plurality of two-dimensional images of the image target captured from angles different from each other,
receive, from a terminal, a plurality of two-dimensional images concerning the head and the face of the subject and captured from angles different from each other, and
calculate a three-dimensional coordinate value of the surface of the head of the subject as the facial form information based on the two-dimensional images received by the receiving unit.

32. The face impression analyzing device according to claim 29, wherein
the facial form information of the subject is represented by the homologous model, and
the circuitry is configured to calculate the base vector of the subject by applying multivariate analysis to the target population face information containing the facial form information.

33. The face impression analyzing device according to claim 29, wherein the circuitry is configured to apply multivariate analysis to the target population face information that does not contain the facial form information of the subject to obtain plural base vectors continuing from a first-dimension to a predetermined dimension; and reproduce the facial form information of the subject through calculation including multiplication and addition applied to the base vectors and a weighting factor for each of the base vectors, thereby calculating the weighting factor.

34. The face impression analyzing device according to claim 29, wherein the circuitry is configured to receive selection of the impression tendency from the subject.

35. The face impression analyzing device according to claim 29, wherein the circuitry is configured to change at least one of the base vectors such that the degree of the impression tendency changes by a predetermined amount, the base vectors corresponding to a second-dimension and higher, having a correlation with the impression tendency above a threshold, and extracted from a plurality of base vectors obtained through the multivariate analysis, thereby changing the weighting factor in the facial form information.

36. The face impression analyzing device according to claim 29, wherein the degree of the impression tendency is above or below an apparent age or actual age of the subject.

37. The face impression analyzing device according to claim 29, wherein the degree of the impression tendency is one or more selected from above or below an apparent age or actual age of the subject, a degree to which the subject has an adult face or baby face, a degree of an impression of having a small face, a degree of having a round face or long face, and a degree of an impression of having a large eye.

* * * * *